(12) United States Patent
Yanai et al.

(10) Patent No.: US 10,642,085 B2
(45) Date of Patent: May 5, 2020

(54) LAMINATE AND WINDOW

(71) Applicant: FUJIFILM Corporation, Tokyo (JP)

(72) Inventors: Yujiro Yanai, Minami-ashigara (JP);
Akira Yamamoto, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 202 days.

(21) Appl. No.: 15/883,731

(22) Filed: Jan. 30, 2018

(65) Prior Publication Data

US 2018/0157068 A1 Jun. 7, 2018

Related U.S. Application Data

(63) Continuation of application No. PCT/JP2016/072045, filed on Jul. 27, 2016.

(30) Foreign Application Priority Data

Jul. 31, 2015 (JP) ................. 2015-152709

(51) Int. Cl.
*G02B 5/30* (2006.01)
*G02B 27/28* (2006.01)
(Continued)

(52) U.S. Cl.
CPC .............. *G02F 1/1335* (2013.01); *B32B 7/02* (2013.01); *G02B 5/3041* (2013.01);
(Continued)

(58) Field of Classification Search
CPC .... G02F 1/1335; G02F 1/1393; G02F 1/1395; G02F 1/13363; G02F 1/133528;
(Continued)

(56) References Cited

U.S. PATENT DOCUMENTS

2007/0222919 A1 9/2007 Chiba et al.
2012/0003400 A1* 1/2012 Nishimura ............... B32B 27/08
428/1.1
(Continued)

FOREIGN PATENT DOCUMENTS

CN 1906509 A 1/2007
CN 202141874 U 2/2012
(Continued)

OTHER PUBLICATIONS

International Preliminary Report on Patentability and Written Opinion of the International Searching Authority (Forms PCT/IB/326, PCT/IB/373, PCT/ISA/236) for International Application No. PCT/JP2016/072045, dated Feb. 15, 2018, with English translation.
(Continued)

*Primary Examiner* — Mustak Choudhury
(74) *Attorney, Agent, or Firm* — Birch, Stewart, Kolasch & Birch, LLP

(57) ABSTRACT

Provided is a laminate including first and second patterned polarizers, a patterned optical anisotropic layer disposed between the first and second patterned polarizers, and an optically anisotropic layer disposed between the first patterned polarizer and the patterned optical anisotropic layer; in which an angle formed between an absorption axis of each of polarization regions of the second patterned polarizer and a slow axis of each of phase difference regions of the patterned optical anisotropic layer that is superposed on each of the polarization regions of the second patterned polarizer is 0°±5° or 90°±5°; an absolute value of Rth of the optically anisotropic layer is 50 to 150 nm; at least one of the first or second patterned polarizers is movable; and a white display state and a black display state are switched with each other. Also provided is a window.

10 Claims, 4 Drawing Sheets

(51) Int. Cl.
*G02F 1/1335* (2006.01)
*B32B 7/02* (2019.01)
*G02F 1/13363* (2006.01)
*G02F 1/1333* (2006.01)

(52) U.S. Cl.
CPC ....... *G02B 27/288* (2013.01); *G02F 1/13363* (2013.01); *G02F 1/133377* (2013.01); *G02F 1/133528* (2013.01); *G02F 2001/133368* (2013.01); *G02F 2001/133531* (2013.01); *G02F 2001/133538* (2013.01); *G02F 2001/133631* (2013.01)

(58) Field of Classification Search
CPC ........... G02F 1/13377; G02F 1/133377; G02F 1/133634; G02F 2001/133538; G02F 2001/133631; G02F 2001/133637; G02F 2001/133368; G02F 2001/133531; G02B 5/30; G02B 5/3016; G02B 5/3025; G02B 5/3033; G02B 5/3041; G02B 5/3083; G02B 26/02; G02B 27/281; G02B 27/283; G02B 27/288; G03H 1/00; G03H 1/0005; G03H 1/02; G03H 1/04; G03H 1/08; G03H 2001/0027; G03H 2001/0033; E06B 9/24; E06B 2009/2405; E06B 2009/2411; E06B 2009/2417
USPC ............ 359/485.01, 487.06, 489.15, 489.07, 359/489.03, 492.01; 428/1.1, 336, 411.1, 428/1.3, 1.33, 532; 427/66; 349/9, 96, 349/102, 117, 118, 121; 156/324
See application file for complete search history.

(56) References Cited

U.S. PATENT DOCUMENTS

| | | | |
|---|---|---|---|
| 2012/0169950 | A1 | 7/2012 | Tatzel et al. |
| 2013/0235306 | A1* | 9/2013 | Ikeshima ............. G02B 5/3033 349/96 |
| 2015/0041051 | A1 | 2/2015 | Kobayashi |
| 2016/0334633 | A1* | 11/2016 | Asanoi ..................... E06B 9/24 |

FOREIGN PATENT DOCUMENTS

| | | | |
|---|---|---|---|
| CN | 103384841 A | | 11/2013 |
| CN | 104339796 A | | 2/2015 |
| JP | 4-127103 A | | 4/1992 |
| JP | 4-293889 A | | 10/1992 |
| JP | 9-310567 A | | 12/1997 |
| JP | 2006-195395 A | | 7/2006 |
| JP | 2008-20670 A | | 1/2008 |
| JP | 2013156494 A | * | 8/2013 |
| JP | 2014-507676 A | | 3/2014 |
| JP | 2015-132093 A | | 7/2015 |

OTHER PUBLICATIONS

International Search Report (Form PCT/ISA/210) for International Application No. PCT/JP2016/072045, dated Oct. 25, 2016, with English translation.

Chinese Office Action and Search Report, dated Sep. 30, 2019 for corresponding Chinese Application No. 201680045045.8, with English translations.

* cited by examiner

LAMINATE AND WINDOW

CROSS-REFERENCE TO RELATED APPLICATIONS

This application is a Continuation of PCT International Application No. PCT/JP2016/072045, filed on Jul. 27, 2016, which claims priority under 35 U.S.C. Section 119(a) to Japanese Patent Application No. 2015-152709 filed on Jul. 31, 2015. Each of the above applications is hereby expressly incorporated by reference, in its entirety, into the present application.

BACKGROUND OF THE INVENTION

1. Field of the Invention

The present invention relates to a laminate and a window.

2. Description of the Related Art

In recent years, as the protection of privacy has become more important and in order to save energy by allowing the external light to selectively come into buildings or vehicles, there has been a demand for light control devices (referred to as light control systems as well) such as windows having a shutter function by which windows, partitions of rooms, and the like are in a white display state (referred to as a transmission mode as well) and a black display state (referred to as a light-blocking mode as well) switched with each other according to the time slot or the use.

JP2014-507676A describes a variable transmission device having a first patterned wavelength retarder, including a first uniform polarizer having a first polarization axis, a second uniform polarizer having a second polarization axis, and a plurality of first regions positioned between the first and second polarizers and constituted so as to change at least one of the light axis, the thickness, or the birefringence, and a second patterned wavelength retarder including a plurality of second regions positioned between the first and second polarizers and constituted so as to change at least one of the light axis, the thickness, or the birefringence, in which the first or second wavelength retarder is constituted so as to linearly move with respect to the other first or second wavelength retarder.

SUMMARY OF THE INVENTION

JP2014-507676A does not describe the phase difference in a front direction. As a result of examining the performance of the device described in JP2014-507676A, the inventors of the present invention have found that the brightness of the black display state in the front and in all directions cannot be reduced. That is, the inventors have found that depending on the directions along which the black display state is observed, serious light leakage occurs.

An object of the present invention is to provide a laminate in which a white display state and a black display state are switched with each other in a case where light is incident on the laminate and the brightness of the black display state is low in the front and in all directions.

In order to achieve the aforementioned object, the inventors of the present invention conducted an intensive examination. As a result, the inventors obtained knowledge that by disposing an optically anisotropic layer having specific optical characteristics in a laminate, which includes a first patterned polarizer, a second patterned polarizer, and a patterned optical anisotropic layer disposed between the first patterned polarizer and the second patterned polarizer in this order and in which a white display state and a black display state are switched with each other, between the first patterned polarizer and the patterned optical anisotropic layer, it is possible to provide a laminate in which the white display state and the black display state are switched with each other in a case where light is incident on the laminate and the brightness of the black display state is low in the front and in all directions.

JP2014-507676A does not have a disclosure or a hint regarding the disposing of the optically anisotropic layer having specific optical characteristics between the first patterned polarizer and the patterned optical anisotropic layer.

The present invention as means for achieving the aforementioned object and preferable aspects of the present invention are as below.

[1] A laminate comprising a first patterned polarizer, a second patterned polarizer, a patterned optical anisotropic layer disposed between the first patterned polarizer and the second patterned polarizer, and an optically anisotropic layer disposed between the first patterned polarizer and the patterned optical anisotropic layer; in which the laminate comprises one sheet of the patterned optical anisotropic layer; each of the first patterned polarizer and the second patterned polarizer has two or more polarization regions having different absorption axis directions in a plane of the first patterned polarizer or the second patterned polarizer; the patterned optical anisotropic layer has two or more phase difference regions having different slow axis directions in a plane of the patterned optical anisotropic layer; an angle formed between the absorption axis of each of the polarization regions of the second patterned polarizer and the slow axis of each of the phase difference regions of the patterned optical anisotropic layer that is superposed on each of the polarization regions of the second patterned polarizer is 0°±5° or 90°±5°; an absolute value of a retardation Rth of the optically anisotropic layer at a wavelength of 550 nm in a film thickness direction of the optically anisotropic layer is 50 to 150 nm; at least one of the first patterned polarizer or the second patterned polarizer is movable; and a white display state, in which an angle formed between the absorption axis of each of the polarization regions of the first patterned polarizer and the absorption axis of each of the polarization regions of the second patterned polarizer that is superposed on each of the polarization regions of the first patterned polarizer is 0°±5° and a transmittance obtained in a case where light incident on the first patterned polarizer exits from the second patterned polarizer is maximized, and a black display state, in which an angle formed between the absorption axis of each of the polarization regions of the first patterned polarizer and the absorption axis of each of the polarization regions of the second patterned polarizer that is superposed on each of the polarization regions of the first patterned polarizer is 90°±5° and the transmittance obtained in a case where the light incident on the first patterned polarizer exits from the second patterned polarizer is minimized, are switched with each other.

[2] It is preferable that in the laminate described in [1], each of the first patterned polarizer and the second patterned polarizer has first polarization regions and second polarization regions which have different absorption axis directions in the plane of the first patterned polarizer or the plane of the second patterned polarizer and alternate with each other, an angle formed between the absorption axis direction of each of the first polarization regions and the absorption axis direction of each of the second polarization regions is 90°±5°; the patterned optical anisotropic layer has first phase difference regions and second phase difference regions which have different slow axis directions in the plane of the patterned optical anisotropic layer and alternate with each other, an angle formed between the slow axis direction of each of the first phase difference regions and the slow axis direction of each of the second phase difference regions is 90°±5°; and an angle formed between the absorption axis of each of the first polarization regions of the second patterned polarizer and the slow axis of each of the first phase difference regions of the patterned optical anisotropic layer that is superposed on each of the first polarization regions of the second patterned polarizer is 0°±5° or 90±5°.

[3] It is preferable that in the laminate described in [1], each of the first patterned polarizer and the second patterned polarizer has three or more polarization regions which have different absorption axis directions within the plane of the first patterned polarizer or the second patterned polarizer and in which the absorption axis directions continuously change; the patterned optical anisotropic layer has three or more phase difference regions which have different slow axis directions within the plane of the patterned optical anisotropic layer and in which the slow axis directions continuously change; and an angle formed between the absorption axis of each of the polarization regions of the second patterned polarizer and the slow axis of each of the phase difference regions of the patterned optical anisotropic layer that is superposed on each of the polarization regions of the second patterned polarizer is 0°±5° or 90°±5°.

[4] It is preferable that in the laminate described in any one of [1] to [3], the patterned optical anisotropic layer is a +A-plate in which a retardation Re(550) at a wavelength of 550 nm equals 110 to 160 nm in an in-plane direction of the patterned optical anisotropic layer, and the optically anisotropic layer is a +C-plate in which a retardation Rth(550) at a wavelength of 550 nm equals −50 to −150 nm in the film thickness direction of the optically anisotropic layer.

[5] It is preferable that in the laminate described in [4], the +A-plate has reciprocal wavelength dispersion in which a retardation Re(450) at a wavelength of 450 nm in the in-plane direction of the +A-plate, the retardation Re(550) at a wavelength of 550 nm in the in-plane direction of the +A-plate, and a retardation Re(630) at a wavelength of 630 nm in the in-plane direction of the +A-plate satisfy Re(450)/Re(550)<1 and Re(630)/Re(550)>1.

[6] It is preferable that in the laminate described in [4] or [5], the +C-plate has reciprocal wavelength dispersion in which a retardation Re(450) at a wavelength of 450 nm in the in-plane direction of the +C-plate, the retardation Re(550) at a wavelength of 550 nm in the in-plane direction of the +C-plate, and the retardation Re(630) at a wavelength of 630 nm in the in-plane direction of the +C-plate satisfy Re(450)/Re(550)<1 and Re(630)/Re(550)>1.

[7] It is preferable that in the laminate described in any one of [1] to [3], the patterned optical anisotropic layer is preferably a −A-plate in which a retardation Re(550) at a wavelength of 550 nm equals 110 to 160 nm in an in-plane direction of the patterned optical anisotropic layer, and the optically anisotropic layer is a −C-plate in which a retardation Rth(550) at a wavelength of 550 nm equals 50 to 150 nm in the film thickness direction of the patterned optical anisotropic layer.

[8] It is preferable that in the laminate described in any one of [1] to [7], in the optically anisotropic layer, the retardation Re(550) at a wavelength of 550 nm equals −10 to 10 nm in the in-plane direction of the patterned optical anisotropic layer.

[9] It is preferable that in the laminate described in any one of [1] to [8], the patterned optical anisotropic layer contains a liquid crystal compound.

[10] A window comprising the laminate described in any one of [1] to [9].

According to the present invention, it is possible to provide a laminate in which a white display state and a black display state are switched with each other in a case where light is incident on the laminate and the brightness of the black display state is low in the front and in all directions.

DESCRIPTION OF THE PREFERRED EMBODIMENTS

Figure 1:
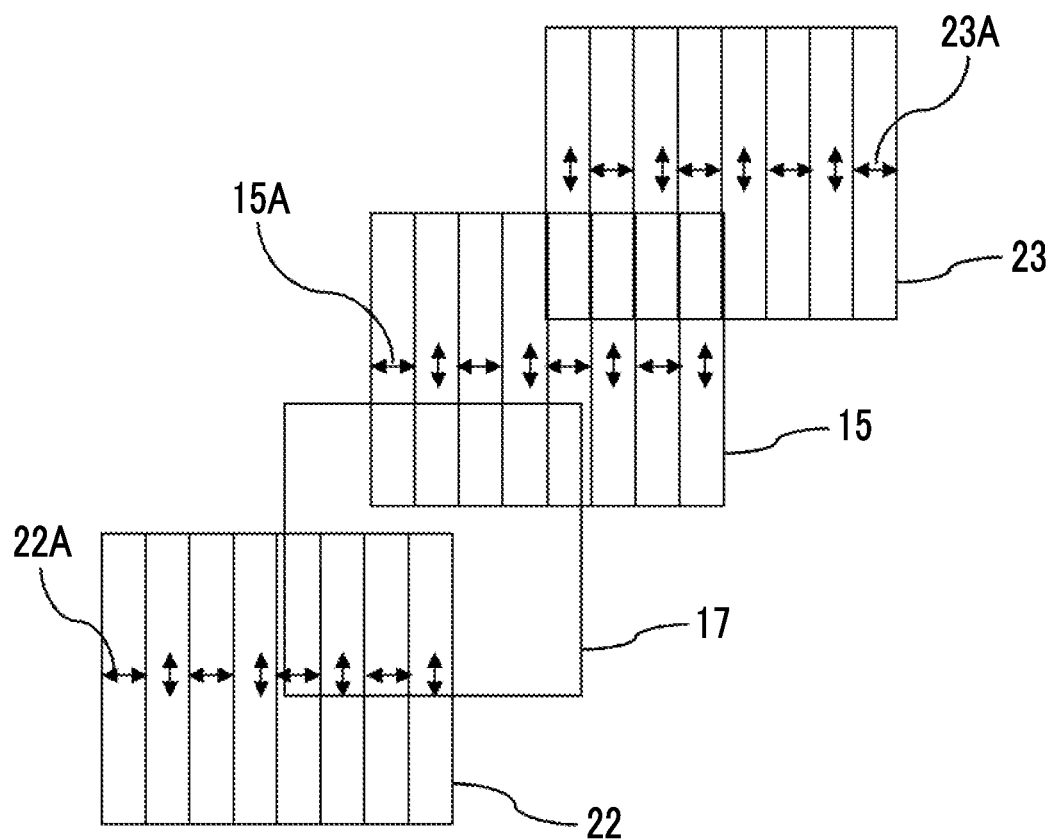
FIG. 1 is a perspective exploded view relating to an example of a first preferable aspect of a laminate of the present invention.

Hereinafter, the present invention will be specifically described. The following constituents will be described based on typical embodiments of the present invention in some cases, but the present invention is not limited to the embodiments. In the present specification, a range of numerical values described using "to" means a range including the numerical values listed before and after "to" as a lower limit and an upper limit respectively.

In the present specification, $Re(\lambda)$ represents an in-plane retardation at a wavelength $\lambda$, and $Rth(\lambda)$ represents a retardation in a thickness direction at a wavelength $\lambda$. The unit of $Re(\lambda)$ and $Rth(\lambda)$ is nm. $Re(\lambda)$ is measured by causing light having a wavelength of $\lambda$ nm to be incident on a film in a normal direction of the film in KOBRA 21ADH or WR (manufactured by Oji Scientific Instruments). At the time of selecting the wavelength $\lambda$ nm used for the measurement, by manually replacing a wavelength selective filter or changing the measurement values by using a program or the like, the wavelength can be measured. In a case where the film to be measured is represented by a uniaxial or biaxial optical indicatrix, $Rth(\lambda)$ is calculated by the method described below. This measurement method is also partially used for measuring an average tilt angle of disk-like liquid crystal molecules in an optically anisotropic layer, which will be described later, of an alignment layer side and measuring the average tilt angle of the opposite side.

For measuring $Rth(\lambda)$, an in-plane slow axis (determined by KOBRA 21ADH or WR) is regarded as an axis of inclination (rotation axis) (in a case where no slow axis exists, any direction within the plane of a film is regarded as a rotation axis), and light having a wavelength of $\lambda$ nm is caused to be incident on the film in a direction which inclines stepwise up to 50° to one side by 10° from the normal direction of the film. In this way, Re(λ) is measured at six spots in total, and KOBRA 21ADH or WR calculates Rth(λ) based on the measured retardation values, the assumptive value of an average refractive index, and the input value of film thickness. In the aforementioned method, in a case where a film is used in which a retardation value becomes zero along a certain direction at an angle of inclination about the in-plane slow axis as the rotation axis in the normal direction, the sign of the retardation value at an angle of inclination larger than the aforementioned angle of inclination is changed to a negative sign, and then KOBRA 21ADH or WR calculates Rth (λ). Herein, retardation values can be measured in any two inclined directions about the slow axis as the axis of inclination (rotation axis) (in a case where no slow axis exists, any direction within the plane of the film is used as a rotation axis), and based on the values, the assumptive value of an average refractive index, and the input value of film thickness, Rth can be calculated from Formula (A) and Formula (B).

$$Re(\theta) = \left[nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}}$$

Formula (A)

In the formula, Re(θ) represents a retardation value in a direction inclining at an angle of θ from the normal direction. In Formula (A), nx represents a refractive index in the slow axis direction within the plane, ny represents a refractive index in a direction orthogonal to nx within the plane, and nz represents a refractive index in a direction orthogonal to nx and ny. d represents a film thickness.

$$Rth=((nx+ny)/2-nz) \times d$$

Formula (B)

In a case where the film to be measured is a film which cannot be expressed as a uniaxial or biaxial optical indicatrix and does not have a so-called optic axis, Rth(λ) is calculated by the method described below. For obtaining Rth(λ), an in-plane slow axis (determined by KOBRA 21ADH or WR) is regarded as an axis of inclination (rotation axis), and light having a wavelength of λ nm is caused to be incident on a film in a direction inclining stepwise up to +50° from −50° by 10° with respect to the normal direction of the film. In this way, the aforementioned Re(λ) is measured at 11 spots in total, and based on the measured retardation values, the assumptive value of an average refractive index, and the input value of film thickness, KOBRA 21ADH or WR calculates Rth (λ). In the measurement described above, as the hypothetical average refractive index, it is possible to use values listed in Polymer Handbook (JOHN WILEY & SONS, INC) and in catalogues of various optical films. For the film whose average refractive index is not known, the average refractive index can be measured using an Abbe refractometer. For example, the values of the average refractive indices of main optical films are as below: cellulose acylate film (1.48), cycloolefin polymer (1.52), polycarbonate (1.59), polymethyl methacrylate (1.49), polystyrene (1.59). In a case where these assumptive values of average refractive index and the film thickness are input into KOBRA 21ADH or WR, the device calculates nx, ny, and nz. From the calculated nx, ny, and nz, Nz=(nx−nz)/(nx−ny) is additionally calculated.

In the present specification, "absorption axis" and "transmission axis" of a polarizer or a polarizing plate mean directions that intersect at an angle of 90°.

In the present specification, "slow axis" of a phase difference film or the like means a direction along which a refractive index is maximized.

In the present specification, the numerical values, the range of numerical values, and the qualitative expressions (for example, expressions such as "equivalent" and "same") showing the optical characteristics of various members such as a phase difference region, a phase difference film, and a liquid crystal layer are interpreted as showing the numerical values including generally accepted errors, the range of numerical values, and the properties of liquid crystal display devices or members used in the devices.

In the present specification, "front" means a normal direction with respect to a display surface.

In the present specification, unless otherwise specified, a measurement wavelength is 550 nm.

In the present specification, an angle (for example, an angle of "90°" or the like) and an angular relationship (for example, "orthogonal", "parallel", "intersecting at 45°", or the like) includes a margin of error acceptable in the technical field to which the present invention belongs. For example, the aforementioned angle may be within a range less than an accurate angle±10°. The difference between the angle and an accurate angle is preferably equal to or smaller than ±5°, and more preferably equal to or smaller than ±3.

The vertical alignment of a disk-like liquid crystal compound means that the disk-like liquid crystal compound is aligned such that the plane of the compound forms a polar angle of 0° with respect to a support. The direction of a director of the vertically aligned disk-like liquid crystal compound is parallel to the support.

The horizontal alignment of a disk-like liquid crystal compound means that the disk-like liquid crystal compound is aligned in a state where the plane of the disk-like liquid crystal compound is parallel to the support. The direction of a director of the horizontally aligned disk-like liquid crystal compound is perpendicular to the support.

In a case where at least two sheets of patterned optical anisotropic layers are formed by the vertical alignment of a disk-like liquid crystal compound, the angle thereof may vary within a range of ±15°. In the present invention, the alignment state can be checked using Axo Scan (OPMF-1, manufactured by Axometrics, Inc).

[Laminate]

The laminate of the present invention includes a first patterned polarizer, a second patterned polarizer, a patterned optical anisotropic layer disposed between the first patterned polarizer and the second patterned polarizer, and an optically anisotropic layer disposed between the first patterned polarizer and the patterned optical anisotropic layer; in which the laminate comprises one sheet of the patterned optical anisotropic layer; each of the first patterned polarizer and the second patterned polarizer has two or more polarization regions having different absorption axis directions in a plane of the first patterned polarizer or the second patterned polarizer; the patterned optical anisotropic layer has two or more phase difference regions having different slow axis directions in a plane of the patterned optical anisotropic layer; an angle formed between the absorption axis of each of the polarization regions of the second patterned polarizer and the slow axis of each of the phase difference regions of the patterned optical anisotropic layer that is superposed on each of the polarization regions of the second patterned polarizer is 0°±5° or 90°±5°; an absolute value of a retardation Rth of the optically anisotropic layer at a wavelength of 550 nm in a film thickness direction of the optically anisotropic layer is 50 to 150 nm; at least one of the first patterned polarizer or the second patterned polarizer is movable; and a white display state, in which an angle formed between the absorption axis of each of the polarization regions of the first patterned polarizer and the absorption axis of each of the polarization regions of the second patterned polarizer that is superposed on each of the polarization regions of the first patterned polarizer is 0°±5° and a transmittance obtained in a case where light incident on the first patterned polarizer exits from the second patterned polarizer is maximized, and a black display state, in which an angle formed between the absorption axis of each of the polarization regions of the first patterned polarizer and the absorption axis of each of the polarization regions of the second patterned polarizer that is superposed on each of the polarization regions of the first patterned polarizer is 90°±5° and the transmittance obtained in a case where the light incident on the first patterned polarizer exits from the second patterned polarizer is minimized, are switched with each other.

According to the laminate of the present invention constituted as above, it is possible to provide a laminate in which the white display state and the black display state are switched with each other in a case where light is incident on the laminate, and the brightness of the black display state is low in the front and in all directions.

The laminate of the present invention includes two preferable aspects described below.

The first preferable aspect of the laminate of the present invention is a laminate in which each of the first patterned polarizer and the second patterned polarizer has first polarization regions and second polarization regions which have different absorption axis directions in the plane thereof and alternate with each other, an angle formed between the absorption axis direction of each of the first polarization regions and the absorption axis direction of each of the second polarization regions is 90°±5°; the patterned optical anisotropic layer has first phase difference regions and second phase difference regions which have different slow axis directions in the plane thereof and alternate with each other, an angle formed between the slow axis direction of each of the first phase difference regions and the slow axis direction of each of the second phase difference regions is 90°±5°; and an angle formed between the absorption axis of each of the first polarization regions of the second patterned polarizer and the slow axis of each of the first phase difference regions of the patterned optical anisotropic layer that is superposed on each of the first polarization regions of the second patterned polarizer is 0°±5° or 90°±50.

The second preferable aspect of the laminate of the present invention is a laminate in which each of the first patterned polarizer and the second patterned polarizer has three or more polarization regions which have different absorption axis directions in the plane thereof and in which the absorption axis directions continuously change; the patterned optical anisotropic layer has three or more phase difference regions which have different slow axis directions in the plane thereof and in which the slow axis directions continuously change; and an angle formed between the absorption axis of each of the polarization regions of the second patterned polarizer and the slow axis of each of the phase difference regions of the patterned optical anisotropic layer that is superposed on each of the polarization regions of the second patterned polarizer is 0°±5° or 90°±5.

Due to the constitutions of the laminate of the present invention, in the laminate of the present invention, the white display state and the black display state are switched with each other in a case where light is incident on the laminate, and the brightness of the black display state is low in the front and in all directions.

In the laminate of the present invention, by moving at least one of the first patterned polarizer or the second patterned polarizer, the combination of the first patterned polarizer as well as the second patterned polarizer and the phase difference regions of the patterned optical anisotropic layer can be changed. As a result, the absorption axis and a transmission axis of any one of the patterned polarizers in the laminate can be slid. Accordingly, it is possible to control the transmittance of light which is incident on one patterned polarizer in the laminate and then exits from the other patterned polarizer.

Figure 3:
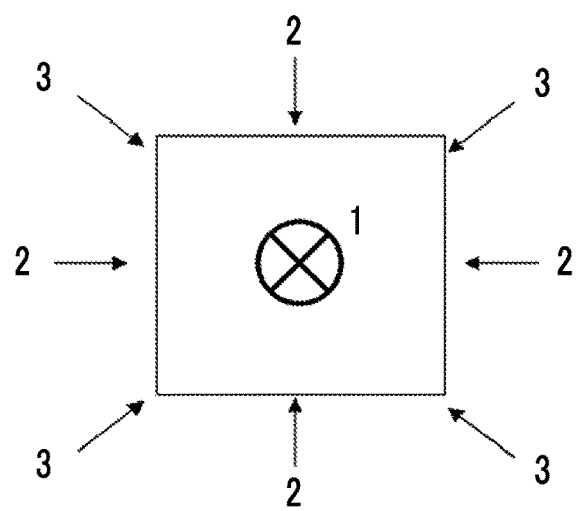
FIG. 3 is a schematic view illustrating a front direction, an oblique on-axis direction, and an oblique off-axis direction of the laminate.

FIG. 3 is a schematic view illustrating a front direction, an oblique on-axis direction, and an oblique off-axis direction of the laminate. The state where the brightness of the black display state is low in the front and in all directions means that the brightness of the black display state is low in a case where light is incident on the laminate and the black display state is observed in a front direction 1 of the laminate, the brightness of the black display state is low in a case where the black display state is observed in an oblique on-axis direction 2 (azimuthal angles of 0°, 90°, 180°, and 270°) of the laminate, and the brightness of the black display state is low in a case where the black display state is observed in an oblique off-axis direction 3 of the laminate (in a case where the azimuthal angle is not 0°, 90°, 180°, and 270°).

In the laminate of the present invention, an angle formed between the absorption axis of each of the polarization regions of the second patterned polarizer and the slow axis of each of the phase difference regions of the patterned optical anisotropic layer that is superposed on each of the polarization regions of the second patterned polarizer is 0°±5° or 90°±5°, and the white display state, in which an angle formed between the absorption axis of each of the polarization regions of the first patterned polarizer and the absorption axis of each of the polarization regions of the second patterned polarizer that is superposed on each of the polarization regions of the first patterned polarizer is 0°±5° and the transmittance obtained in a case where the light incident on the first patterned polarizer exits from the second patterned polarizer is maximized, and the black display state, in which an angle formed between the absorption axis of each of the polarization regions of the first patterned polarizer and the absorption axis of each of the polarization regions of the second patterned polarizer that is superposed on each of the polarization regions of the first patterned polarizer is 90°±5° and the transmittance obtained in a case where the light incident on the first patterned polarizer exits from the second patterned polarizer is minimized, are switched with each other. The aforementioned positional relationship between the absorption axis of each of the polarization regions of each of the patterned polarizers and the slow axis of the patterned optical anisotropic layer is maintained all the time. Therefore, in all the cases where the white display state of the laminate of the present invention is observed in the front direction 1 in FIG. 3; the white display state is observed in the oblique on-axis direction 2 in FIG. 3; the black display state is observed in the front direction 1 in FIG. 3; and the black display state is observed in the oblique on-axis direction 2 in FIG. 3, the tints of the white display state and the black display state are excellent in the front and in the oblique on-axis direction, and the brightness of the black display state is low in the front and the oblique on-axis direction (light leakage less occurs).

Furthermore, because the optically anisotropic layer having specific optical characteristics is used in the laminate of the present invention, in a case where the black display state of the laminate of the present invention is observed in an oblique off-axis direction 3 in FIG. 3, the polarizing plate can be compensated, and the brightness of the black display state in the oblique off-axis direction can be lowered (light leakage less occurs).

In the laminate of the present invention in which the optically anisotropic layer having specific optical characteristics is used, the brightness of the black display state is lower in the front and in all directions than in a laminate in which the optically anisotropic layer compensating the polarizing plate is not used. The reason will be described using FIGS. 4 to 6.

Figure 4:
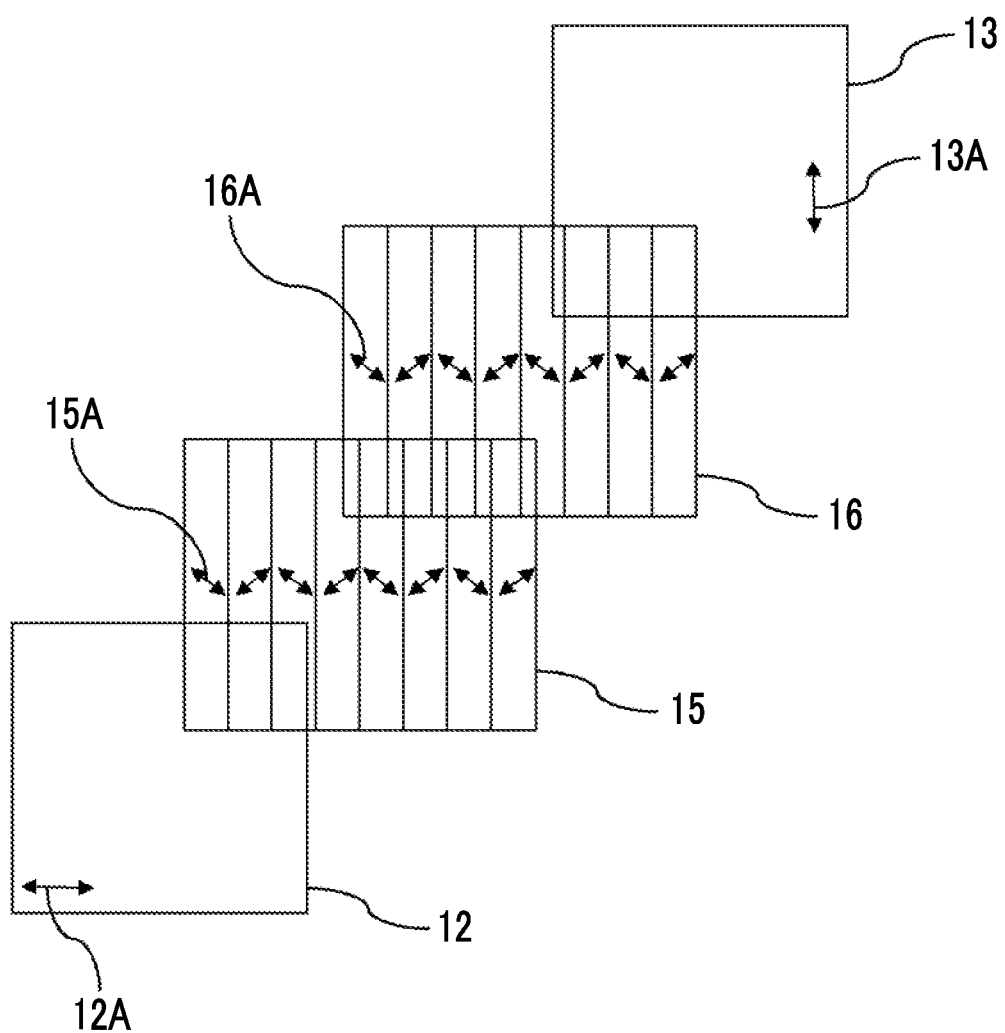
FIG. 4 is a perspective exploded view of an example of a laminate without an optically anisotropic layer.
Figure 5:
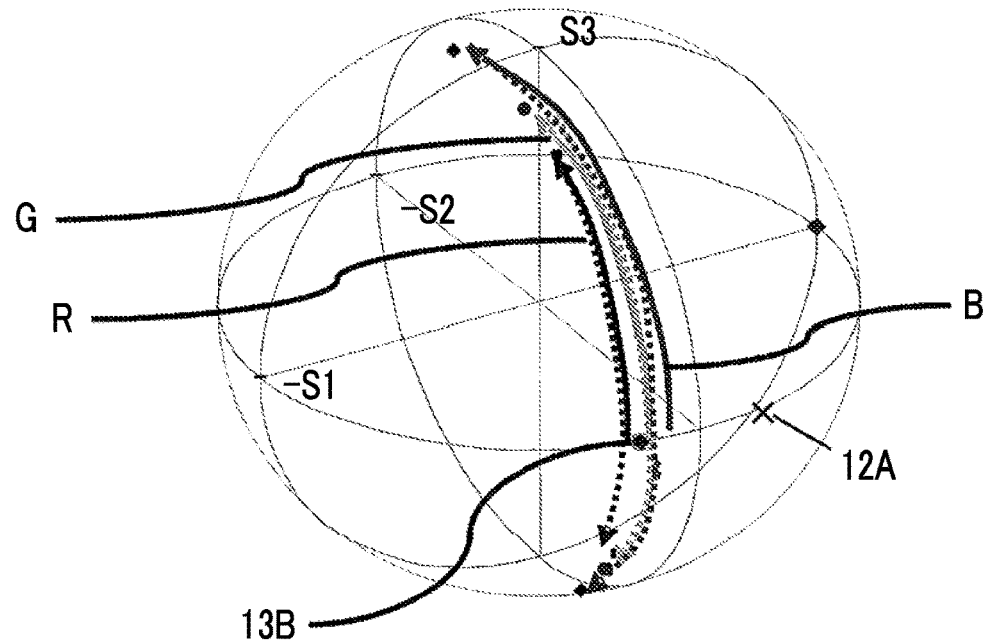
FIG. 5 is a schematic view illustrating one of the reasons why the brightness of a black display state on an oblique off-axis is not reduced in an example of the laminate without an optically anisotropic layer, by using the Poincare sphere.
Figure 6:
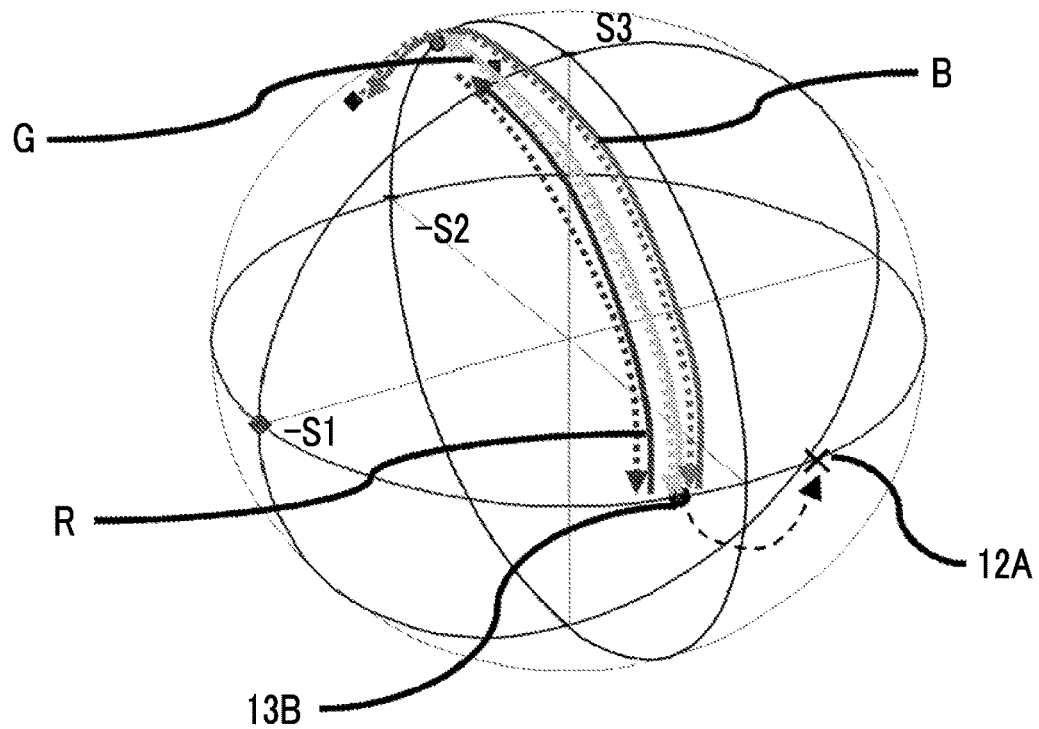
FIG. 6 is a schematic view illustrating another reason why the brightness of the black display state on the oblique off-axis is not reduced in an example of the laminate without an optically anisotropic layer, by using the Poincare sphere.

FIG. 4 is a perspective exploded view of an example of a laminate without an optically anisotropic layer. In a case where an optically anisotropic layer having specific optical characteristics is not provided, that is, in the laminate constituted as shown in FIG. 4, light leakage more seriously occurs at the time of observing the black display state in the oblique off-axis direction 3 in FIG. 3, than in the laminate of the present invention. FIG. 5 is a schematic view illustrating one of the reasons why the brightness of the black display state on the oblique off-axis is not reduced in the example of the laminate constituted as shown in FIG. 4 that does not have an optically anisotropic layer by using the Poincare sphere. FIG. 5 shows an example in which the black display state is observed in the oblique off-axis direction 3 in FIG. 3 in a case where both the patterned optical anisotropic layer 15 and the second patterned optical anisotropic layer 16 are +A-plates having normal wavelength dispersion. In FIG. 5, even if Rth of the patterned optical anisotropic layer 15 and Rth of the second patterned optical anisotropic layer 16 have the same sign; the patterned optical anisotropic layer 15 and the second patterned optical anisotropic layer 16 have the same type of wavelength dispersion; and the absolute values of Rth of the patterned optical anisotropic layer 15 and the second patterned optical anisotropic layer 16 are the same as each other, the rotation amounts are different while the rotation axes are the same as each other. Accordingly, the light (in FIGS. 5 and 6, red light R, green light G, and blue light B in this order from the left of the page) incident on the transmission axis 13B of the second polarizer does not completely return to the absorption axis 12A of the first polarizer, and serious light leakage occurs. FIG. 6 shows an example in which the black display state is observed in the oblique off-axis direction 3 in FIG. 3 in a case where the patterned optical anisotropic layer 15 constituted as shown in FIG. 4 is a +A-plate having normal wavelength dispersion while the second patterned optical anisotropic layer 16 constituted as shown in FIG. 4 is a −A-plate having normal wavelength dispersion. It is understood that, in FIG. 6, even if Rth of the patterned optical anisotropic layer 15 and Rth of the second patterned optical anisotropic layer 16 have different signs; the patterned optical anisotropic layer 15 and the second patterned optical anisotropic layer 16 have the same type of wavelength dispersion; and the absolute values of Rth of the patterned optical anisotropic layer 15 and the second patterned optical anisotropic layer 16 are the same as each other, the rotation axes and the rotation amounts are the same, but the light (red light R, green light G, and blue light B in this order from the left of the page) incident on the transmission axis 13B of the second polarizer does not reach the absorption axis 12A of the first polarizer which is an extinction point. In FIGS. 5 and 6, S1 represents a Stokes parameter 1 (linear polarization components at 0, 90°), S2 represents a Stokes parameter 2 (linear polarization component at 45, 135°), and S3 represents a Stokes parameter 3 (circular polarization component). In a case where the optically anisotropic layer having specific optical characteristics is provided to compensate the polarizing plate in the direction of the arrows with broken lines returning to the absorption axis 12A of the first polarizer in FIG. 6, and the light leakage occurring at the time of observing the black display state in the oblique off-axis direction 3 in FIG. 3 is not reduced, a laminate is obtained in which the brightness of the black display state is low in the front and in all directions.

In the laminate of the present invention, the white display state preferably has an excellent tint, and more preferably has an excellent tint in the front and in all directions. Furthermore, in the laminate of the present invention, the black display state preferably has an excellent tint, and more preferably has an excellent tint in the front and in all directions. As a result of conducting an examination, the inventors of the present invention have found that the constitution in JP2014-507676A also has a problem in that tinting occurs in the white display state and the black display state in the front. In contrast, in a preferable constitution of the laminate of the present invention, it is preferable that both the problem of the tints of the white display state and the black display state in the front and the problem of the brightness of the black display state in the front and in all direction can be simultaneously resolved.

In all the cases where the white display state of the laminate of the present invention is observed in the front direction 1 in FIG. 3; the white display state is observed in the oblique on-axis direction 2 in FIG. 3; the black display state is observed in the front direction 1 in FIG. 3; and the black display state is observed in the oblique on-axis direction 2 in FIG. 3, the tints of the white display state and the black display state in the front result for the same reasons as described above.

In a case where the white display state of the laminate of the present invention is observed in the oblique off-axis direction 3 in FIG. 3, from the viewpoint of the tint of the white display state, it is preferable that Re of the patterned optical anisotropic layer 15 has reciprocal wavelength dispersion, because then the patterned optical anisotropic layer may function as a λ/4 plate (abbreviation for a ¼ wavelength plate) in a wide wavelength range.

Preferable ranges of Re and Rth of the patterned optical anisotropic layer 15 will be described later.

<Constitution>

Figure 2:
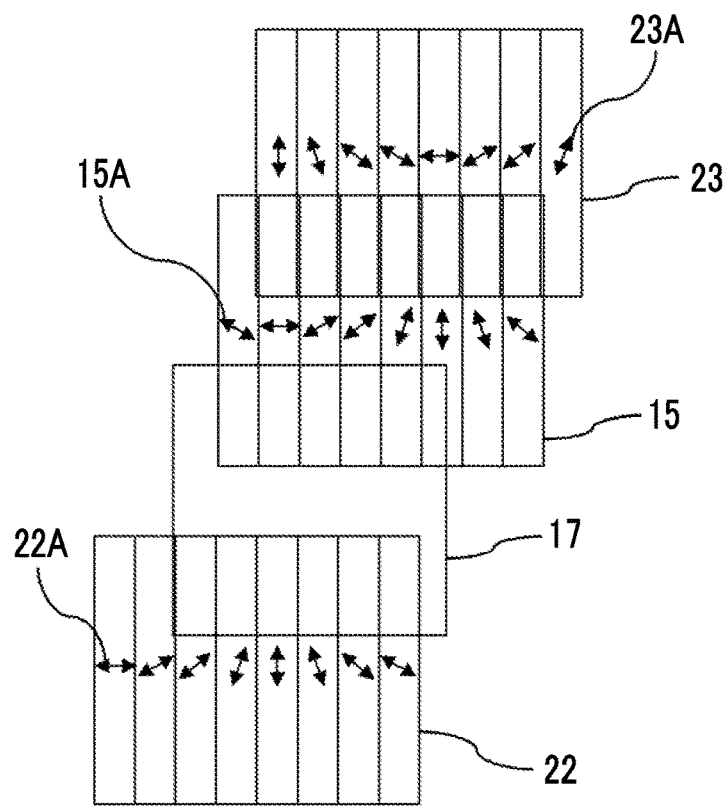
FIG. 2 is a perspective exploded view relating to an example of a second preferable aspect of the laminate of the present invention.

FIGS. 1 and 2 are perspective exploded views of an example of the laminate of the present invention. In the example shown in FIGS. 1 and 2, the laminate of the present invention includes a first patterned polarizer 22, a second patterned polarizer 23, the patterned optical anisotropic layer 15 disposed between the first patterned polarizer 22 and the second patterned polarizer 23, and an optically anisotropic layer 17 disposed between the first patterned polarizer 22 and the patterned optical anisotropic layer 15.

In the laminate of the present invention, the optically anisotropic layer 17 is disposed between the first patterned polarizer 22 and the patterned optical anisotropic layer 15. Therefore, compared to a laminate in which the optically anisotropic layer 17 is not disposed, the light leakage can be further inhibited because the loss of light can be compensated in the oblique off-axis direction, and the brightness of the black display state can be reduced in all directions.

In the laminate of the present invention, any of the first patterned polarizer and the second patterned polarizer may be on the viewing side. Accordingly, although the optically anisotropic layer is disposed between the first patterned polarizer 22 and the patterned optical anisotropic layer 15, an aspect, in which the optically anisotropic layer is disposed between the second patterned polarizer 23 and the patterned optical anisotropic layer 15, is substantially also included in the laminate of the present invention.

In the example of the laminate of the present invention shown in FIGS. 1 and 2, at least one of the first patterned polarizer 22 or the second patterned polarizer 23 is movable. Therefore, the white display state and the black display state can be switched with each other.

In the example of the laminate of the present invention shown in FIGS. 1 and 2, a white display state can be established in which an angle formed between the absorption axis of each of the polarization regions of the first patterned polarizer 22 and the absorption axis of each of the polarization regions of the second patterned polarizer 23 that is superposed on each of the polarization regions of the first patterned polarizer 22 is 0°±5°, and the transmittance obtained in a case where the light incident on the first patterned polarizer 22 exits from the second patterned polarizer 23 is maximized.

Furthermore, in the example of the laminate of the present invention shown in FIGS. 1 and 2, a black display state can be established in which an angle formed between the absorption axis of each of the polarization regions of the first patterned polarizer 22 and the absorption axis of each of the polarization regions of the second patterned polarizer 23 that is superposed on each of the polarization regions of the first patterned polarizer 22 is 90°±5°, and the transmittance obtained in a case where the light incident on the first patterned polarizer 22 exits from the second patterned polarizer 23 is minimized.

It is preferable that the white display state and the black display state are switched with each other by an operation of sliding at least one of the first patterned polarizer 22 or the second patterned polarizer 23. The laminate of the present invention may include such a sliding mechanism. For example, in FIG. 1, it is preferable that a mechanism (not shown in the drawing) is provided which can move by means of sliding by the width of each of the first phase difference regions of the patterned optical anisotropic layer 15.

The relative relationship between the layers in terms of the position and/or the size shown in the perspective exploded views does not reflect an actual relative relationship. The same shall be applied to all the drawings.

As long as the gist of the present invention is not impaired, the laminate of the present invention may have a support not shown in the drawing, an alignment film not shown in the drawing, an adhesive layer or a pressure sensitive adhesive layer not shown in the drawing, and the like between each of the members. The pressure sensitive adhesive is not particularly limited, and an adhesive may be used. Examples of usable pressure sensitive adhesives include a rubber-based pressure sensitive adhesive, an acrylic pressure sensitive adhesive, a silicone-based pressure sensitive adhesive, a urethane-based pressure sensitive adhesive, a vinyl alkyl ether-based pressure sensitive adhesive, a polyvinyl alcohol-based pressure sensitive adhesive, a polyvinyl pyrrolidone-based pressure sensitive adhesive, a poly-acrylamide-based pressure sensitive adhesive, a cellulose-based pressure sensitive adhesive, and the like.

(Constitution of First Preferable Aspect)

FIG. 1 is a perspective exploded view relating to an example of the first preferable aspect of the laminate of the present invention.

In the example of the first preferable aspect of the laminate of the present invention shown in FIG. 1, each of the first patterned polarizer 22 and the second patterned polarizer 23 preferably has two or more polarization regions having different absorption axis directions in the plane thereof, and an angle formed between the absorption axis direction of each of the first polarization regions and the absorption axis direction of each of the second polarization regions is preferably 90°±5.

In the example of the first preferable aspect of the laminate of the present invention shown in FIG. 1, the patterned optical anisotropic layer 15 has first phase difference regions and second phase difference regions which have different slow axis directions within the plane thereof and alternate with each other, and an angle formed between the slow axis direction of each of the first phase difference region and the slow axis direction of each of the second phase difference region is 90°±5°. In FIG. 1, the patterned optical anisotropic layer 15 has the first phase difference regions and the second phase difference regions in the form of stripes in which the slow axis directions 15A of the patterned optical anisotropic layer are different from each other and which alternate with each other, and an angle formed between the slow axis direction of each of the first phase difference regions and the slow axis direction of each of the second phase difference regions is 90°±5°. The number of first phase difference regions and second phase difference regions (the number of repeating phase difference regions) is not particularly limited, but is preferably 1 to 1,000, more preferably 2 to 100, and particularly preferably 3 to 50.

In the example of the first preferable aspect of the laminate of the present invention shown in FIG. 1, it is preferable that an angle formed between the absorption axis of each of the first polarization regions of the second patterned polarizer 23 and the slow axis of each of the first phase difference regions of the patterned optical anisotropic layer 15 that is superposed on each of the first polarization regions of the second patterned polarizer 23 is preferably 0°±5° or 90°±5°.

(Constitution of Second Preferable Aspect)

FIG. 2 is a perspective exploded view relating to an example of the second preferable aspect of the laminate of the present invention.

In the example of the second preferable aspect of the laminate of the present invention shown in FIG. 2, each of the first patterned polarizer and the second patterned polarizer has three or more polarization regions which have different absorption axis directions in the plane thereof and in which the absorption axis directions continuously change. The number of polarization regions, which have different absorption axis directions and in which the absorption axis directions continuously change, is not particularly limited because the number varies with the way the polarization regions are divided. However, the number of polarization regions is preferably 3 to 1,000, more preferably 5 to 100, and particularly preferably 10 to 50.

In the example of the second preferable aspect of the laminate of the present invention shown in FIG. 2, the patterned optical anisotropic layer 15 has three or more phase difference regions which have different slow axis directions in the plane thereof and in which the slow axis direction directions continuously change. The number of phase difference regions, which have different slow axis directions and in which the slow axis directions continuously change, is not particularly limited because the number varies with the way the phase difference regions are divided. However, the number of phase difference regions is preferably 3 to 1,000, more preferably 5 to 100, and particularly preferably 10 to 50. It is preferable that the number of phase difference regions, which have different slow axis directions and in which the slow axis directions continuously change, is approximately the same as the number of polarization regions which have different absorption axis directions and in which the absorption axis directions continuously change. It is more preferable that the number of phase difference regions is reduced by the number of polarization regions that become dead spaces due to a sliding mechanism.

In the example of the second preferable aspect of the laminate of the present invention shown in FIG. 2, it is preferable that an angle formed between the absorption axis of each of the polarization regions of the second patterned polarizer 23 and the slow axis of each of the phase difference regions of the patterned optical anisotropic layer 15 that is superposed on each of the polarization regions of the second patterned polarizer 23 is 0°±5° or 90°±5°.

<First Patterned Polarizer and Second Patterned Polarizer>

The laminate of the present invention has the first patterned polarizer and the second patterned polarizer. The constitutions common to the first patterned polarizer and the second patterned polarizer will be collectively described as a patterned polarizer.

The patterned polarizers included in the laminate of the present invention are not particularly limited, and a wide variety of patterned polarizers used in the related art can be used. The patterned polarizers include an iodine-based polarizer, a colorant-based polarizer in which a dichroic colorant is used, a polyene-based polarizer, and a polarizer in which a material causing polarization by absorbing ultraviolet (UV) is used. In the present invention, any of these may be used. The iodine-based polarizer and the colorant-based polarizer are generally manufactured using a polyvinyl alcohol-based film. Regarding the method for manufacturing the patterned polarizer, for example, the description of the light-absorbable anisotropic film in paragraphs "0009" to "0216" in JP2011-215337A and the like can be referred to, the content of which is incorporated into the present specification. Furthermore, the patterned polarizers may be layers formed by coating.

As the polarizer in which a material causing polarization by UV absorption is used, a material may be used in which both the degree of polarization and the concentration are increased by UV absorption. By using the polarizer, in which a material causing polarization by UV absorption is used, as the first patterned polarizer or the second patterned polarizer, in a case where the laminate of the present invention absorbs UV, the first patterned polarizer or the second patterned polarizer exhibits polarizance, and hence the display state can be switched with the black display state. The laminate of the present invention also includes an aspect wherein the polarizer, in which a material causing polarization by UV absorption is used, is used as the first patterned polarizer or the second patterned polarizer. That is, the first patterned polarizer or the second patterned polarizer in the present invention does not need to exhibit polarizance all the time, and may be able to exhibit polarizance as necessary. Examples of the polarizer, in which a material causing polarization by UV absorption is used, include polarizing lenses manufactured by Transitions Optical, Inc., and the like.

In the laminate of the present invention, each of the first patterned polarizer and the second patterned polarizer has two or more polarization regions having different absorption axis directions in the plane thereof. That is, the absorption axes of the patterned polarizers are not uniformly formed in the plane thereof.

The patterns that the first patterned polarizer and the second patterned polarizer have were described in the section of Constitution of the laminate of the present invention. The method for forming the patterns that the first patterned polarizer and the second patterned polarizer have is not particularly limited. For example, the patterns can be formed using a patterned alignment film in which desired patterns are formed.

Each of the polarization regions of one of the patterned polarizers is preferably in the form of a stripe. It is preferable that the stripe as each of the polarization regions of the patterned polarizer is set to be parallel to the stripe as each of the phase difference regions of the patterned optical anisotropic layer.

<Polarizing Plate-Protective Film>

The laminate of the present invention may have a polarizing plate-protective film for protecting the patterned polarizer, on at least one surface of the polarizer. In the aspect in which the patterned polarizer is a layer formed by coating, the polarizing plate-protective film may be used as a support of the patterned polarizer. The polarizing plate-protective film may be used as a support of the patterned optical anisotropic layer. The polarizing plate-protective film is not particularly limited, and the polymer films containing various polymer materials (meaning both the polymers and resins) as main components can be used. It is preferable to use films containing, as a main component, a polymer or a resin excellent in light-transmitting properties, mechanical strength, heat stability, moisture barrier properties, isotropy, and the like. Examples thereof include a polycarbonate-based polymer, a polyester-based polymer such as polyethylene terephthalate or polyethylene naphthalate, an acrylic polymer such as polymethyl methacrylate, a styrene-based polymer such as polystyrene or an acrylonitrile.styrene copolymer (AS resin), and the like. Examples thereof also include a polyolefin such as polyethylene or polypropylene, a polyolefin-based polymer such as an ethylene-propylene copolymer, a vinyl chloride-based polymer, an amide-based polymer such as nylon or aromatic polyamide, an imide-based polymer, a sulfone-based polymer, a polyethersulfone-based polymer, a polyether ether ketone-based polymer, a polyphenylene sulfide-based polymer, a vinylidene chloride-based polymer, a vinyl alcohol-based polymer, a vinyl butyral-based polymer, an arylate-based polymer, a polyoxymethylene-based polymer, an epoxy-based polymer, and a polymer obtained by mixing these polymers together. Furthermore, the polymer film of the present invention can be formed as a cured layer of an ultraviolet curable type or thermosetting type resin based on acryl, urethane, acrylurethane, epoxy, silicone, or the like.

As the polarizing plate-protective film, it is preferable to use a film containing, as a main component, at least one kind of compound selected from cellulose acylate, a cyclic olefin, an acrylic resin, a polyethylene terephthalate resin, and a polycarbonate resin.

In addition, commercially available products may be used. For example, Zeonex and Zeonor manufactured by ZEON CORPORATION, ARTON manufactured by JSR Corporation, and the like can be used. Furthermore, various commercially available cellulose acylate films can also be used.

As the polarizing plate-protective film, it is possible to use films formed by any of the methods including a solution film-forming method and a melt film-forming method. The thickness of the film is preferably 10 to 1,000 μm, more preferably 40 to 500 μm, and particularly preferably 40 to 200 μm.

The optical characteristics of the polarizing plate-protective film are not particularly limited. From the viewpoint of reducing the light leakage occurring at the time of observing the display state in the oblique direction, the polarizing plate-protective film is preferably an optically isotropic film, but the polarizing plate-protective film is not limited to this aspect. Specifically, the polarizing plate-protective film is preferably a film having Re(550) of 0 to 10 nm and an absolute value of Rth equal to or smaller than 20 nm.

Any of the layers included in the laminate of the present invention may contain an ultraviolet absorber so as to prevent the deterioration resulting from the solar light. The ultraviolet absorber may be added to any of the layers. For example, in an aspect, the polarizing plate-protective film contains the ultraviolet absorber. As the ultraviolet absorber, it is preferable to use an ultraviolet absorber which has an excellent ability to absorb ultraviolet rays having a wavelength equal to or shorter than 370 nm and absorbs the visible light having a wavelength equal to or longer than 400 nm as little as possible in view of the light-transmitting properties. Particularly, the transmittance of the ultraviolet absorber at a wavelength of 370 nm is desirably equal to or lower than 20%, preferably equal to or lower than 10%, and more preferably equal to or lower than 5%. Examples of such an ultraviolet absorber include an oxybenzophenone-based compound, a benzotriazole-based compound, a salicylic acid ester-based compound, a benzophenone-based compound, a cyanoacrylate-based compound, a nickel complex salt-based compound, a polymer ultraviolet absorbing compound containing the aforementioned ultraviolet-absorbing group, and the like. However, the present invention is not limited thereto, and two or more kinds of ultraviolet absorbers may be used.

In a case where the film containing an ultraviolet absorber is manufactured by a solution film-forming method, the ultraviolet absorber is added to a dope which is a solution of a main component polymer. The ultraviolet absorber may be added to the dope by a method in which the ultraviolet absorber is added after being dissolved in an alcohol or an organic solvent such as methylene chloride or dioxolane. The ultraviolet absorber may be directly added to the dope composition. The ultraviolet absorber such as inorganic powder that does not dissolve in an organic solvent is added to the dope after being dispersed in an organic solvent and the main component polymer by using a dissolver or a sand mill.

Regarding a cellulose acylate film, it is particularly preferable to improve the light fastness thereof by adding an ultraviolet absorber.

The amount of the ultraviolet absorber used with respect to 100 parts by mass of the main component of the polarizing plate-protective film is 0.1 to 5.0 parts by mass, preferably 0.5 to 2.0 parts by mass, and more preferably 0.8 to 2.0 parts by mass.

In a case where the light having a wavelength of 430 nm is incident on the patterned polarizer, it is preferable that the patterned polarizer exhibits a degree of polarization equal to or lower than 99.8%. The patterned polarizer exhibiting the aforementioned degree of polarization can be prepared by means of reducing the amount of iodine staining the film, reducing the total stretching ratio of polyvinyl alcohol, or the like in the general polarizing plate preparation step. Furthermore, as a light-transmitting substrate or a polarizing plate-protective film which is used as desired, it is preferable to use a film having optical characteristics in which the transmittance of the film is equal to or higher than 90%.

<Patterned Optical Anisotropic Layer>

The laminate of the present invention has a patterned optical anisotropic layer.

The first phase difference regions and the second phase difference regions of the patterned optical anisotropic layer in the first preferable aspect of the laminate of the present invention as well as the phase difference regions of the patterned optical anisotropic layer in the second preferable aspect of the laminate of the present invention will be collectively described as phase difference regions in some cases.

(Optical Characteristics)

In the patterned optical anisotropic layer of the laminate of the present invention, a retardation Re(550) at a wavelength of 550 nm in the in-plane direction thereof is preferably 110 to 160 nm, more preferably 120 to 150 nm, and particularly preferably 135 to 145 nm. From the viewpoint of the tint of the white display state, the tint of the black display state, and the reduction of the brightness of the black display state, Re(550) of the patterned optical anisotropic layer is preferably close to $\lambda/4$. Particularly, it is preferable that Re(550) of the patterned optical anisotropic layer is within the above range, and the patterned optical anisotropic layer is disposed such that an angle formed between the slow axis of the patterned optical anisotropic layer and the absorption axis of the first patterned polarizer or the second patterned polarizer becomes 90°±5°. It is more preferable that the patterned optical anisotropic layer is disposed such that an angle formed between the slow axis of the patterned optical anisotropic layer and the absorption axis of the second patterned polarizer becomes 90°±5°, and only the first patterned polarizer is made movable while the second patterned polarizer is immobilized.

The retardation Rth(550) of the patterned optical anisotropic layer at a wavelength of 550 nm in the film thickness direction thereof is preferably 55 to 80 nm, more preferably 60 to 77 nm, and particularly preferably 65 to 75 nm. It is preferable that Rth(550) of the patterned optical anisotropic layer is close to $\lambda/8$, because then a discrepancy between the final polarization state and the polarization state of the extinction point can be reduced at the time of the patterned optical anisotropic layer is combined with a +C-plate.

In the laminate of the present invention, from the viewpoint of ease of patterning, the combination of the patterned optical anisotropic layer and the optically anisotropic layer is preferably a combination of a +A-plate and a +C-plate or a combination of a −A-plate and a −C-plate. Particularly, in the laminate of the present invention, from the viewpoint of realizing reciprocal wavelength dispersion, the combination of the patterned optical anisotropic layer and the optically anisotropic layer is more preferably a combination of a +A-plate and a +C-plate.

In the laminate of the present invention, it is preferable that the +A-plate as the patterned optical anisotropic layer has reciprocal wavelength dispersion in which the retardation Re(450) at a wavelength of 450 nm in the in-plane direction, the retardation Re(550) at a wavelength of 550 nm in the in-plane direction, and the retardation Re(630) at a wavelength of 630 nm in the in-plane direction satisfy Re(450)/Re(550)<1 or Re(630)/Re(550)>1, because then the wavelength dependency of the polarization state can be reduced.

In the wavelength dispersion of the retardation Re of the patterned optical anisotropic layer in the in-plane direction, Re(450)/Re(550) is preferably 0.75 to 0.95, more preferably 0.80 to 0.90, and particularly preferably 0.83 to 0.88, and Re(630)/Re(550) is preferably 1.03 to 1.25, more preferably 1.04 to 1.20, and particularly preferably 1.05 to 1.15.

In the wavelength dispersion of the retardation Rth of the patterned optical anisotropic layer in the film thickness direction, Rth(450)/Rth(550) is preferably 0.75 to 0.95, more preferably 0.80 to 0.90, and particularly preferably 0.83 to 0.88, and Rth(630)/Rth(550) is preferably 1.03 to 1.25, more preferably 1.04 to 1.20, and particularly preferably 1.05 to 1.15.

In the laminate of the present invention, the patterned optical anisotropic layer preferably contains a liquid crystal compound. The liquid crystal compound used in the patterned optical anisotropic layer will be described later.

(Patterned Optical Anisotropic Layer in First Preferable Aspect)

An example of the patterned optical anisotropic layer 15 in the first preferable aspect of the laminate of the present invention has first phase difference regions and second phase difference regions which have different slow axis directions in the plane thereof and alternate with each other, and an angle formed between the slow axis direction of each of the first phase difference region and the slow axis direction of each of the second phase difference regions is 90°±5°.

For example, the patterned optical anisotropic layer 15 is preferably a patterned optical anisotropic layer in which the first phase difference regions and the second phase difference regions are disposed in the plane thereof as patterns each having a width L of 1 mm to 50 mm in any direction in the plane.

The width of each of the phase difference regions shows the distance between two boundary portions adjacent to each other in a boundary portion which is a boundary between each of the first phase difference regions and each of the second phase difference regions. Herein, the distance between boundary portions refers to the shortest distance between a mean plane of one end of one phase difference region in the film thickness direction and a mean plane of the end of an adjacent phase difference region close to the aforementioned phase difference region in the film thickness direction. The mean plane refers to a reference plane which can be conceived in a case where the plane at the end of the phase difference region in the thickness direction is a rough surface and the rough surface is assumed to be a plane that is flat.

L is preferably 1 mm to 50 mm. From the viewpoint of the light control function, L is preferably within this range. Considering the effect of hiding the misalignment of slow axis in the boundary between each of the first phase difference regions and each of the second phase difference regions, the width L of each of the phase difference regions is preferably equal to or greater than 5 mm. In contrast, it is preferable that L is not too large, because then the number of dead spaces, which are for moving the patterned optical anisotropic layer 15 by the width of each of the phase difference regions at the time of switching the light blocking mode and the transmission mode with each other, does not increase.

L1 means the width of a boundary portion. The width of a boundary portion refers to the shortest distance between a mean plane of one end of a single phase difference region in the thickness direction and a mean plane of the end of a phase difference region adjacent to the aforementioned phase difference region that is close to the aforementioned phase difference region in the thickness direction. In the present invention, it is preferable that the distance (width of each phase difference region) L between two boundary portions adjacent to each other and the width L1 of the boundary portion satisfy Formula (a).

$$100 \leq L/L1 \leq 5{,}000 \qquad \text{Formula (a)}$$

L and L1 preferably satisfy $200 \leq L/L1 \leq 5{,}000$, more preferably satisfy $400 \leq L/L1 \leq 5{,}000$, and even more preferably satisfy $500 \leq L/L1 \leq 5{,}000$.

It is preferable that the first phase difference regions and the second phase difference regions have the same shape. Furthermore, it is preferable that the first phase difference regions and the second phase difference regions are equally disposed. In the present embodiment, the patterned optical anisotropic layers have a structure in which the first phase difference regions and the second phase difference regions are alternately disposed in this order in the form of stripes respectively. However, the shape of the phase difference regions is not limited to the stripe. Furthermore, in the present embodiment, the stripe may be formed in the longitudinal direction of the film or in a direction perpendicular to the longitudinal direction.

In the first preferable aspect of the laminate of the present invention, it is preferable that at least the in-plane slow axis directions of the first phase difference regions and the second phase difference regions are different from each other. It is more preferable that the in-plane slow axis directions are parallel or orthogonal to any side (preferably the stripe formed by each of the phase difference regions, that is, the longitudinal direction of the first phase difference regions or the second phase difference regions). In the laminate of the present invention, an angle formed between the slow axis of each of the first phase difference regions and the longitudinal direction of each of the first phase difference regions or the second phase difference regions is preferably equal to or greater than −30° and equal to or smaller than 30° (alternatively, in a case where the combination of the first phase difference regions or the second phase difference regions is opposed to the combination described above, the angle is preferably equal to or greater than 60° or equal to or smaller than 120°, the same shall be applied to the following description), and an angle formed between the slow axis of each of the second phase difference regions and the longitudinal direction of each of the first phase difference regions or the second phase difference regions is preferably equal to or greater than 60° and equal to or smaller than 120° (or equal to or greater than −30° and equal to or smaller than 30°). An angle formed between the slow axis of each of the first phase difference regions and the longitudinal direction of each of the first phase difference regions or the second phase difference regions is more preferably 0° (or 90°), and an angle formed between the slow axis of each of the second phase difference regions and the longitudinal direction of each of the first phase difference regions or the second phase difference regions is more preferably 90° (or 0°).

In the first preferable aspect of the laminate of the present invention, it is preferable that the retardation Re1(550) of the patterned optical anisotropic layer at a wavelength of 550 nm in the in-plane direction and the retardation Re2(550) of the second patterned optical anisotropic layer at a wavelength of 550 nm in the in-plane direction are each independently 110 to 135 nm and satisfy Formula (1).

$$\text{Re2(550)}=\text{Re1(550)}+10 \text{ nm} \qquad (1)$$

In the first preferable aspect of the laminate of the present invention, from the viewpoint of improving the tint of the white display state, the retardation Re1(550) of the patterned optical anisotropic layer at a wavelength of 550 nm in the in-plane direction and the retardation Re2(550) of the second patterned optical anisotropic layer at a wavelength of 550 nm in the in-plane direction are each independently more preferably 110 to 130 nm, particularly preferably 110 to 125 nm, and more particularly preferably 110 to 120 nm.

It is preferable that at least one of the upper layer or the underlayer of the patterned optical anisotropic layer has a colorant portion disposed in a position corresponding to the boundary portion. In a case where the colorant portion is provided, it is possible to inhibit the light control function from being disturbed due to the light leakage from the boundary portion. The colorant portion is a portion in which the light-transmitting properties are reduced due to a colorant contained therein. It is preferable that the colorant portion is black or is of a color similar to black by containing one kind of colorant or two or more kinds of colorants.

The width of the colorant portion is appropriately set in view of the uniformity of in-plane brightness of the transmission state, and is preferably 10% to 70% and more preferably 30% to 50% of the distance (width of each phase difference region) L between two adjacent boundary portions.

The patterned optical anisotropic layer is formed on the surface of a support formed of a polymer film or the like, and may be incorporated into the laminate of the present invention together with the support. It is preferable that the support of the patterned optical anisotropic layer is incorporated into the laminate, because then the support can also be used as a polarizing plate-protective film. As the support, a light-transmitting polymer film is preferable. Examples of polymer films usable as the support are the same as the examples of polymer films usable as the polarizing plate-protective film. It is preferable that the sum of Rth of the support and Rth of the patterned optical anisotropic layer satisfies |Rth|≤20 nm. In order for the aforementioned expression to be satisfied, it is preferable that the support satisfies −150 nm≤Rth(630)≤100 nm.

In a case where the patterned optical anisotropic layer includes the boundary portion having the width L1 that is between the first phase difference region and the second phase difference region adjacent to each other, for the purpose of reducing the light leakage and the like, it is preferable that the patterned optical anisotropic layer has a colorant portion (preferably a black stripe) disposed in the position corresponding to the boundary portion.

The colorant portion is preferably included in at least one of the upper layer or the underlayer of the patterned optical anisotropic layer. From the viewpoint of reducing the light leakage, it is preferable that the colorant portion is preferably black or is of a color similar to black. It is preferable that the colorant portion contains one kind of colorant or two or more kinds of colorants such that an excellent color results. Examples of usable colorants include colorants used in the related art for forming a black matrix of color filters, and the like.

The colorant portion can be formed on the patterned optical anisotropic layer and the like by using printing methods, for example. As one of the printing methods, a flexographic printing method can be exemplified.

(Patterned Optical Anisotropic Layer in Second Preferable Aspect)

In the second preferable aspect of the laminate of the present invention, patterned optical anisotropic layer has three or more phase difference regions which have different slow axis directions in the plane thereof and in which the slow axis directions continuously change.

Each of the phase difference regions preferably has a stripe shape. A preferable width of the stripe is the same as the preferable width of the stripe of the first phase difference regions and the second phase difference regions of the patterned optical anisotropic layer in the first preferable aspect.

(Material of Patterned Optical Anisotropic Layer)

As the material of the patterned optical anisotropic layer, a liquid crystal composition containing a liquid crystal compound is preferable. The liquid crystal composition is more preferably a polymerizable liquid crystal composition containing a liquid crystal compound having a polymerizable group.

As one of the liquid crystal compositions used for forming the patterned optical anisotropic layer, a liquid crystal composition can be exemplified which contains at least one kind of liquid crystal compound having a polymerizable group and at least one kind of alignment control agent. The liquid crystal composition may also contain other components such as a polymerization initiator, a sensitizer, and an alignment aid.

Hereinafter, each of the materials will be specifically described.

—Liquid Crystal Compound—

The liquid crystal compound can be appropriately selected according to the values of Re and Rth of the patterned optical anisotropic layer and the design of the wavelength dispersion of Re and Rth of the patterned optical anisotropic layer.

—Smectic Liquid Crystal Compound—

In order to make the patterned optical anisotropic layer has reciprocal wavelength dispersion as wavelength dispersion of Re, for example, it is preferable to use a smectic liquid crystal compound described below.

The smectic liquid crystal compound refers to a compound which enables the formed patterned optical anisotropic layer or optically anisotropic layer to exhibit the properties of a smectic liquid crystal.

The patterned optical anisotropic layer or the optically anisotropic layer exhibiting the properties of a smectic liquid crystal also includes a patterned optical anisotropic layer or an optically anisotropic layer that does not perfectly exhibit the properties of a smectic liquid crystal compound due to curing and the like. Furthermore, the aforementioned patterned optical anisotropic layer or the optically anisotropic layer includes not only an optically anisotropic layer in which an alignment order parameter, which will be described later, is within a range equal to or greater than 0.8 and equal to or smaller than 1.0, but also an optically anisotropic which has one peak within a range of 2θ, which is an angle formed between an incident beam and a diffracted beam, of 1° to 3° determined by measuring a period in a direction parallel to the alignment direction of liquid crystals by using X-ray diffractometry.

Among these smectic liquid crystal compounds, a compound not containing a fluorine atom in the molecule is preferably used.

As the smectic liquid crystal compound, a compound having at least three ring structures selected from the group consisting of a benzene ring and a cyclohexane ring is preferable, because such a compound easily expresses smectic properties by the quasi-phase separation between a rigid mesogen and a flexible side chain and exhibits sufficient rigidity.

Furthermore, from the viewpoint of imparting moisture-heat resistance to the patterned optical anisotropic layer, a compound is preferable which has two or more polymerizable groups (for example, a (meth)acryloyl group, a vinyl group, a styryl group, an allyl group, and the like).

The description of "(meth)acryloyl group" represents an acryloyl group or a methacryloyl group.

Specific examples of the aforementioned smectic liquid crystal compound include compounds represented by Formulae L-1, L-3, and L-6, and the like.

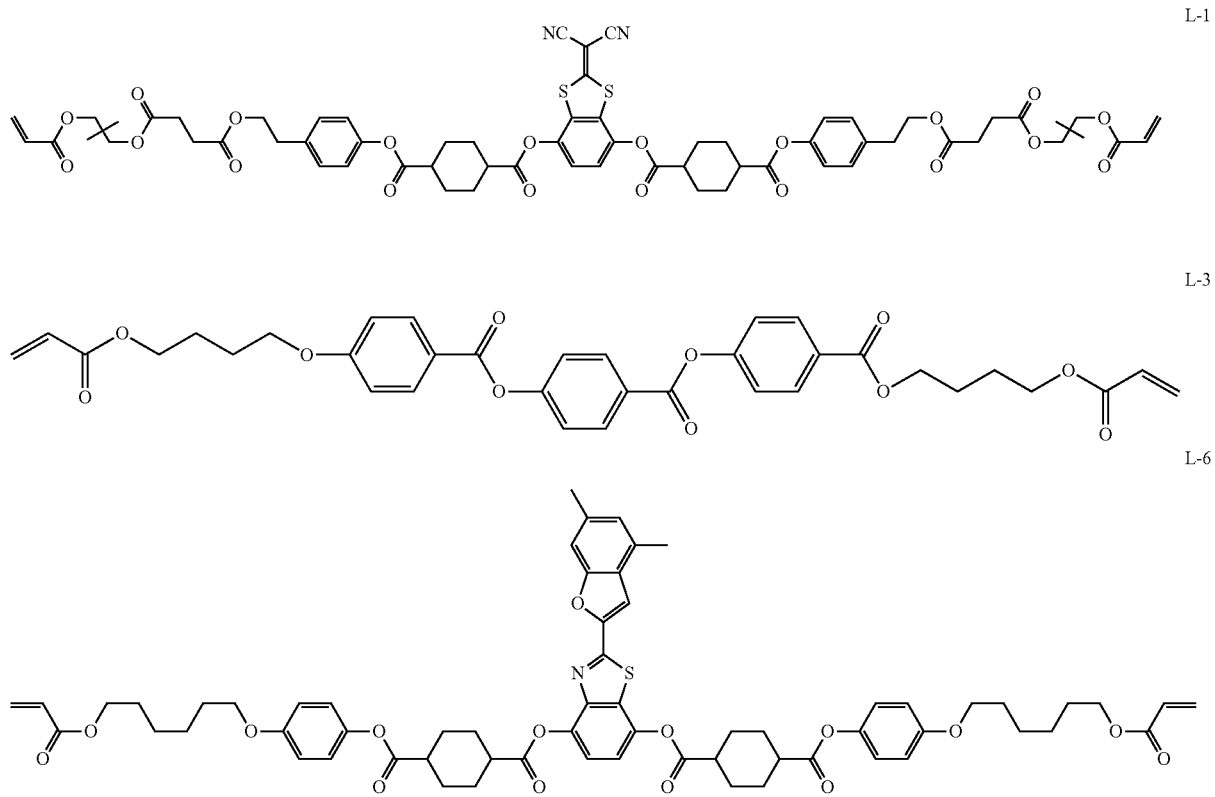

In addition, as the smectic liquid crystal compound, a compound having a structure represented by Formula (I) is preferable, because such a compound further improves the alignment properties of the patterned optical anisotropic layer by the electronic interaction between liquid crystal molecules.

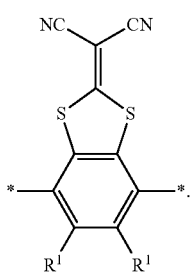

Formula (I)

In Formula (I), * represents a binding position, and $R^1$ each independently represents a hydrogen atom or an alkyl group having 1 to 6 carbon atoms.

Examples of the compound having the structure represented by Formula (I) suitably include the compound represented by Formula L-1 in which all $R^1$'s in Formula (I) represent a hydrogen atom.

The patterned optical anisotropic layer used in a case where reciprocal wavelength dispersion is adopted as the wavelength dispersion of Re may contain other liquid crystal compounds in addition to the aforementioned smectic liquid crystal compound.

Examples of other liquid crystal compounds include a nematic liquid crystal compound and the like. Specific examples thereof include compounds represented by Formulae L-2 and L-4 that are used in examples which will be described later.

In a case where the patterned optical anisotropic layer contains the aforementioned smectic liquid crystal compound and other liquid crystal compounds, the content ratio of the smectic liquid crystal compound with respect to the total mass of the smectic liquid crystal compound and other liquid crystal compounds is preferably at least equal to or higher than 35% by mass.

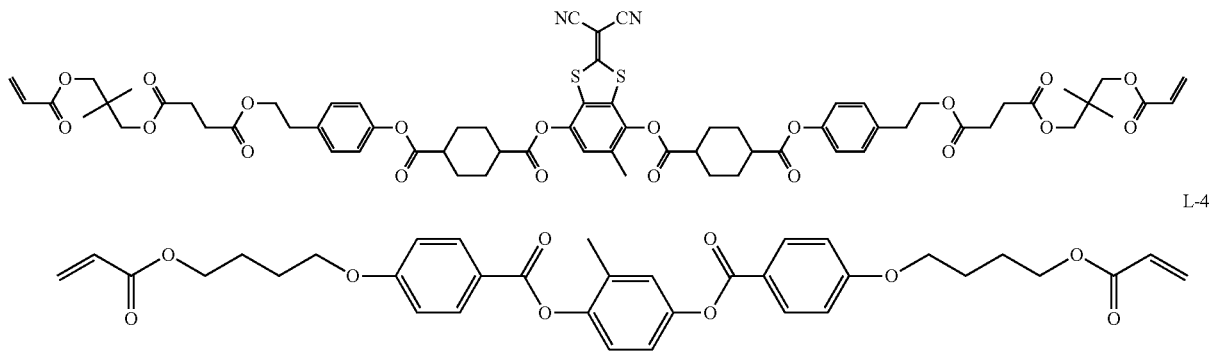

L-2

L-4

In contrast, in a case where normal wavelength dispersion is adopted as the wavelength dispersion of Re of the patterned optical anisotropic layer, for example, it is preferable to use the liquid crystal compounds described below.

Examples of the liquid crystal compounds include a rod-like liquid crystal compound and a disk-like liquid crystal compound.

—Rod-Like Liquid Crystal Compound—

Examples of the rod-like liquid crystal compound include a rod-like nematic liquid crystal compound. As the rod-like nematic liquid crystal compound, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolanes, and alkenylcyclohexyl benzonitriles are preferably used. Not only the aforementioned low-molecular weight liquid crystal molecules, but also polymer liquid crystal molecules can be used.

The polymerizable liquid crystal compound having a polymerizable group for which the alignment of the rod-like liquid crystal compound is more preferably immobilized by polymerization can be obtained by introducing a polymerizable group into a liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is particularly preferable. The polymerizable group can be introduced into the liquid crystal compound molecule by various methods. The number of polymerizable groups contained in the polymerizable liquid crystal compound is preferably 1 to 6, and more preferably 1 to 3. Examples of the polymerizable liquid crystal compound include the compounds described in Makromol. Chem., vol. 190, p. 2255 (1989); Advanced Materials, vol. 5, p. 107 (1993), U.S. Pat. No. 4,683,327B, U.S. Pat. No. 5,622,648B, U.S. Pat. No. 5,770,107B, WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-110469A), JP1999-80081A (JP-H11-80081A), JP2001-328973A, JP2014-198815A, JP2014-198814A, and the like. Furthermore, as the rod-like liquid crystal compound, for example, the compounds described in JP1999-513019A (JP-H11-513019A) and JP2007-279688A can also be preferably used.

Two or more kinds of polymerizable liquid crystal compounds may be used in combination. In a case where two or more kinds of polymerizable liquid crystal compounds are used in combination, the alignment temperature can be reduced.

Specific examples of the rod-like liquid crystal compound include compounds represented by Formulae (1) to (11).

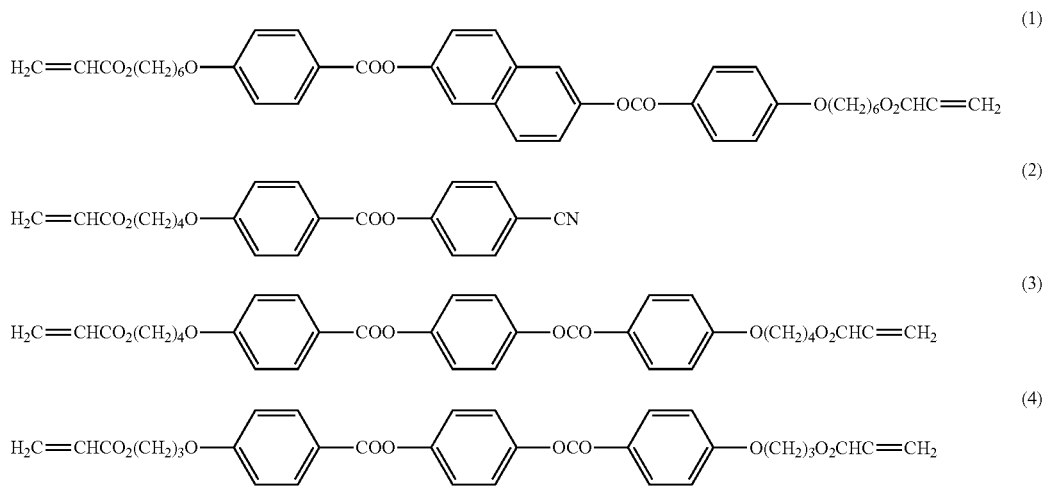

-continued
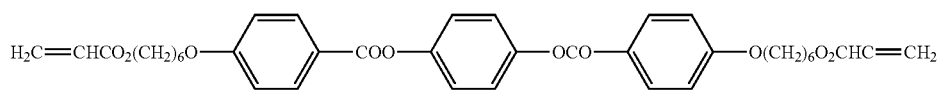 (5)
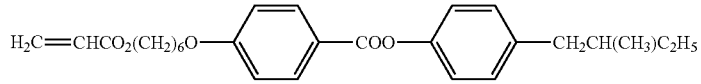 (6)
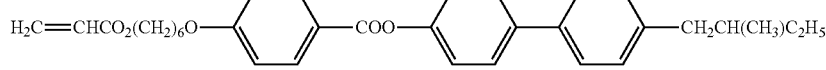 (7)
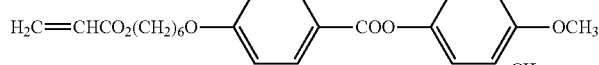 (8)
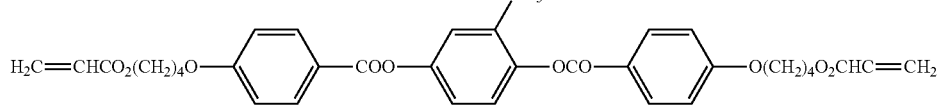 (9)
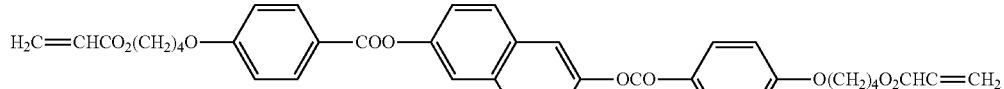 (10)
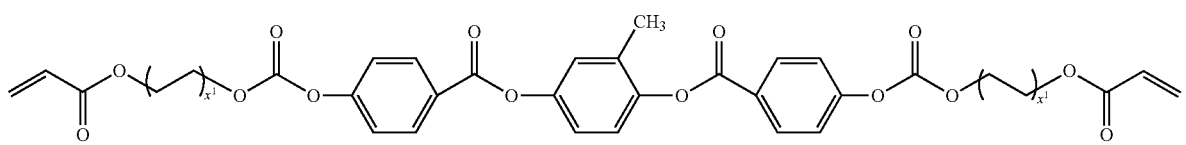 (11)
[In Compound (11), $X^1$ is 2 to 5 (Integer).]
Preferable examples of compounds used in a case where two or more rod-like liquid crystal compounds are used in combination will be shown below, but the present invention is not limited thereto.
Rod-Like Liquid Crystal Compounds
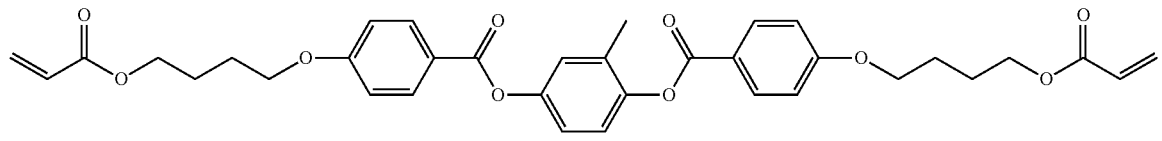
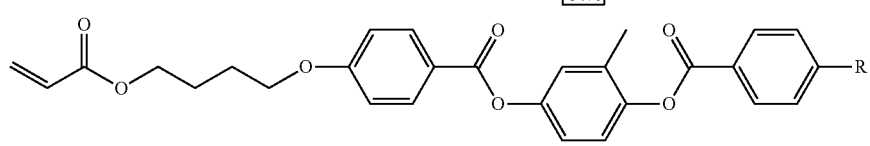
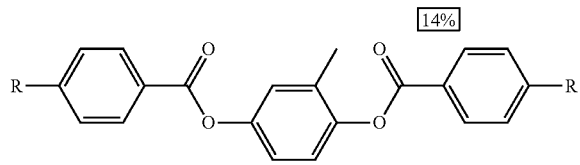
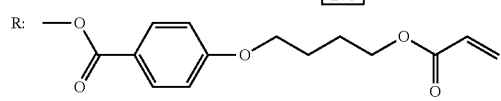

—Disk-Like Liquid Crystal Compound—

As the disk-like liquid crystal compound, for example, the compounds described in JP2007-108732A and JP2010-244038A can be preferably used, but the present invention is not limited thereto.

Preferable examples of the disk-like liquid crystal compound will be shown below, but the present invention is not limited thereto.

Compound 1

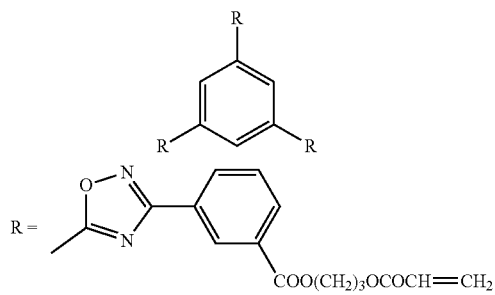

Compound 2

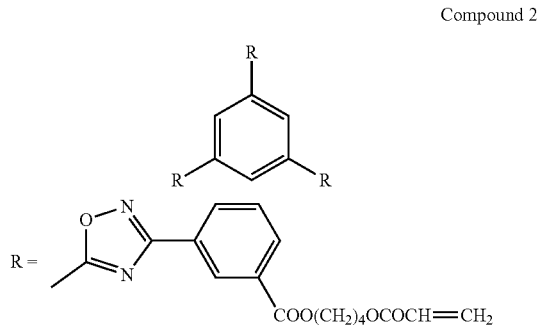

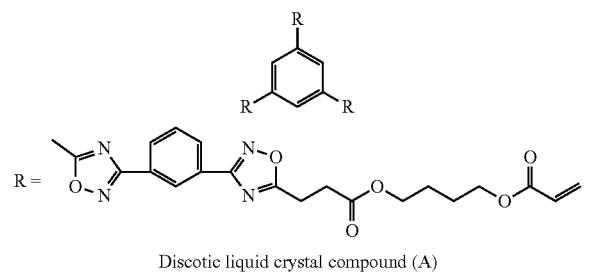

Discotic liquid crystal compound (A)

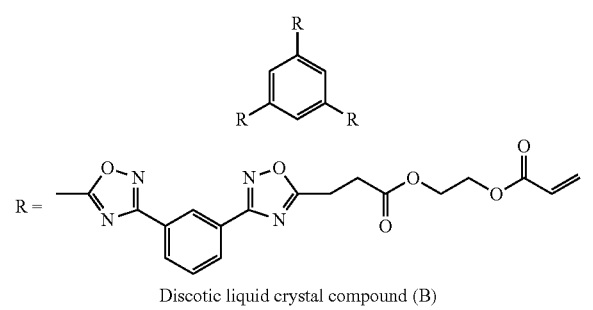

Discotic liquid crystal compound (B)

(Compound 3-1)

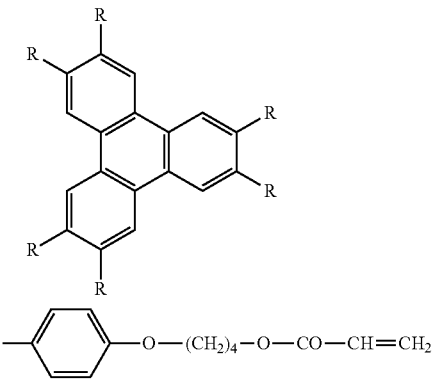

R: —O—CO—⌬—O—(CH$_2$)$_4$—O—CO—CH=CH$_2$

The amount of the liquid crystal compound added to the liquid crystal composition with respect to the mass of solid contents (mass excluding the solvent) of the liquid crystal composition is preferably 75% to 99.9% by mass, more preferably 80% to 99% by mass, and particularly preferably 85% to 90% by mass.

—Alkylcyclohexane Ring-Containing Compound—

The patterned optical anisotropic layer used in a case where reciprocal wavelength dispersion is adopted as the wavelength dispersion at Re preferably contains an alkylcyclohexane ring-containing compound. The alkylcyclohexane ring-containing compound is a compound having a cyclohexane ring, in which one hydrogen atom is substituted with a linear alkyl group, in a portion thereof.

Herein, for example, in a case where the compound has two cyclohexane rings as shown in Formula (2), "cyclohexane ring in which one hydrogen atom is substituted with a linear alkyl group" refers to a cyclohexane ring which is present on the molecular terminal side and in which one hydrogen atom is substituted with a linear alkyl group.

Examples of the alkylcyclohexane ring-containing compound include a compound having a structure represented by Formula (2). From the viewpoint of imparting moisture-heat resistance to the optically anisotropic layer, a compound represented by Formula (3) having a (meth)acryloyl group is preferable.

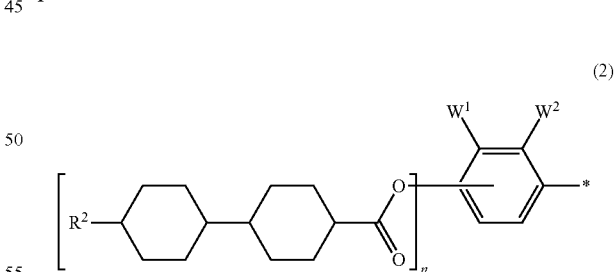

(2)

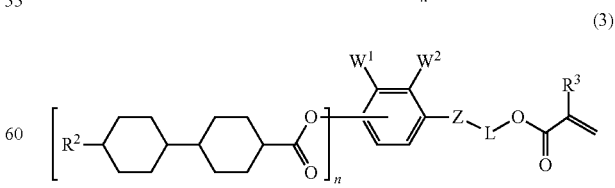

(3)

In Formula (2), * represents a binding position.

In Formulae (2) and (3), $R^2$ represents an alkyl group having 1 to 10 carbon atoms, n represents 1 or 2, $W^1$ and $W^2$ each represent an alkyl group, an alkoxy group, or a halogen atom. Furthermore, $W^1$ and $W^2$ may form a ring structure which may have a substituent by being bonded to each other.

In Formula (3), Z represents —COC— or —OCO—, L represents an alkylene group having 1 to 6 carbon atoms, and $R^3$ represents a hydrogen atom or a methyl group.

Specific examples of the alkylcyclohexane ring-containing compound include compounds represented by Formulae A-1 to A-5. In Formula A-3, $R^4$ represents an ethyl group or a butyl group.

As the alignment control agent, the fluorine (meth)acrylate-based polymers described in paragraphs "0018" to "0043" in JP2007-272185A can be preferably used, and the description of the specification is incorporated into the present invention.

One kind of alignment control agent may be used singly, or two or more kinds thereof may be used in combination.

In a case where the patterned optical anisotropic layer as a −A-plate is formed, it is preferable to form a patterned

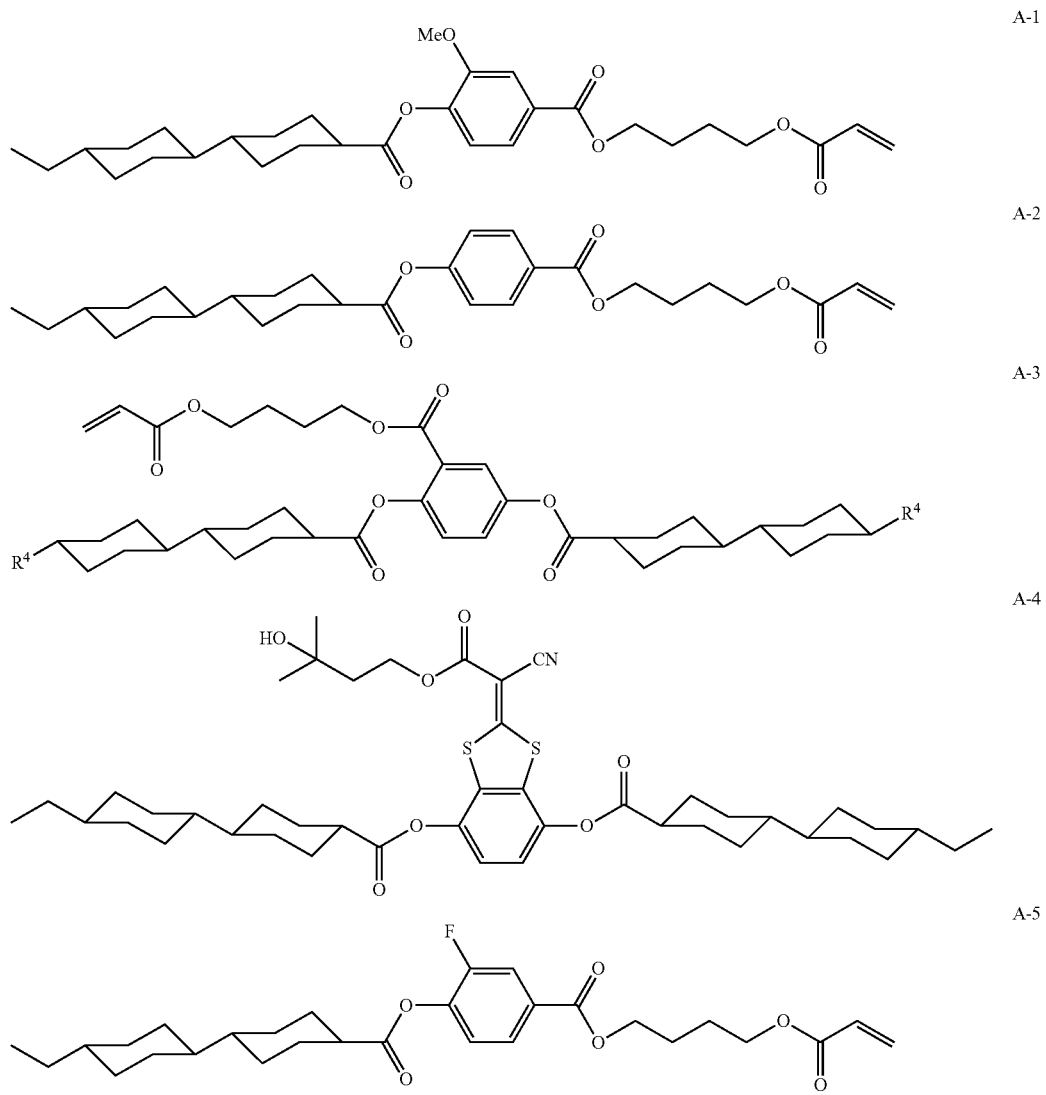

—Alignment Control Agent—

Examples of the alignment control agent include the compounds exemplified in paragraphs "0092" and "0093" in JP2005-99248A, the compounds exemplified in paragraphs "0076" to "0078" and "0082" to "0085" in JP2002-129162A, the compounds exemplified in paragraphs "0094" and "0095" in JP2005-99248A, and the compounds exemplified in paragraph "0096" in JP2005-99248A.

As a fluorine-based alignment control agent, the compounds described in paragraphs "0082" to "0090" in JP2014-119605A and the fluorine (meth)acrylate-based polymers described in paragraphs "0018" to "0043" in JP2007-272185A are preferable.

optical anisotropic layer in which the disk-like liquid crystal compound having a polymerizable group is vertically aligned. In this case, as the alignment control agent in the liquid crystal composition, it is preferable to use an onium salt compound (alignment control agent for the alignment film side) or a fluoroaliphatic group-containing copolymer (alignment control agent for the air interface) described below.

—Onium Salt Compound (Alignment Control Agent for Alignment Film Side)—

As described above, in order to vertically align the liquid crystal compound having a polymerizable group, particularly, the disk-like liquid crystal compound having a polymerizable group, it is preferable to add an onium salt. The onium salt is localized within the interface of an alignment film and functions to increase the tilt angle of the liquid crystal molecule in the vicinity of the interface of the alignment film.

As the onium salt, a compound represented by General Formula (1) is preferable.

Z—(Y-L-)$_n$Cy$^+$·X$^-$   General Formula (1)

In the formula, Cy represents an onium group as a 5- or 6-membered ring, L, Y, Z, and X have the same definition as L$^{23}$, L$^{24}$, Y$^{22}$, Y$^{23}$, Z$^{21}$, and X respectively that are in General Formula (II) which will be described later, and n represents an integer equal to or greater than 2.

As the onium group (Cy) as a 5- or 6-membered ring, a pyrazolium ring, an imidazolium ring, a traizolium ring, a tetrazolium ring, a pyridinium ring, a pyrazinium ring, a pyrimidinium ring, and a triazinium ring are preferable, and an imidazolium ring and a pyridinium ring are particularly preferable.

It is preferable that the onium group (Cy) as a 5- or 6-membered ring has a group having affinity with the material of the alignment film. In a portion (unexposed portion) in which an acid generator is not decomposed, the onium salt compound exhibits high affinity with respect to the material of the alignment film and is localized within the interface of the alignment film. In contrast, in a portion (exposed portion) in which an acid generator is decomposed and generates an acidic compound, the affinity is reduced due to the ion exchange the anion of the onium salt undergoes, and hence the localization properties thereof within the interface of the alignment film deteriorates. Within the range of a temperature (at about a room temperature to 150° C.) actually used at the time of aligning the liquid crystals, hydrogen bonding can be established or disappear. Therefore, it is preferable to exploit the affinity based on the hydrogen bonding, but the present invention is not limited to this example.

For example, in an aspect in which polyvinyl alcohol is used as the material of the alignment film, in order to form a hydrogen bond between the onium salt and a hydroxyl group of polyvinyl alcohol, it is preferable that the onium salt has a hydrogen bonding group. The theoretical interpretation of hydrogen bonding is reported in, for example, H, Uneyama and K. Morokuma, Journal of American Chemical Society, Vol. 99, pp. 1316~1332, 1977. Specific examples of the pattern of the hydrogen bonding include those described in J. N. Israelachvili, "Intermolecular Force and Surface Force", translated by Tamotsu Kondo and Hiroyuki Oshima, McGraw-Hill Education, p. 98, FIG. 17, 1991. Specific examples of the hydrogen bonding include those described in G. R. Desiraju, Angewante Chemie International Edition English, vol. 34, p. 2311, 1995.

In addition to the effect of the affinity of the onium group, by forming a hydrogen bond with polyvinyl alcohol, the onium salt as a 5- or 6-membered ring having a hydrogen bonding group improves the surface localization properties within the interface of the alignment film and promotes the function of imparting orthogonal alignment properties with respect to the polyvinyl alcohol main chain. Examples of preferable hydrogen bonding groups include an amino group, a carbonamide group, a sulfonamide group, an acid amide group, a ureide group, a carbamoyl group, a carboxyl group, a sulfo group, and a nitrogen-containing heterocyclic group (for example, an imidazolyl group, a benzimidazolyl group, a pyrazolyl group, a pyridyl group, a 1,3,5-triazyl group, a pyrimidyl group, a pyridazyl group, a quinolyl group, a benzothiazolyl group, a succinimide group, a phthalimide group, a maleimide group, a uracil group, a thiouracil group, a barbituric acid group, a hydantoin group, a maleic acid hydrazide group, an isatin group, a uramil group, and the like). Among these hydrogen bonding groups, an amino group and a pyridyl group are more preferable.

It is also preferable that the 5- or 6-membered onium ring contains an atom having a hydrogen bonding group (for example, a nitrogen atom of an imidazolium ring).

n is preferably an integer of 2 to 5, more preferably 3 or 4, and particularly preferably 3. A plurality of L's and Y's may be the same as or different from each other. In a case where n is equal to or greater than 3, the onium salt represented by General Formula (1) has three or more Y's each of which is a divalent linking group having a 5- or 6-membered ring as a partial structure. Accordingly, a strong intermolecular x-n interaction occurs between the onium salt and the disk-like liquid crystal compound. As a result, the vertical alignment of the disk-like liquid crystal compound can be realized, and particularly, on the polyvinyl alcohol alignment film, the orthogonal and vertical alignment with respect to the polyvinyl alcohol main chain can be realized.

The onium salt represented by General Formula (1) is particularly preferably a pyridinium compound represented by General Formula (2a) or an imidazolium compound represented by General Formula (2b).

The compounds represented by General Formulae (2a) and (2b) are added mainly for the purpose of controlling the alignment of the disk-like liquid crystal compound within the interface of the alignment film, and function to increase the tilt angle of the molecules of the disk-like liquid crystal compound in the vicinity of the interface of the alignment film.

General Formula (2a)

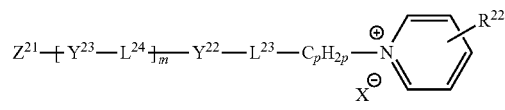

General Formula (2b)

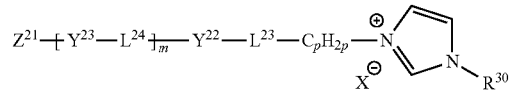

In the formulae, L$^{23}$ and L$^{24}$ each represent a divalent linking group.

L$^{23}$ is preferably a single bond, —O—, —O—CO—, —CO—O—, —C≡C—, —CH═CH—, —CH═N—, —N═CH—, —N═N—, —O-AL-O—, —O-AL-O—CO—, —O-AL-CO—O—, —CO—O-AL-O—, —CO—O-AL-O—CO—, —CO—O-AL-CO—O—, —O—CO-AL-O—, —O—CO-AL-O—CO—, or —O—CO-AL-CO—O—. AL is an alkylene group having 2 to 10 carbon atoms. L$^{23}$ is preferably a single bond, —O—, —O-AL-O—, —O-AL-O—CO—, —O-AL-CO—O—, —CO—O-AL-O—, —CO—O-AL-O—CO—, —CO—O-AL-CO—O—, —O—CO-AL-O—, —O—CO-AL-O—CO—, or —O—CO-AL-CO—O—, more preferably a single bond or —O—, and most preferably —O—.

L$^{24}$ is preferably a single bond, —O—, —O—CO—, —CO—O—, —C≡C—, —CH═CH—, —CH═N—, —N═CH—, or —N═N—, and more preferably —O—CO— or —CO—O—. In a case where m is equal to or greater than 2, a plurality of $L^{24}$'s are even more preferably —O—CO— and —CO—O— that alternate with each other.

$R^{22}$ is a hydrogen atom, an unsubstituted amino group, or a substituted amino group having 1 to 20 carbon atoms.

In a case where $R^{22}$ is a dialkyl-substituted amino group, two alkyl groups may form a nitrogen-containing heterocyclic ring by being bonded to each other. The nitrogen-containing heterocyclic ring formed at this time is preferably a 5- or 6-membered ring. $R^{22}$ is more preferably a hydrogen atom, an unsubstituted amino group, or a dialkyl-substituted amino group having 2 to 12 carbon atoms, and even more preferably a hydrogen atom, an unsubstituted amino group, or a dialkyl-substituted amino group having 2 to 8 carbon atoms. In a case where $R^{22}$ is an unsubstituted amino group and a substituted amino group, it is preferable that the 4-position of a pyridinium ring is substituted.

X is an anion.

X is preferably a monovalent anion. Examples of the anion include a halide ion (a fluorine ion, a chlorine ion, a bromine ion, or an iodine ion) and a sulfonate ion (for example, a methanesulfonate ion, a p-toluenesulfonate ion, or a benzenesulfonate ion).

$Y^{22}$ and $Y^{23}$ each represent a divalent linking group having a 5- or 6-membered ring as a partial structure. The 5- or 6-membered ring may have a substituent. It is preferable that at least one of $Y^{22}$ or $Y^{23}$ is a divalent linking group having a 5- or 6-membered ring, which has a substituent, as a partial structure. It is preferable that $Y^{22}$ and $Y^{23}$ each independently represent a divalent linking group having a 6-membered ring, which may have a substituent, as a partial structure. The 6-membered ring includes an aliphatic ring, an aromatic ring (benzene ring), and a heterocyclic ring. Examples of the 6-membered aliphatic ring include a cyclohexane ring, a cyclohexene ring, and a cyclohexadiene ring. Examples of the 6-membered heterocyclic ring include a pyran ring, a dioxane ring, a dithian ring, a thin ring, a pyridine ring, a piperidine ring, an oxazine ring, a morpholine ring, a thiazine ring, a pyridazine ring, a pyrimidine ring, a pyrazine ring, a piperazine ring, and a triazine ring. Another 6-membered ring or 5-membered ring may be fused with the 6-membered ring.

Examples of the substituent include a halogen atom, a cyano group, an alkyl group having 1 to 12 carbon atoms, and an alkoxy group having 1 to 12 carbon atoms. The alkyl group and the alkoxy group may be substituted with an acyl group having 2 to 12 carbon atoms or an acyloxy group having 2 to 12 carbon atoms. As the substituent, an alkyl group having 1 to 12 carbon atoms (more preferably having 1 to 6 carbon atoms, and even more preferably having 1 to 3 carbon atoms) is preferable. The number of substituents may be equal to or greater than 2. For example, in a case where $Y^{22}$ and $Y^{23}$ represent a phenylene group, the phenylene group may be substituted with one to four alkyl groups having 1 to 12 carbon atoms (more preferably having 1 to 6 carbon atoms, and even more preferably having 1 to 3 carbon atoms).

m is 1 or 2, and preferably 2. In a case where m is 2, a plurality of $Y^{23}$'s and $L^{24}$'s may be the same as or different from each other.

$Z^{21}$ is a monovalent group selected from the group consisting of a halogen-substituted phenyl group, a nitro-substituted phenyl group, a cyano-substituted phenyl group, a phenyl group substituted with an alkyl group having 1 to 10 carbon atoms, a phenyl group substituted with an alkoxy group having 2 to 10 carbon atoms, an alkyl group having 1 to 12 carbon atoms, an alkynyl group having 2 to 20 carbon atoms, an alkoxy group having 1 to 12 carbon atoms, an alkoxycarbonyl group having 2 to 13 carbon atoms, an aryloxycarbonyl group having 7 to 26 carbon atoms, and an arylcarbonyloxy group having 7 to 26 carbon atoms.

In a case where m is 2, $Z^{21}$ is preferably a cyano group, an alkyl group having 1 to 10 carbon atoms, or an alkoxy group having 1 to 10 carbon atoms, and more preferably an alkoxy group having 4 to 10 carbon atoms.

In a case where m is 1, $Z^{21}$ is preferably an alkyl group having 7 to 12 carbon atoms, an alkoxy group having 7 to 12 carbon atoms, an acyl-substituted alkyl group having 7 to 12 carbon atoms, an acyl-substituted alkoxy group having 7 to 12 carbon atoms, an acyloxy-substituted alkyl group having 7 to 12 carbon atoms, or an acyloxy-substituted alkoxy group having 7 to 12 carbon atoms.

An acyl group is represented by —CO—R, and an acyloxy group is represented by —O—CO—R. R is an aliphatic group (an alkyl group, a substituted alkyl group, an alkenyl group, a substituted alkenyl group, an alkynyl group, or a substituted alkynyl group) or an aromatic group (an aryl group or a substituted aryl group). R is preferably an aliphatic group, and more preferably an alkyl group or an alkenyl group.

p is an integer of 1 to 10, and is particularly preferably 1 or 2. $C_pH_{2p}$, represents a chain-like alkylene group which may have a branched structure. $C_pH_{2p}$ is preferably a linear alkylene group (—$(CH_2)_p$—).

In General Formula (2b), $R^{30}$ is a hydrogen atom or an alkyl group having 1 to 12 carbon atoms (more preferably having 1 to 6 carbon atoms and even more preferably having 1 to 3 carbon atoms).

Among the compounds represented by General Formula (2a) or (2b), compounds represented by General Formula (2a') or (2b') are preferable.

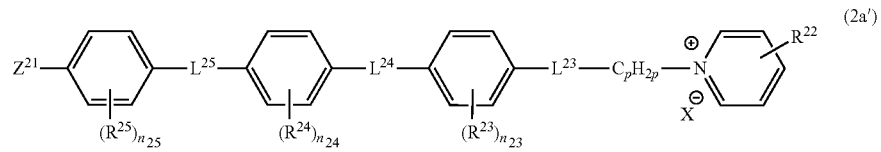

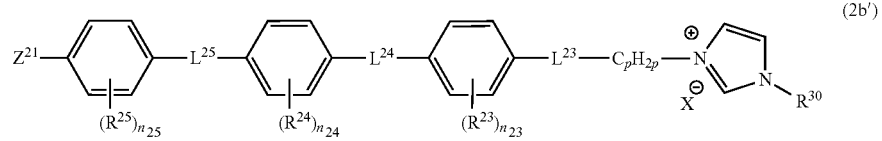

In General Formulae (2a') and (2b'), the same references as in General Formula (2a) have the same definition, and the preferred range thereof is also the same. $L^{25}$ has the same definition as $L^{24}$, and the preferable range thereof is also the same. $L^{24}$ and $L^{25}$ preferably represent —O—CO— or —CO—O—. It is preferable that $L^{24}$ represents —O—CO—, and $L^{25}$ represents —CO—O—.

$R^{23}$, $R^{24}$, and $R^{25}$ each represent an alkyl group having 1 to 12 carbon atoms (more preferably having 1 to 6 carbon atoms, and even more preferably having 1 to 3 carbon atoms). $n_{23}$ represents 0 to 4, $n_{24}$ represents 1 to 4, and $n_{25}$ represents 0 to 4. It is preferable that $n_{23}$ and $n_{25}$ represent 0, and $n_{24}$ represents 1 to 4 (more preferably represents 1 to 3).

$R^{30}$ is preferably an alkyl group having 1 to 12 carbon atoms (more preferably having 1 to 6 carbon atoms, and even more preferably having 1 to 3 carbon atoms).

Specific examples of the compound represented by General Formula (1) include the compounds described in paragraphs "0058" to "0061" in the specification of JP2006-113500A.

Specific examples of the compound represented by General Formula (1) will be shown below. In the formulae, the anion ($X^-$) is not shown.

amino group which is a hydrogen atom acceptor (in a case where $R^{22}$ in General Formulae (2a) and (2a') is an unsubstituted amino group or a substituted amino group having 1 to 20 carbon atoms), intermolecular hydrogen bonding occurs between the onium salts and polyvinyl alcohol, and hence the onium salts are localized within the surface of the alignment film at a higher density. Furthermore, due to the effect of the hydrogen bonding, the pyridinium derivative is aligned in a direction orthogonal to the main chain of polyvinyl alcohol, and accordingly, orthogonal alignment of the liquid crystals are promoted with respect to the rubbing direction. Because the pyridinium derivative has a plurality of aromatic rings in the molecule, strong intermolecular n-n interaction occurs between the pyridinium derivative and the liquid crystal, particularly, the disk-like liquid crystal compound described above, and as a result, the orthogonal alignment of the disk-like liquid crystal compound in the vicinity of the interface of the alignment film is induced. Particularly, in a case where a hydrophobic aromatic ring is linked to the hydrophilic pyridinium group as shown in General Formula (2a'), the effect of hydrophobicity brings about an effect of inducing vertical alignment.

In a case where the onium salts represented by General Formulae (2a) and (2b) are used in combination, anion

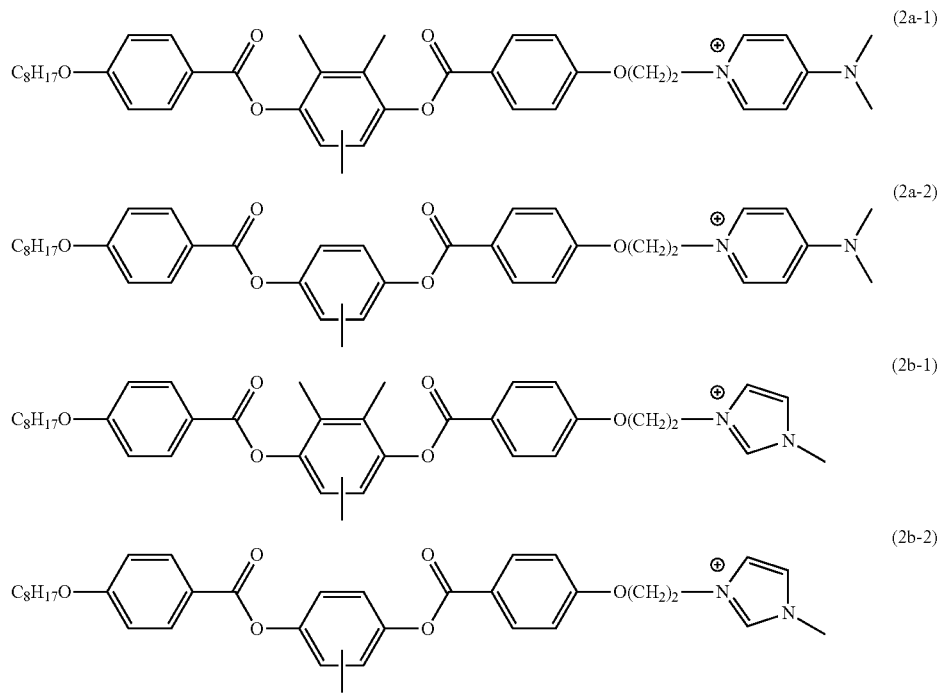

The compounds of General Formula (2a) and (2b) can be manufactured by general methods. For example, a pyridinium derivative of General Formula (2a) generally can be obtained by alkylating a pyridine ring (Menschutkin reaction).

The amount of the onium salt added does not exceed 5% by mass with respect to the liquid crystal compound, and is preferably about 0.1 to 2% by mass.

Because the pyridinium group or the imidazolium group is hydrophilic, the onium salts represented by General Formulae (2a) and (2b) are localized within the surface of the polyvinyl alcohol alignment film. Particularly, in a case where a pyridinium group is further substituted with an exchange occurs between the onium salts and an acidic compound released from a photoacid generator due to photolysis, and the hydrogen bonding force and the hydrophilicity of the onium salts change. As a result, the localization properties of the onium salts within the interface of the alignment film deteriorate, and parallel alignment is promoted in which the liquid crystals are aligned in a state where the slow axis thereof is parallel to the rubbing direction. This is because due to the salt exchange, the onium salts are uniformly dispersed in the alignment film, the density of the onium salts within the surface of the alignment film is reduced, and the liquid crystals are aligned by the anchoring force of the rubbing alignment film.

Preferable examples of the onium salt compound (alignment control agent for the alignment film side) will be shown below, but the present invention is not limited thereto.

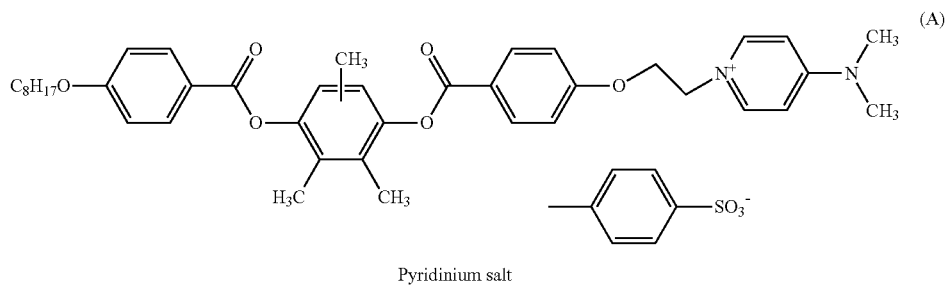

Pyridinium salt

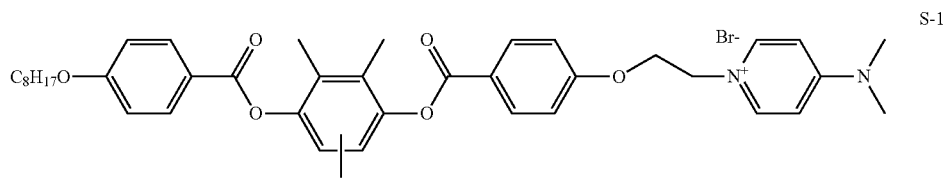

—Fluoroaliphatic Group-Containing Copolymer (Alignment Control Agent for Air Interface)—

The fluoroaliphatic group-containing copolymer is added for the purpose of controlling the alignment of the liquid crystals within the air interface, and functions to increase the tilt angle of the liquid crystal molecules in the vicinity of the air interface. Furthermore, the fluoroaliphatic group-containing copolymer also improves coating properties such as unevenness or cissing.

As the fluoroaliphatic group-containing copolymer usable in the present invention, it is possible to use those selected from the compounds described in JP2004-333852A, JP2004-333861A, JP2005-134884A, JP2005-179636A, and JP2005-181977A and the specifications thereof, and the like. Particularly, the polymers described JP2005-179636A and JP2005-181977A and the specifications thereof are preferable which contains, on a side chain, a fluoroaliphatic group and one or more kinds of hydrophilic groups selected from the group consisting of a carboxyl group (—COOH), a sulfo group (—SO$_3$H), phosphonooxy {—OP(=O)(OH)$_2$} and salts of these.

The amount of the fluoroaliphatic group-containing copolymer added does not exceed 2% by mass with respect to the liquid crystal compound, and is preferably about 0.1 to 1% by mass.

The fluoroaliphatic group-containing copolymer can improve the localization properties of the onium salt within the air interface by the hydrophobic effect of the fluoroaliphatic group, provide a field of low surface energy on the air interface side, and increase the tilt angle of the liquid crystal, particularly, the disk-like liquid crystal compound. Furthermore, in a case where the alignment control agent has a copolymer component containing, on a side chain, one or more kinds of hydrophilic groups selected from the group consisting of a carboxyl group (—COOH), a sulfo group (—SO$_3$H), phosphonooxy {—OP(=O)(OH)$_2$} and salts of these, due to the charge repulsion between these anions and π electrons of the liquid crystals, the vertical alignment of the liquid crystal compound can be realized.

Preferable examples of the fluoroaliphatic group-containing copolymer (alignment control agent for the air interface) will be shown below, but the present invention is not limited thereto.

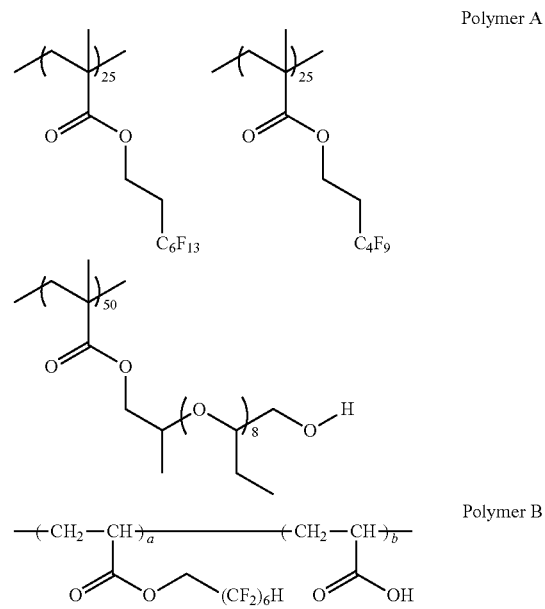

a is 90, and b is 10.

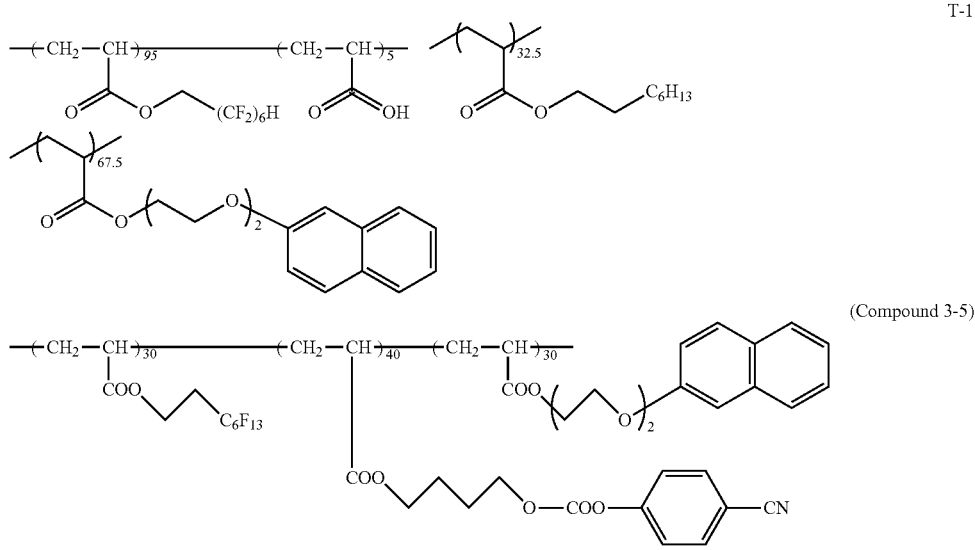

The amount of the alignment control agent added to the liquid crystal composition with respect to the total mass of the liquid crystal compound is preferably 0.01% by mass to 10% by mass, more preferably 0.01% by mass to 5% by mass, and particularly preferably 0.02% by mass to 1% by mass.

—Polymerization Initiator—

Examples of the polymerization initiator include α-carbonyl compounds (described in the specifications of U.S. Pat. No. 2,367,661B and U.S. Pat. No. 2,367,670B), acyloin ethers (described in the specification of U.S. Pat. No. 2,448,828B), α-hydrocarbon-substituted aromatic acyloin compounds (described in the specification of U.S. Pat. No. 2,722,512B), polynuclear quinone compounds (described in the specifications of U.S. Pat. No. 3,046,127B and U.S. Pat. No. 2,951,758B), a combination of a triaryl imidazole dimer and p-aminophenylketone (described in the specification of U.S. Pat. No. 3,549,367B), acridine and phenazine compounds (described in the specifications of JP1985-105667A (JP-S60-105667A) and U.S. Pat. No. 4,239,850B), oxadiazole compounds (described in the specification of U.S. Pat. No. 4,212,970B), acylphosphine oxide compounds (described in the specifications of JP1988-40799B (JP-S63-40799B), JP1993-29234B (JP-H05-29234B), JP1998-95788A (JP-H10-95788A), JP1998-29997A (JP-H10-29997A)), and the like.

Examples of commercially available polymerization initiators include IRGACURE 907, IRGACURE 184, and IRGACURE OXE-01 (all manufactured by BASF SE) which are photopolymerization initiators, KAYACURE DETX (manufactured by Nippon Kayaku Co., Ltd.) which is a sensitizer, and the like.

In an aspect in which a polymerization reaction proceeds by ultraviolet irradiation, the polymerization initiator used is preferably a photopolymerization initiator which can initiate the polymerization reaction by ultraviolet irradiation.

The content of the photopolymerization initiator in the liquid crystal composition with respect to the content of the polymerizable liquid crystal compound is preferably 0.1% to 20% by mass, and more preferably 0.5% by mass to 12% by mass.

—Solvent—

As the solvent of the liquid crystal composition, an organic solvent is preferably used. Examples of the organic solvent include an amide (for example, N,N-dimethylformamide), a sulfoxide (for example, dimethylsulfoxide), a heterocyclic compound (for example, pyridine), a hydrocarbon (for example, benzene or hexane), an alkyl halide (for example, chloroform or dichloromethane), an ester (for example, methyl acetate or butyl acetate), a ketone (for example, acetone, methyl ethyl ketone, cyclohexanone, or cyclopentanone), and an ether (for example, tetrahydrofuran or 1,2-dimethoxyethane). Among these, an alkyl halide and a ketone are preferable, and methyl ethyl ketone is more preferable. Two or more kinds of organic solvents may be used in combination.

(Method for Manufacturing Patterned Optical Anisotropic Layer)

Hereinafter, the method for manufacturing the patterned optical anisotropic layer usable in the present invention will be specifically described.

In the method for manufacturing the patterned optical anisotropic layer, the phase difference regions are preferably formed by using the liquid crystal composition, by using the same curable liquid crystal composition containing liquid crystals as a main component, or by pattern exposure.

As the method for forming the patterned optical anisotropic layer, for example, a method is preferable in which the liquid crystal compound is immobilized in the aligned state by using a liquid crystal composition containing a liquid crystal compound and the like. Examples of the method for immobilizing the liquid crystal used at this time suitably include a method of causing a polymerization by using a liquid crystal compound having a polymerizable group as a liquid crystal compound and immobilizing the liquid crystal compound, and the like. In the present invention, the patterned optical anisotropic layer can be formed on any support or polarizer.

More specifically, a first method for forming the patterned optical anisotropic layer is a method of exploiting a plurality of actions affecting the control of the liquid crystal alignment and then canceling one of the actions by using an external stimulus (a heat treatment or the like) such that a predetermined alignment control action becomes predominant. For example, by using the alignment controllability based on the alignment film and the alignment controllability of the alignment control agent added to the liquid crystal composition in combination, the liquid crystals are caused to be in a predetermined alignment state and immobilized such that one phase difference region is formed. Then, by using an external stimulus (a heat treatment or the like), one of the actions (for example, the action based on the alignment control agent) is canceled such that the other alignment control action (the action based on the alignment film) becomes predominant. In this way, another alignment state is realized, and by immobilizing the alignment state, another phase difference region is formed. For example, because a pyridinium group or an imidazolium group is hydrophilic, a predetermined pyridinium compound or imidazolium compound is localized within the surface of the hydrophilic polyvinyl alcohol alignment film. Particularly, in a case where the pyridinium group is further substituted with an amino group which is a substituent of a hydrogen atom acceptor, intermolecular hydrogen bonding occurs between the pyridinium compound and polyvinyl alcohol. Accordingly, the pyridinium compound is localized on the surface of the alignment film at a higher density, and due to the effect of the hydrogen bonding, the pyridinium derivative is aligned in a direction orthogonal to the main chain of polyvinyl alcohol. As a result, the orthogonal alignment of the liquid crystals in the rubbing direction is promoted. Because the pyridinium derivative has a plurality of aromatic rings in the molecule, a strong intermolecular $\pi$-$\pi$ interaction occurs between the pyridinium derivative and the liquid crystal, particularly, the disk-like liquid crystal compound described above, and consequently, the orthogonal alignment of the disk-like liquid crystal compound in the vicinity of the interface of the alignment film is induced. Particularly, in a case where a hydrophobic aromatic ring is linked to the hydrophilic pyridinium group, the effects of the hydrophobicity also brings about an effect of inducing vertical alignment. However, in a case where the compound is overheated to a certain temperature, the hydrogen bond is broken, the density of the pyridinium compound and the like within the surface of the alignment film is reduced, and hence the aforementioned effect disappears. As a result, the liquid crystals are aligned by the anchoring force of the rubbing alignment film and becomes a parallel alignment state. The aforementioned method is specifically described in paragraphs "0014" to "0132" in JP2012-8170A, the content of which is incorporated into the present specification by reference.

A second method for forming the patterned optical anisotropic layer is a method of using a patterned alignment film. In this method, patterned alignment films having different alignment controllabilities are formed, and the liquid crystal composition is disposed thereon, and the liquid crystals are aligned. By the alignment controllabilities of the respective patterned alignment films, the alignment of the liquid crystals is controlled, and the liquid crystals achieve different alignment states respectively. By immobilizing the respective alignment states, patterns of the phase difference regions are formed according to the patterns of the alignment films. The patterned alignment films can be formed using a printing method, mask rubbing performed on a rubbing alignment film, mask exposure performed on a photoalignment film, or the like. Furthermore, it is possible to form the patterned alignment films by uniformly forming alignment films and printing additives (for example, the aforementioned onium salt and the like) affecting the alignment controllability on the alignment film according to predetermined patterns separately prepared. The printing method is specifically described in paragraphs "0013" to "0116" and "0166" to "0181" in JP2012-32661A, the content of which is incorporated into the present specification by reference. The mask exposure performed on the photoalignment film will be specifically described later in the section of the alignment film.

The first and second preferable methods may be used in combination. For example, a photoacid generator may be added to the alignment film. In this case, by adding the photoacid generator to the alignment film, two or more kinds of phase difference regions can be formed by setting the exposure amount (exposure intensity) to be a certain value or to be zero.

That is, by pattern exposure, a region in which the photoacid generator is decomposed and thus an acidic compound is generated and a region in which the photoacid generator is not decomposed and thus an acidic compound is not generated are formed. In the portion which is not irradiated with light, the photoacid generator substantially remains undecomposed. Therefore, the alignment state is controlled by the interaction among the material of the alignment film, the liquid crystals, and the alignment control agent which is added as desired, and the liquid crystals are aligned such that the slow axes thereof are orthogonal to the rubbing direction. In a case where the alignment film is irradiated with light and thus an acidic compound is generated, the alignment state is controlled not by the aforementioned interaction but by the rubbing direction of the rubbing alignment film. Consequently, the liquid crystals are in parallel alignment in which the slow axes thereof are parallel to the rubbing direction. As the photoacid generator used in the alignment film, water-soluble compounds are preferably used. The aforementioned method is specifically described in paragraphs "0013" to "0175" in JP2012-150428A, the content of which is incorporated into the present specification by reference.

Preferable method used for forming the patterned optical anisotropic layer include a method using a patterned alignment film.

In the method for forming the patterned optical anisotropic layer, it is preferable to coat the surface of the patterned alignment film with one kind of composition which is prepared as a coating solution and contains liquid crystals having a polymerizable group as a main component. The coating of the liquid crystal composition can be performed by a method of spreading a material obtained by making the liquid crystal composition into a solution by using a solvent or a material obtained by making the liquid crystal composition into a liquid such as a molten liquid by means of heating, by an appropriate method such as a roll coating method, a gravure printing method, or a spin coating method. Furthermore, the coating can be performed by various methods such as a wire bar coating method, an extrusion coating method, a direct gravure coating method, a reverse gravure coating method, and a die coating method. In addition, a coating film can also be formed by jetting the liquid crystal composition from a nozzle by using an ink jet device.

Then, it is preferable to maintain and immobilize the alignment state of the molecules of the liquid crystal compound by curing the liquid crystal composition. The curing is preferably performed by the polymerization reaction of the polymerizable group introduced into the liquid crystal molecules.

Before the polymerization reaction for curing that is performed after the coating of the liquid crystal composition, the coating film may be dried by known methods. For example, the coating film may be dried by being left as is or dried by heating.

In the step of coating and drying the liquid crystal composition, the liquid crystal molecules in the liquid crystal composition may be aligned.

The polymerization reaction includes a thermal polymerization reaction in which a thermal polymerization initiator is used and a photopolymerization reaction in which a photopolymerization initiator is used. Among these, a photopolymerization reaction is preferable. For the light irradiation performed for polymerizing the liquid crystal molecules, it is preferable to use ultraviolet rays. The irradiation energy may be equal to or higher than 1 mJ/cm$^2$, 20 mJ/cm$^2$, or 100 mJ/cm$^2$, and may be equal to or lower than 50 J/cm$^2$, 800 mJ/cm$^2$, or 400 mJ/cm$^2$. The illuminance of the ultraviolet rays is preferably 0.1 to 50 mW/cm$^2$, for example.

The optical properties of the liquid crystal composition based on the alignment of the liquid crystal molecules only need to be kept in the layer, and the liquid crystal composition of the patterned optical anisotropic layer obtained after curing does not need to exhibit the properties of liquid crystals. For example, the molecular weight of the liquid crystal composition may be increased by the curing reaction, and then the composition may lose the properties of liquid crystals.

In the formation of the patterned optical anisotropic layer, it is preferable that the alignment state of the patterned optical anisotropic layer is immobilized by the aforementioned curing. Herein, as the "immobilized" state of the liquid crystal phase, a state where the alignment of the liquid crystal compound is retained is a most typical and preferable aspect. However, the "immobilized" state is not limited thereto, and specifically means a state where the layer does not exhibit fluidity generally within a temperature range of 0° C. to 50° C. or within a temperature range of −30° C. to 70° C. under harsher conditions, and the immobilized alignment form can be stably maintained without changing the alignment state by an external field or an external force.

As the method for manufacturing the patterned optical anisotropic layer used in the first preferable aspect of the laminate of the present invention, for example, it is preferable to align the molecules of the liquid crystal compound such that the slow axes thereof become orthogonal or parallel to the rubbing direction. In a case where the molecules of the liquid crystal compound are aligned in this way, the directions of the first and second in-plane slow axes are determined, the first phase difference regions and the second phase difference regions having in-plane slow axes orthogonal to each other are formed, and the patterned optical anisotropic layer used in the first preferable aspect of the laminate of the present invention can be formed.

Examples of the manufacturing method common to the patterned optical anisotropic layer used in the first preferable aspect of the laminate of the present invention and the patterned optical anisotropic layer used in the second preferable aspect of the laminate of the present invention include a method of aligning the slow axes of the liquid crystals according to the alignment abilities of each of the regions of the patterned photoalignment film having different alignment abilities.

Furthermore, by the alignment state of the liquid crystals in these steps, the optical characteristics (Re and Rth) of the patterned optical anisotropic layer are determined.

The thickness of the patterned optical anisotropic layer formed as described above is not particularly limited, but is preferably 0.1 to 10 μm and more preferably 0.5 to 5 μm.

<Optically Anisotropic Layer>

The laminate of the present invention includes an optically anisotropic layer disposed between the first patterned polarizer and the patterned optical anisotropic layer. In the optically anisotropic layer, the absolute value of the retardation Rth at a wavelength of 550 nm in the film thickness direction is 50 to 150 nm.

The optically anisotropic layer preferably has uniform retardation in the plane thereof, and is differentiated from the patterned optical anisotropic layer.

From the viewpoint of inhibiting the light leakage occurring at the time of observing the black display state in an oblique direction, it is preferable that the slow axis of the optically anisotropic layer is disposed such that an angle of 90°±5° is formed between the aforementioned slow axis and the absorption axis of the first patterned polarizer or the second patterned polarizer.

(Optical Characteristics)

In the optically anisotropic layer of the laminate of the present invention, the retardation Re(550) at a wavelength of 550 nm in the in-plane direction is preferably −10 to 10 nm, more preferably −5 to 5 nm, and particularly preferably −1 to 1 nm from the viewpoint of making the final polarization state coincide with the polarization state at the extinction point.

In the optically anisotropic layer of the laminate of the present invention, the absolute value of the retardation Rth(550) at a wavelength of 550 nm in the film thickness direction is 50 to 150 nm. In the optically anisotropic layer, the absolute value of the retardation Rth at a wavelength of 550 nm in the film thickness direction is preferably 70 to 130 nm, and preferably 80 to 110 nm from the viewpoint of making the final polarization state coincide with the polarization state at the extinction point.

The optically anisotropic layer of the laminate of the present invention is preferably a +C-plate in which the retardation Rth(550) at a wavelength of 550 nm in the film thickness direction is −50 to 150 nm or a −C-plate in which the retardation Rth(550) at a wavelength of 550 nm in the film thickness direction is 50 to 150 nm.

In the wavelength dispersion of the retardation Re of the optically anisotropic layer in the in-plane direction, Re(450)/Re(550) is preferably 0.80 to 1.20, more preferably 0.85 to 1.15, and particularly preferably 0.90 to 1.10, and Re(630)/Re(550) is preferably 0.80 to 1.20, more preferably 0.85 to 1.15, and particularly preferably 0.90 to 1.10.

In the wavelength dispersion of the retardation Rth of the optically anisotropic layer in the film thickness direction, Rth(450)/Rth(550) is preferably 0.80 to 1.20, more preferably 0.85 to 1.15, and particularly preferably 0.90 to 1.10, and Rth(630)/Rth(550) is preferably 0.80 to 1.20, more preferably 0.85 to 1.15, and particularly preferably 0.90 to 1.10.

(Material of Optically Anisotropic Layer)

The material used in the optically anisotropic layer is not particularly limited as long as a desired retardation can be exhibited. Examples of the material include a liquid crystal composition containing a liquid crystal compound, a cellulose acylate film, and the like. The optically anisotropic layer may include one layer or two or more layers. Examples of the optically anisotropic layer include a laminate of a +A-plate and a +C-plate, a laminate of a −B-plate and a +C-plate, a λ/2 plate (abbreviation for ½ wavelength plate) having Rth of about 0 nm, and the like.

Examples of the material used in the optically anisotropic layer include the materials such as a cellulose acylate film and additives described in paragraphs "0032" to "0120" in JP5657228B, the content of which is incorporated into the present invention.

As the method for forming the optically anisotropic layer, for example, a method is preferable in which the alignment state of the liquid crystal compound is immobilized using a liquid crystal composition containing a liquid crystal compound and the like. At this time, examples of the method for immobilizing the liquid crystal compound suitably include a method in which a liquid crystal compound having a polymerizable group is used as a liquid crystal compound and immobilized by being polymerized. In the present invention, the optically anisotropic layer can be formed on any support or polarizer.

The material used for forming the optically anisotropic layer is preferably a liquid crystal composition containing a liquid crystal compound, and the liquid crystal compound is preferably a polymerizable liquid crystal compound.

The optically anisotropic layer may be a layer obtained by immobilizing a liquid crystal phase, and is preferably a layer obtained by immobilizing a nematic liquid crystal phase.

A preferable range of the liquid crystal compound used in the optically anisotropic layer is the same as the preferable range of the liquid crystal compound used in the patterned optical anisotropic layer.

(Boron-Containing Compound)

From the viewpoint of making it easy to form a C-plate having reciprocal wavelength dispersion by vertically aligning a smectic liquid crystal compound, the optically anisotropic layer preferably contains a boron-containing compound. Examples of the boron-containing compound include the compounds described in paragraphs "0064" to "0079" in JP2014-191156A, the content of which is incorporated into the present specification.

A preferable example of the boron-containing compound will be shown below, but the present invention is not limited thereto.

S-2

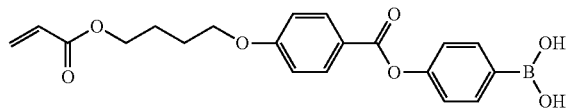 [SMILES: C=CC(=O)OCCCCOc1ccc(C(=O)Oc2ccc(B(O)O)cc2)cc1]

The content of the boron-containing compound in the liquid crystal composition with respect to the content of the liquid crystal compound is preferably 0.1% to 10% by mass, and more preferably 0.3% by mass to 1% by mass.

(Other Additives)

The liquid crystal composition containing the polymerizable liquid crystal compound may further contain an alignment control agent, a polymerization initiator, an onium salt compound, a polymerizable monomer without a mesogen skeleton, and the like. A preferable range of each of the alignment control agent, the polymerization initiator, the onium salt compound, and the solvent used in the optically anisotropic layer is the same as the preferable range of each of the materials used in the patterned optical anisotropic layer.

<Alignment Film>

The laminate of the present invention may have an alignment film. For example, the laminate may have an alignment film adjacent to the patterned polarizer, an alignment film adjacent to the patterned optical anisotropic layer, or an alignment film adjacent to the optically anisotropic layer. The alignment film has a function of controlling the alignment of materials (dichroic colorant and the like) at the time of forming the patterned polarizer and a function of controlling the alignment of liquid crystal molecules at the time of forming the patterned optical anisotropic layer or the optically anisotropic layer.

The alignment film can be provided by means of a rubbing treatment of an organic compound (preferably a polymer), performing oblique vapor deposition of an inorganic compound such as SiO, forming a layer having microgrooves, and the like. In addition, alignment films (preferably photoalignment films) are also known which obtain the alignment function by being applied with an electric field or a magnetic field or being irradiated with light.

Depending on the material of the underlayer of the patterned optical anisotropic layer or the optically anisotropic layer, even if the alignment film is not provided, it is possible to cause the underlayer to function as an alignment film by performing an alignment treatment (for example, a rubbing treatment) directly on the underlayer. Examples of supports that become such an underlayer include polyethylene terephthalate (PET).

In some cases, the underlayer functions as an alignment film on which a liquid crystal compound for preparing the patterned optical anisotropic layer or the optically anisotropic layer as an upper layer can be aligned. In these cases, even if an alignment film is not provided and a special alignment treatment (for example, a rubbing treatment) is not performed, the liquid crystal compound of the upper layer can be aligned.

Hereinafter, a photoalignment film as a preferable example will be described.

The materials of the photoalignment film used in a photoalignment film formed by light irradiation are described in a number of documents. Preferable examples of the materials include the azo compounds described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B, the aromatic ester compounds described in JP2002-229039A, the maleimide compounds having a photo-aligned unit and/or the alkenyl-substituted nadimide compounds described in JP2002-265541A and JP2002-317013A, the photo-crosslinking silane derivatives described in JP4205195B and JP4205198B, the photo-crosslinking polyimides, polyamides, or esters described in JP2003-520878A, JP2004-529220A, paragraphs "0024" to "0043" in WO2005/096041A, and JP4162850B, and the photodimerizable compounds, particularly, the cinnamate (cinnamic acid) compounds, the chalcone compounds, and the coumarin compounds described in JP1997-118717A (JP-H09-118717A), JP1998-506420A (JP-H10-506420A), JP2003-505561A, WO2010/150748A, paragraphs "0028" to "0176" in JP2012-155308A, JP2013-177561A, and JP2014-12823A. Among these, the azo compounds, the photo-crosslinking polyimides, polyamides, or esters, the cinnamate compounds, and the chalcone compounds are particularly preferable.

Specific examples of particularly preferable materials of the photoalignment film include the compound represented by General Formula (1) in JP2006-285197A and the liquid crystal alignment agents having a photo-aligned group described in paragraphs "0028" to "0176" in JP2012-155308A. As the photoalignment film, LPP-JP265CP (trade name) manufactured by Rolic Technologies Ltd and the like can be used.

By irradiating the film formed of the aforementioned materials with linearly polarized light or unpolarized light, the photoalignment film can be manufactured.

Furthermore, a patterned photoalignment film is preferably formed using mask exposure or the like for the photoalignment film at the time of irradiating the aforementioned film with linearly polarized light or unpolarized light. For example, the patterned photoalignment film, which is for forming the patterned optical anisotropic layers used in the first preferable aspect of the laminate of the present invention and has the first and second regions that exhibit alignment abilities in different directions in the plane thereof and alternate with each other, can be formed by irradiating a photoalignment film with linearly polarized light having a specific polarization direction and then irradiating the photoalignment film with linearly polarized light in a different polarization direction by using a photomask having a desired pattern shape (for example, glass to which aluminum foil is bonded may be used). In addition, the patterned photoalignment film, which is for forming the patterned optical anisotropic layer used in the second preferable aspect of the laminate of the present invention and has three or more regions which exhibit alignment abilities in different directions in the plane thereof and in which the directions of the alignment abilities continuously change, can be formed by repeating the following operation. In the operation, by an active energy ray irradiation device in which a polarizing plate and a light screen plate having a desired slit width are disposed, only a region corresponding to the slit width of the light screen plate is irradiated with linearly polarized light having a specific polarization direction, and thereafter, while the polarizing plate is being rotated by an arbitrary angle and the region corresponding to the slit width is being moved, the film is irradiated with linearly polarized light having different polarization directions.

In the present specification, "irradiation with linearly polarized light" is an operation for causing a photoreaction in the material of a photoalignment film. The wavelength of the light used varies with the material of a photoalignment film used, and is not particularly limited as long as it is a wavelength necessary for the photoreaction. The peak wavelength of the light used for the light irradiation is preferably 200 nm to 700 nm. The light is more preferably ultraviolet rays having a peak wavelength equal to or shorter than 400 nm.

Examples of light sources used for the light irradiation include generally used light sources such as lamps including a tungsten lamp, a halogen lamp, a xenon lamp, a xenon flash lamp, a mercury lamp, a mercury xenon lamp, and a carbon arc lamp, various lasers (for example, a semiconductor laser, a helium neon laser, an argon ion laser, a helium cadmium laser, and a yttrium aluminum garnet (YAG) laser), a light emitting diode, a cathode ray tube, and the like.

As means for obtaining linearly polarized light, it is possible to adopt a method of using a polarizing plate (for example, an iodine polarizing plate, a dichroic colorant polarizing plate, or a wire-grid polarizing plate), a method of using a prism-based element (for example, a Glan-Thompson prism) or a reflective-type polarizer exploiting the Brewster's angle, or a method of using light emitted from a laser light source exploiting polarization. Furthermore, by using a filter or a wavelength conversion element, only the light having a necessary wavelength may be selectively radiated.

In a case where the radiated light is linearly polarized light, a method is adopted in which the alignment film is irradiated from the top side or the reverse side thereof with the light in a direction perpendicular or oblique to the surface of the alignment film. The incidence angle of the light varies with the material of the photoalignment film, but is 0° to 90° (vertical) and preferably 40° to 90°.

In a case where unpolarized light is used, the film is irradiated with the unpolarized light in an oblique direction. The incidence angle of the light is 10° to 80°, preferably 20° to 60°, and particularly preferably 30° to 50°.

The irradiation time is preferably 1 to 60 minutes, and more preferably 1 to 10 minutes.

Depending on the material of the alignment film selected, the alignment film can be peeled from a temporary support for forming the patterned polarizer, the patterned optical anisotropic layer, or the optically anisotropic layer, or only the patterned polarizer, the patterned optical anisotropic layer, or the optically anisotropic layer can be peeled. By bonding the transferred (peeled) patterned polarizer, patterned optical anisotropic layer, or optically anisotropic layer, a thin patterned polarizer, patterned optical anisotropic layer, or optically anisotropic layer having a thickness of several micrometers can be provided. Furthermore, an aspect is also preferable in which a rubbing alignment film or a photoalignment film is directly laminated on the patterned polarizer by coating, and an alignment function is imparted to the laminate by means of rubbing or a photoalignment treatment. That is, the laminate of the present invention may be a laminate having a photoalignment film or a rubbing alignment film on the surface of the patterned polarizer.

In the present invention, an aspect of using a photoalignment film as an alignment film is particularly preferable, because in this aspect, a pretilt angle of the polymerizable rod-like liquid crystal compound contained in the patterned optical anisotropic layer or the optically anisotropic layer can be made 0°, and both the high contrast by which the light leakage in the front is reduced and the reduction in tint change in an oblique direction can be easily accomplished. It is preferable to impart the anchoring force to the photoalignment film used in the present invention by a step of irradiating the photoalignment film with polarized light in a vertical direction or an oblique direction or a step of irradiating the photoalignment film with unpolarized light in an oblique direction. The oblique direction adopted in a case where the photoalignment film is irradiated in an oblique direction is preferably a direction intersecting with the photoalignment film at an angle of 5° to 45°, and more preferably a direction intersecting with the photoalignment film at an angle of 10° to 30°. The photoalignment film may be irradiated with ultraviolet rays preferably at an irradiation intensity of 200 to 2,000 mJ/cm$^2$.

<Light-Transmitting Substrate>

The laminate of the present invention may include a light-transmitting substrate.

The light-transmitting substrate is a glass plate or a plastic substrate such as an acryl plate. In a case where a laminate, which is obtained by laminating two sheets of polarizers including the first patterned polarizer and the second patterned polarizer, is used with the light-transmitting substrate, according to the incidence angle of light, the adjustment of the transmittance of transmitted light, that is, light control can be performed. Furthermore, even with the patterned optical anisotropic layer, light control can be performed. The polarizance mentioned herein refers to an ability to make linearly polarized light from unpolarized light or circularly polarized light or an ability to convert linearly polarized light into circularly polarized light. The polarizance can be changed by applying a phase difference.

As the light-transmitting substrate, it is possible to use glass plates used in general windows and plastic substrates such as an acryl plate, a polycarbonate plate, and a polystyrene plate. The preferable range of a thickness of the light-transmitting substrate varies with the use. For building windows, the thickness of the light-transmitting substrate is generally 0.1 to 20 mm, and for windows for vehicles such as cars, the thickness of the light-transmitting substrate is generally 1 to 10 mm.

<Method for Manufacturing Laminate>

The method for manufacturing the laminate is not particularly limited.

The step of disposing the patterned optical anisotropic layer is not particularly limited. For example, by using a patterned optical anisotropic layer formed using the aforementioned method for manufacturing a patterned optical anisotropic layer, the patterned optical anisotropic layer can be disposed between the first patterned polarizer and the second patterned polarizer by a known method.

The method for disposing the optically anisotropic layer between the first patterned polarizer and the patterned optical anisotropic layer is not particularly limited. As the method for forming the optically anisotropic layer, a method of coating any member with a coating solution for forming an optically anisotropic layer is preferable. The coating solution for forming an optically anisotropic layer is preferably a liquid crystal composition.

After coating, it is preferable that the liquid crystal composition is dried or heated if necessary and then cured. It is preferable that the polymerizable liquid crystal compound in the liquid crystal composition is aligned by the step of drying or heating. In a case where heating is performed, the heating temperature is preferably equal to or lower than 200° C., and more preferably equal to or lower than 130° C.

It is preferable that the aligned liquid crystal compound is then subjected to polymerization. The polymerization may be any of the thermal polymerization and the photopolymerization using light irradiation, and among these, the photopolymerization is preferable. For the light irradiation, it is preferable to use ultraviolet rays. The irradiation energy is preferably 20 mJ/cm$^2$ to 50 J/cm$^2$, and more preferably 100 mJ/cm$^2$ to 1,500 mJ/cm$^2$. In order to accelerate the photopolymerization reaction, light irradiation may be performed under heating conditions or in a nitrogen atmosphere. The wavelength of the ultraviolet rays for irradiation is preferably 250 nm to 430 nm. From the viewpoint of the stability, it is preferable that the polymerization reaction rate is high, which is preferably equal to or higher than 70% and more preferably equal to or higher than 80%.

The polymerization reaction rate can be determined by measuring the proportion of the consumed polymerizable functional groups by using an infrared (IR) absorption spectrum.

<Use>

The laminate of the present invention can be used for a variety of uses that require light controllability or light blocking properties. Specifically, for example, the laminate can be suitably used in the field of video such as cameras, video tape recorders (VTR), imaging lenses for projectors, finders, filters, prisms, or a Fresnel lens, a field of lens such as pickup lenses for optical disks including compact disk (CD) players, digital versatile disc (DVD) players, or minidisc (MD) players, a field of optical recording for optical disks such as CD players, DVD players, or MD players, a field of films for liquid crystal display such as light guide plates for liquid crystals, polarizing plate-protective films, or phase difference films, a field of information instrument such as surface protective films, a field of optical communication such as optical fibers, optical switches, or optical connectors, the field of vehicles such as car headlights, tail lamp lenses, inner lenses, instrument covers, sunroofs, the field of medical instruments such as eyeglasses, contact lenses, lenses for endoscopes, and medical supplies that need to be sterilized, the field of construction or building materials such as light-transmitting plates for roads, lenses for double-glazed glass, lighting windows, carports, illumination windows, illumination covers, partitions of rooms, and siding boards for building materials, microwavable cooking containers (tableware), and the like. In addition, the laminate of the present invention can be used for windows of various buildings such as buildings for residence including general houses and multiple dwelling houses and commercial buildings including office buildings. Furthermore, the laminate of the present invention can be used not only for building windows but also for windows of vehicles such as cars. The laminate of the present invention can also be used in the field of daily necessities such as picture frames and diary covers.

Among these, the laminate of the present invention can be preferably used for the uses such as windows, partitions of rooms, picture frames, diary covers, and carports, and particularly preferably used for windows.

[Window]

The window of the present invention has the laminate of the present invention.

The laminate of the present invention may be used as is as a window or used by being combined with other known members such as window frames. The window of the present invention can be appropriately modified by known methods such that the window is used in the aspects described in the section of Use of the laminate of the present invention.

EXAMPLES

Hereinafter, the present invention will be more specifically described based on examples and comparative examples. The materials, the amount and proportions of the materials used, the treatment content, the treatment procedure, and the like shown in the following examples can be appropriately modified within a range that does not depart from the gist of the present invention. Accordingly, the scope of the present invention is not limited to the specific examples described below.

Example 1

(Formation of Patterned Photoalignment Film P1)

With reference to the method for preparing a liquid crystal aligning agent (S-3) of Example 3 described in JP2012-155308A, a coating solution for forming a photoalignment film 1 was prepared.

Then, a glass plate prepared as a light-transmitting substrate was coated with the prepared coating solution for forming a photoalignment film 1 by a spin coating method, thereby forming a photoisomerization composition layer 1 having a width of 10 cm.

Thereafter, a polarizing plate was disposed in an ultraviolet irradiation device (EX250-W manufactured by HOYA-SCHOTT), and the obtained photoisomerization composition layer 1 was irradiated with polarized ultraviolet rays at an irradiation amount of 500 mJ/cm$^2$. At this time, the polarization direction was set such that the light intersected with one side of the glass plate at an angle of 45°.

Subsequently, glass to which aluminum foils were bonded at an interval of 1 cm was disposed between the polarized ultraviolet irradiation device and the photoisomerization composition layer 1, and the photoisomerization composition layer 1 was irradiated with the polarized ultraviolet rays in the same manner as described above except that the polarization direction was moved further by 90° such that the light intersected with one side of the glass plate at an angle of 135° in total. In this way, a patterned photoalignment film P1 having five regions and other five regions that exhibited alignment abilities in directions intersecting with each other at an angle of 90°.

<Preparation of Patterned Polarizer 1>

With reference to Example 1 in JP2011-215337A, a coating solution as a dichroic colorant composition was prepared, and the patterned photoalignment film P1 was coated with the coating solution. The coating solution was heated for 30 minutes at 180° C. and then cooled to room temperature, thereby preparing a patterned polarizer 1. The patterned polarizer 1 had first polarization regions and second polarization regions which have different absorption axis directions in the plane thereof and alternated with each other, and an angle formed between the absorption axis direction of each of the first polarization regions and the absorption axis direction of each of the second polarization regions was 90°±5°.

<Preparation of Patterned Optical Anisotropic Layer 1>

The patterned photoalignment film P1 was coated with a coating solution for forming an optically anisotropic layer 1 having the following composition by a spin coating method, thereby forming a liquid crystal composition layer 1.

The formed liquid crystal composition layer 1 was heated for 30 seconds at 95° C., and then the alignment thereof was immobilized by the ultraviolet irradiation such that a patterned optical anisotropic layer was formed, thereby preparing a patterned optical anisotropic layer 1.

| Coating solution for forming optically anisotropic layer 1 (part by mass) | |
| --- | --- |
| Methyl ethyl ketone | 244.1 |
| Mixture of rod-like liquid crystal compounds shown below | 100.0 |
| IRGACURE 907 (manufactured by BASF SE) | 3.0 |
| KAYACURE DETX (manufactured by Nippon Kayaku Co., Ltd;) | 1.0 |
| Fluoroaliphatic group-containing copolymer having structure shown below (alignment control agent for air interface; compound T-1 shown below) | 0.6 |

Rod-Like Liquid Crystal Compound

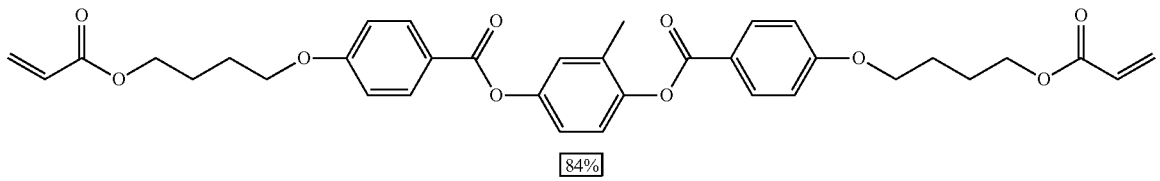

84%

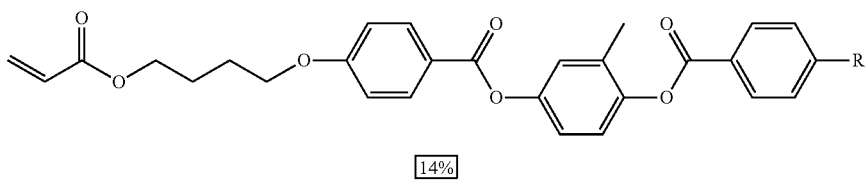

14%

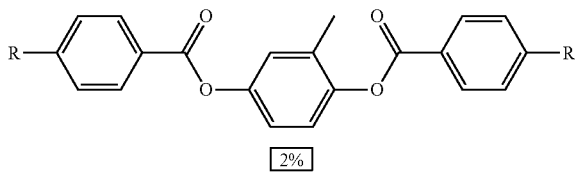

2%

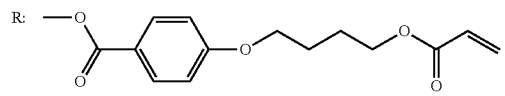

The unit of the numerical values is % by mass. The group represented by R is a partial structure shown on the lower right side, and is bonded to the compound through the side of an oxygen atom of this structure.

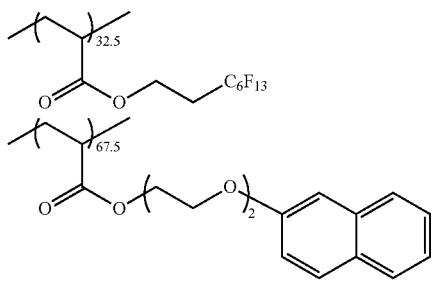

The patterned optical anisotropic layer 1 had first phase difference regions and second phase difference regions which had different slow axis directions in the plane thereof and alternated with each other, and an angle formed between the slow axis direction of each of the first phase difference regions and the slow axis direction of each of the second phase difference regions was 90°. Furthermore, the patterned optical anisotropic layer 1 was disposed in the laminate of the present invention such that an angle formed between the absorption axis of each of the first polarization regions of the second patterned polarizer and the slow axis of each of the first phase difference regions of the patterned optical anisotropic layer that is superposed on each of the first polarization regions of the second patterned polarizer became 0°±5° or 90°±5°. In Example 1, the patterned optical anisotropic layer 1 was disposed such that an angle formed between the absorption axis of each of the first polarization regions of the second patterned polarizer and the slow axis of each of the first phase difference regions of the patterned optical anisotropic layer 1 that is superposed on each of the first polarization regions of the second patterned polarizer became 90°. Therefore, in the table shown below, the slow axis of the patterned optical anisotropic layer 1 was described as a 90°/0° pattern.

For the patterned optical anisotropic layer 1, Re(450), Re(550), Re(650), Rth(450), Rth(550), and Rth(650) were determined, and Re(450)/Re(550) and Re(630)/Re(550) were calculated. The patterned optical anisotropic layer 1 was found to be a +A-plate having normal wavelength dispersion. The optical characteristics of the patterned optical anisotropic layer 1 are described in the table shown below.

<Preparation of Optically Anisotropic Layer 1>

With reference to No. 08 in Table 7 in paragraph "0204" in JP2013-222006A, an alignment film (mixture of KAYARAD PET30 manufactured by Nippon Kayaku Co., Ltd and BLEMMER GLM manufactured by NOF CORPORATION) was formed on 10×10 cm glass. The alignment film was coated with the composition for a phase difference layer described in paragraph "0224" in JP2013-222006A, thereby forming a +C-plate. The obtained +C-plate was used as an optically anisotropic layer 1.

For the optically anisotropic layer 1, Re(450), Re(550), Re(650), Rth(450), Rth(550), and Rth(650) were determined, and Re(450)/Re(550) and Re(630)/Re(550) were calculated. The optically anisotropic layer 1 was found to be a +C-plate having normal wavelength dispersion. The optical characteristics of the optically anisotropic layer 1 are described in the table shown below.

<Preparation of Laminate of Example 1>

The patterned polarizer 1 as the first patterned polarizer, the optically anisotropic layer 1, the patterned optical anisotropic layer 1, and the patterned polarizer 1 as the second patterned polarizer were disposed in this order, thereby preparing a laminate of Example 1.

Furthermore, as an outer frame of the patterned polarizer 1 as the first patterned polarizer, an outer frame having a sliding mechanism that can slide the patterned polarizer 1 by the width of each of the first polarization regions or the second polarization regions of the patterned polarizer 1 was provided on three sides of the polarizer. In the laminate of Example 1, the aforementioned members were disposed such that a white display state, in which an angle formed between the absorption axis of each of the polarization regions of the first patterned polarizer and the absorption axis of each of the polarization regions of the second patterned polarizer that is superposed on each of the polarization regions of the first patterned polarizer is 0° and the transmittance obtained in a case where the light incident on the first patterned polarizer exits from the second patterned polarizer is maximized, and a black display state, in which an angle formed between the absorption axis of each of the polarization regions of the first patterned polarizer and the absorption axis of each of the polarization regions of the second patterned polarizer that is superposed on each of the polarization regions of the first patterned polarizer is 90° and the transmittance obtained in a case where the light incident on the first patterned polarizer exits from the second patterned polarizer is minimized, were switched with each other. In the evaluation which will be described later, for the sake of convenience, the laminate was observed by disposing the first patterned polarizer having the sliding mechanism on the viewing side. However, even in a case where the laminate of the present invention is observed from the reverse side, the black display state and the white display state are established. In the table shown below, the absorption axis of each of the polarization regions of the first patterned polarizer in the black display state is described. Therefore, the slow axis of the first patterned polarizer is described as a 90°/0° pattern in the table, such that from the table, it is possible to know that an angle formed between the absorption axis of each of the polarization regions of the first patterned polarizer and the absorption axis of each of the polarization regions of the second patterned polarizer that is superposed on each of the polarization regions of the first patterned polarizer is 90°.

In the laminate of Example 1, the second patterned polarizer was immobilized such that it became unmovable. Therefore, an angle formed between the absorption axis of each of the polarization regions of the second patterned polarizer and the slow axis of each of the phase difference regions of the patterned optical anisotropic layer that is superposed on each of the polarization regions of the second patterned polarizer was 90° all the time.

Example 2

<Formation of Patterned Optical Anisotropic Layer 2>

A liquid crystal composition layer 2 was formed on the patterned photoalignment film P1 in the same manner as in Formation of patterned optical anisotropic layer 1, except that the coating solution for forming an optically anisotropic layer 1 was changed to a coating solution for forming an optically anisotropic layer 2 having the composition shown below.

The formed liquid crystal composition layer 2 was heated for 120 seconds at 80° C., and the alignment thereof was then immobilized by ultraviolet irradiation such that a patterned optical anisotropic layer was formed, thereby preparing a patterned optical anisotropic layer 2.

determined, and Re(450)/Re(550) and Re(630)/Re(550) were calculated. The patterned optical anisotropic layer 2 was found to be a +A-plate having reciprocal wavelength dispersion. The optical characteristics of the patterned optical anisotropic layer 2 are described in the table shown below.

<Preparation of Laminate of Example 2>

| Coating solution for forming optically anisotropic layer 2 | |
| --- | --- |
| Alkylcyclohexane ring-containing compound (compound A-1 shown below) | 20.00 parts by mass |
| Liquid crystal compound L-1 shown below | 40.00 parts by mass |
| Liquid crystal compound L-2 shown below | 40.00 parts by mass |
| Polymerization initiator (IRGACURE 184, manufactured by BASF SE) | 3.00 parts by mass |
| Polymerization initiator (IRGACURE OXE-01, manufactured by BASF SE) | 3.00 parts by mass |
| Fluoroaliphatic group-containing copolymer (alignment control agent for air interface; compound T-1) | 0.20 parts by mass |
| Cyclopentanone | 423.11 parts by mass |

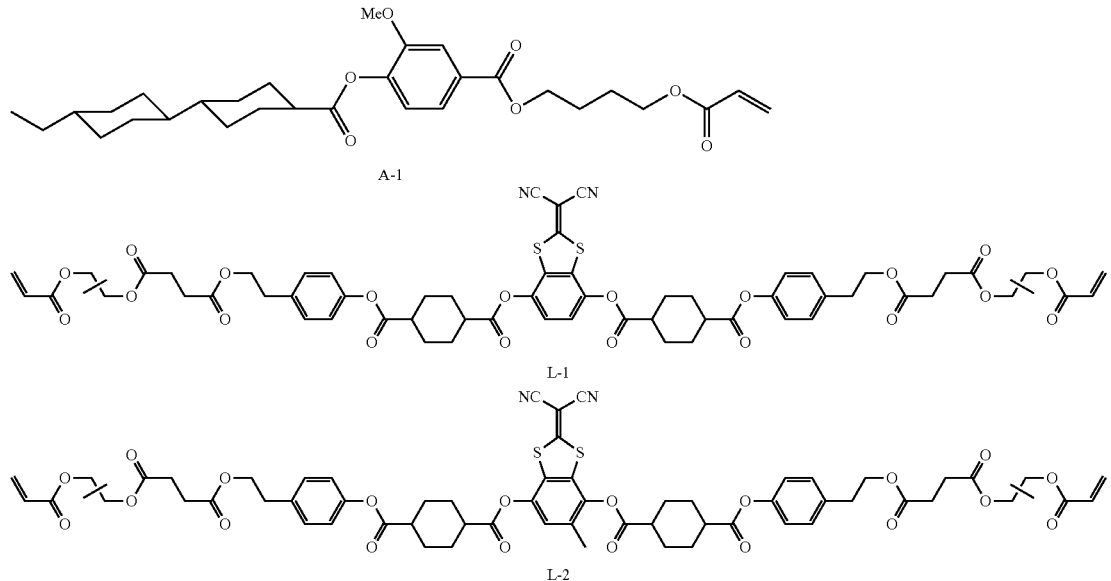

The obtained patterned optical anisotropic layer 2 had first phase difference regions and second phase difference regions which had different slow axis directions in the plane thereof and alternated with each other, and an angle formed between the slow axis direction of each of the first phase difference regions and the slow axis direction of each of the second phase difference regions was 90°. Furthermore, the patterned optical anisotropic layer 2 was disposed in the laminate of the present invention, such that an angle formed between the absorption axis of each of the first polarization regions of the second patterned polarizer and the slow axis of each of the first phase difference regions of the patterned optical anisotropic layer that is superposed on each of the first polarization regions of the second patterned polarizer became 0°±5° or 90°±5°. In Example 2, the patterned optical anisotropic layer 2 was disposed such that an angle formed between the absorption axis of each of the first polarization regions of the second patterned polarizer and the slow axis of each of the first phase difference regions of the patterned optical anisotropic layer 2 that is superposed on each of the first polarization regions of the second patterned polarizer became 90°. Therefore, in the table shown below, the slow axis of the patterned optical anisotropic layer 2 is described as a 90°/0° pattern.

For the patterned optical anisotropic layer 2, Re(450), Re(550), Re(650), Rth(450), Rth(550), and Rth(650) were A laminate of Example 2 was prepared in the same manner as in Example 1, except that the patterned optical anisotropic layer 2 was used instead of the patterned optical anisotropic layer 1 as a patterned optical anisotropic layer.

Example 3

<Preparation of Optically Anisotropic Layer 2>

A +C-plate was prepared in the same manner as described above, except that in Preparation of optically anisotropic layer 1 of Example 1, the composition for a phase difference layer described in paragraph "0224" in JP2013-222006A was changed to a coating solution for forming an optically anisotropic layer 3 shown below. The obtained +C-plate was used as an optically anisotropic layer 2.

For the optically anisotropic layer 2, Re(450), Re(550), Re(650), Rth(450), Rth(550), and Rth(650) were determined, and Re(450)/Re(550) and Re(630)/Re(550) were calculated. The optically anisotropic layer 2 was found to be a +C-plate having reciprocal wavelength dispersion. The optical characteristics of the optically anisotropic layer 2 are described in the table shown below.

| Coating solution for forming optically anisotropic layer 3 | |
|---|---|
| Compound A-1 described above | 20.00 parts by mass |
| Liquid crystal compound L-1 described above | 40.00 parts by mass |
| Liquid crystal compound L-2 described above | 40.00 parts by mass |
| Polymerization initiator (IRGACURE 184, manufactured by BASF SE) | 3.00 parts by mass |
| Polymerization initiator (IRGACURE OXE-01, manufactured by BASF SE) | 3.00 parts by mass |
| Onium salt compound (alignment control agent for alignment film side; vertical alignment agent; compound S-1 shown below) | 1.00 part by mass |
| Boron-containing compound (vertical alignment agent; compound S-2 shown below) | 0.50 parts by mass |
| Fluoroaliphatic group-containing copolymer (alignment control agent for air interface; vertical alignment agent, polymer B shown below) | 0.40 parts by mass |
| Fluoroaliphatic group-containing copolymer (alignment control agent for air interface; vertical alignment agent, compound S-3 shown below) | 0.20 parts by mass |
| Cyclopentanone | 360.33 parts by mass |

S-1

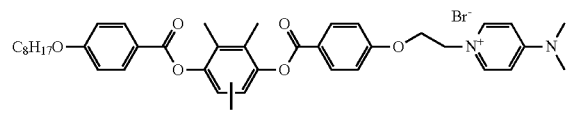

S-2

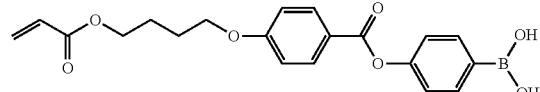

Polymer B

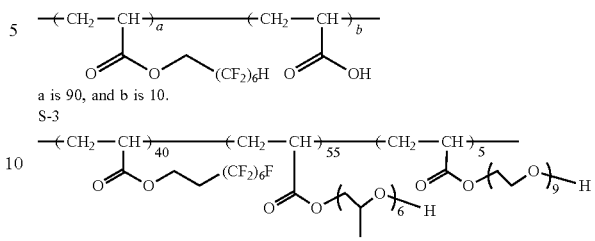

a is 90, and b is 10.

S-3

<Preparation of Laminate of Example 3>

A laminate of Example 3 was prepared in the same manner as in Example 2, except that the patterned optical anisotropic layer 3 was used instead of the patterned optical anisotropic layer 2 as a patterned optical anisotropic layer.

Example 4

<Formation of Patterned Optical Anisotropic Layer 3>

A liquid crystal composition layer 4 was formed on the patterned photoalignment film P1 in the same manner as in Formation of patterned optical anisotropic layer 1, except that the coating solution for forming an optically anisotropic layer 1 was changed to a coating solution for forming an optically anisotropic layer 4 having the composition shown below.

The formed liquid crystal composition layer 4 was heated for 60 seconds at 80° C., and the alignment thereof was then immobilized by ultraviolet irradiation such that a patterned optical anisotropic layer was formed, thereby preparing a patterned optical anisotropic layer 3.

| Coating solution for forming optically anisotropic layer 4 | |
|---|---|
| Discotic liquid crystal compound (A) shown below | 80 parts by mass |
| Discotic liquid crystal compound (B) shown below | 20 parts by mass |
| Ethylene oxide-modified trimethylolpropane triacrylate (V# 360, manufactured by OSAKA ORGANIC CHEMICAL INDUSTRY LTD) | 5 parts by mass |
| Photopolymerization initiator (IRGACURE 907, manufactured by BASF SE) | 4 parts by mass |
| Onium salt compound (alignment control agent for alignment film side) (pyridinium salt (A) shown below) | 2 parts by mass |
| Fluoroaliphatic group-containing copolymer (alignment control agent for air interface; polymer A shown below) | 0.2 parts by mass |
| Fluoroaliphatic group-containing copolymer (alignment control agent for air interface; polymer B described above) | 0.1 parts by mass |
| Fluoroaliphatic group-containing copolymer (alignment control agent for air interface; compound T-1) | 0.1 parts by mass |
| Methyl ethyl ketone | 211 parts by mass |

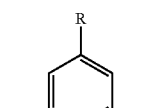

Discotic liquid crystal compound (A)

R =
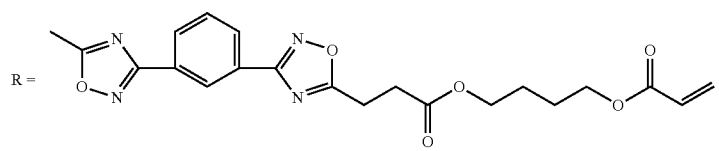

| Coating solution for forming optically anisotropic layer 4 |
|---|

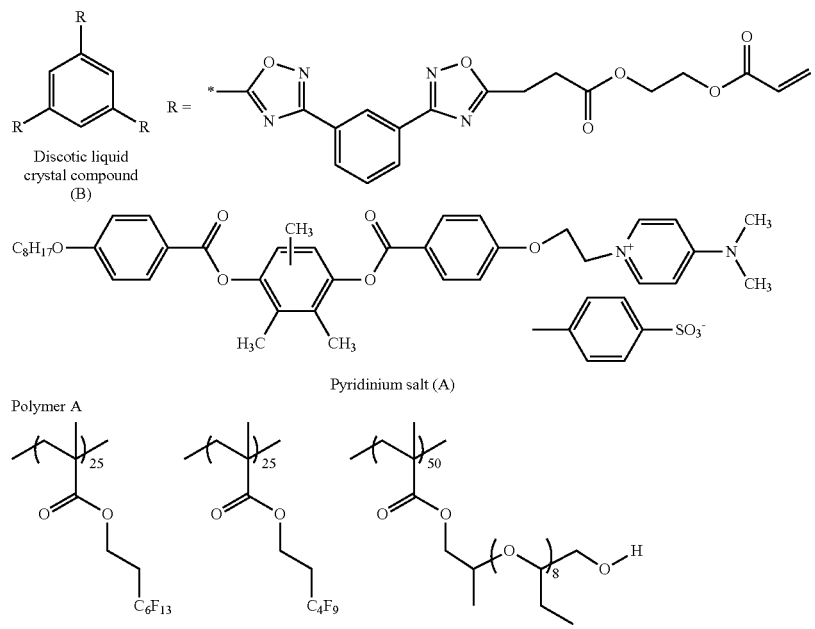

The obtained patterned optical anisotropic layer 3 had first phase difference regions and second phase difference regions which had different slow axis directions in the plane thereof and alternated with each other, and an angle formed between the slow axis direction of each of the first phase difference regions and the slow axis direction of each of the second phase difference regions was 90°. Furthermore, the patterned optical anisotropic layer 3 was disposed in the laminate of the present invention, such that an angle formed between the absorption axis of each of the first polarization regions of the second patterned polarizer and the slow axis of each of the first phase difference regions of the patterned optical anisotropic layer that is superposed on each of the first polarization regions of the second patterned polarizer became 0°±5° or 90°±5°. In Example 4, the patterned optical anisotropic layer 3 was disposed such that an angle formed between the absorption axis of each of the first polarization regions of the second patterned polarizer and the slow axis of each of the first phase difference regions of the patterned optical anisotropic layer 3 that is superposed on each of the first polarization regions of the second patterned polarizer became 90°. Therefore, in the table shown below, the slow axis of the patterned optical anisotropic layer 3 is described as a 90°/0° pattern.

For the patterned optical anisotropic layer 3, Re(450), Re(550), Re(650), Rth(450), Rth(550), and Rth(650) were determined, and Re(450)/Re(550) and Re(630)/Re(550) were calculated. The patterned optical anisotropic layer 3 was found to be a –A-plate having normal wavelength dispersion. The optical characteristics of the patterned optical anisotropic layer 3 are described in the table shown below.

<Preparation of Optically Anisotropic Layer 3>

A –C-plate was prepared in the same manner as described above, except that in Preparation of optically anisotropic layer 1 of Example 1, the composition for a phase difference layer described in paragraph "0224" in JP2013-222006A was changed to a coating solution for forming an optically anisotropic layer 5 shown below. The obtained –C-plate was used as an optically anisotropic layer 3.

For the optically anisotropic layer 3, Re(450), Re(550), Re(650), Rth(450), Rth(550), and Rth(650) were determined, and Re(450)/Re(550) and Re(630)/Re(550) were calculated. The optically anisotropic layer 3 was found to be a –C-plate having normal wavelength dispersion. The optical characteristics of the optically anisotropic layer 3 are described in the table shown below.

| Coating solution for forming optically anisotropic layer 5 | |
|---|---|
| Discotic liquid crystal compound: compound 3-1 shown below | 91.0 parts by mass |
| Polymerizable compound: compound 3-2 shown below | 9.0 parts by mass |
| Polymerization initiator: compound 3-3 shown below | 3.0 parts by mass |
| Polymerization initiator: compound 3-4 shown below | 1.0 part by mass |
| Fluoroaliphatic group-containing copolymer (alignment control agent for air interface; fluorine-containing surfactant: compound 3-5 shown below) | 0.8 parts by mass |

| Coating solution for forming optically anisotropic layer 5 |
|---|

(Compound 3-1)

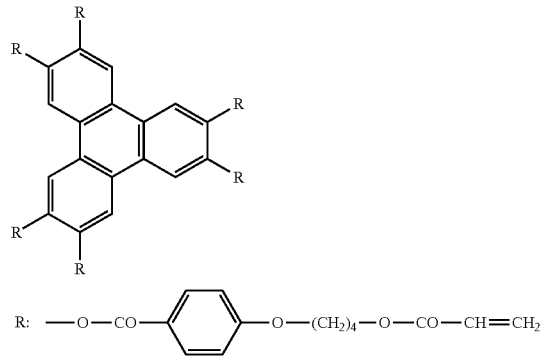

(Compound 3-2)

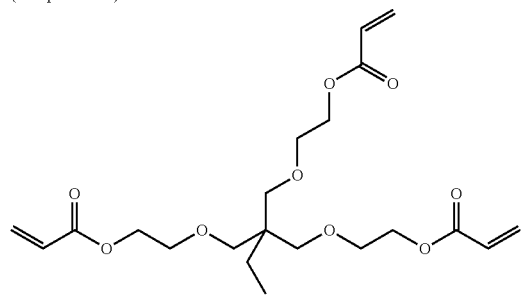

(Compound 3-3)

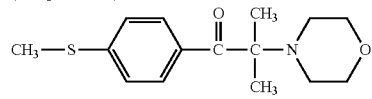

(Compound 3-4)

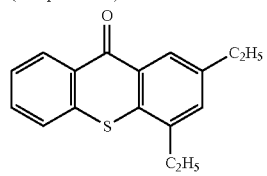

(Compound 3-5)

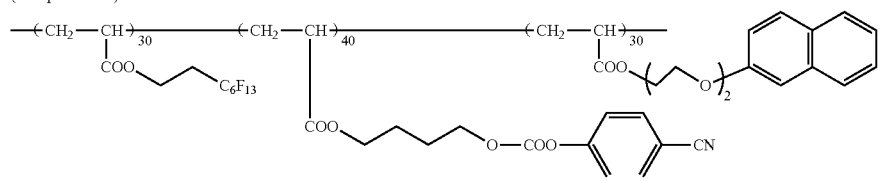

<Preparation of Laminate of Example 4>

A laminate of Example 4 was prepared in the same manner as in Example 1, except that the patterned optical anisotropic layer 3 was used instead of the patterned optical anisotropic layer 1 as the first patterned optical anisotropic layer, and optically anisotropic layer 3 was used instead of the optically anisotropic layer 1 as an optically anisotropic layer.

Example 5

<Formation of Patterned Photoalignment Film P2>

A glass plate was coated with the coating solution for forming a photoalignment film 1 used in Example 1 by a spin coating method, thereby forming the photoisomerization composition layer 1 having a width of 10 cm.

Then, a polarizing plate and a light screen plate having a slit width of 0.55 mm were disposed in an ultraviolet irradiation device (EX250-W manufactured by HOYA-SCHOTT), and the obtained photoisomerization composition layer 1 was irradiated with polarized ultraviolet rays at an irradiation amount of 500 mJ/cm$^2$.

At this time, in a state where the polarizing plate was being rotated by 1° and the glass plate on which the photoisomerization composition layer 1 was formed was being moved, the ultraviolet irradiation was performed.

In this way, a patterned photoalignment film P2 was prepared which had 180 regions exhibiting alignment abilities in different directions.

<Preparation of Patterned Polarizer 2>

Next, a patterned polarizer 2 was prepared in the same manner as in Preparation of patterned polarizer 1 of Example 1, except that the patterned photoalignment film P2 was used instead of the patterned photoalignment film P1. The patterned polarizer 2 had three or more polarization regions which had different absorption axis directions in the plane thereof and in which the absorption axis directions continuously changed. Therefore, in the table shown below, the absorption axis of the patterned polarizer 2 is described as a continuous pattern.

<Preparation of Patterned Optical Anisotropic Layer 4>

The patterned photoalignment film P2 was coated with the coating solution for forming an optically anisotropic layer 2 by a spin coating method, thereby forming the liquid crystal composition layer 2.

The formed liquid crystal composition layer 2 was heated for 30 seconds at 95° C., and the alignment thereof was then immobilized by ultraviolet irradiation such that a patterned optical anisotropic layer was formed, thereby preparing a patterned optical anisotropic layer 4.

The patterned optical anisotropic layer 4 had three or more phase difference regions which had different slow axis directions in the plane thereof and in which the slow axis directions continuously changed. Therefore, in the table shown below, the slow axes of the patterned optical anisotropic layer 4 are described as a continuous pattern.

For the patterned optical anisotropic layer 4, Re(450), Re(550), Re(650), Rth(450), Rth(550), and Rth(650) were determined, and Re(450)/Re(550) and Re(630)/Re(550) were calculated. The patterned optical anisotropic layer 4 was found to be a +A-plate having reciprocal wavelength dispersion. The optical characteristics of the patterned optical anisotropic layer 4 are described in the table shown below.

<Preparation of Laminate of Example 5>

A laminate of Example 5 was prepared in the same manner as in Example 3, except that the patterned polarizer 2 was used instead of the patterned polarizer 1 as the first patterned polarizer, the patterned polarizer 2 was used instead of the patterned polarizer 1 as the second patterned polarizer, the patterned optical anisotropic layer 4 was used instead of the patterned optical anisotropic layer 1 as a patterned optical anisotropic layer, and the sliding mechanism was prepared as below.

In Example 5, two sheets of patterned polarizers 2 and the patterned optical anisotropic layer 4 were disposed, such that the white display state, in which an angle formed between the absorption axis of each of the polarization regions of the first patterned polarizer and the absorption axis of each of the polarization regions of the second patterned polarizer that is superposed on each of the polarization regions of the first patterned polarizer is 0° and the transmittance obtained in a case where the light incident on the first patterned polarizer exits from the second patterned polarizer is maximized, and the black display state, in which an angle formed between the absorption axis of each of the polarization regions of the first patterned polarizer and the absorption axis of each of the polarization regions of the second patterned polarizer that is superposed on each of the polarization regions of the first patterned polarizer is 90° and the transmittance obtained in a case where the light incident on the first patterned polarizer exits from the second patterned polarizer is minimized, were switched with each other.

Specifically, as an outer frame of the patterned polarizer 2 as the first patterned polarizer, an outer frame having a sliding mechanism, which can slide the patterned polarizer to a position where an angle formed between the absorption axis of each of the polarization regions of the patterned polarizer 1 and the absorption axis of each of the polarization regions of the second patterned polarizer that is superposed on each of the polarization regions of the first patterned polarizer becomes 0° and 90°, was provided on three sides of the patterned polarizer 2. The position where an angle formed between the absorption axis of each of the polarization regions of the first patterned polarizer and the absorption axis of each of the polarization regions of the second patterned polarizer that is superposed on each of the polarization regions of the first patterned polarizer becomes 0° or 90° was determined based on the direction of the absorption axis of each of the polarization regions of the patterned polarizer 2 determined by the method described below.

By using a luminance colorimeter (BM-5, manufactured by Topcon Corporation), the brightness was measured in the front direction in a state where the first patterned polarizer was being moved, and the position where the brightness was maximized was determined as 0°, and the position where the brightness was minimized was determined as 90°.

In the laminate of Example 5, the second patterned polarizer was immobilized such that it became unmovable. Therefore, an angle formed between the absorption axis of each of the polarization regions of the second patterned polarizer and the slow axis of each of the phase difference regions of the patterned optical anisotropic layer that is superposed on each of the polarization regions of the second patterned polarizer was 90° all the time.

Example 6

<Preparation of Patterned Optical Anisotropic Layer 6>

The patterned photoalignment film P2 was coated with the coating solution for forming an optically anisotropic layer 4 by a spin coating method, thereby forming a liquid crystal composition layer 6.

The formed liquid crystal composition layer 6 was heated for 60 seconds at 80° C., and the alignment thereof was then immobilized by ultraviolet irradiation such that a patterned optical anisotropic layer was formed, thereby preparing a patterned optical anisotropic layer 6.

The patterned optical anisotropic layer 6 had three or more phase difference regions which had different slow axis directions in the plane thereof and in which the slow axis directions continuously changed. Therefore, in the table shown below, the slow axis of the patterned optical anisotropic layer 6 is described as a continuous pattern.

For the patterned optical anisotropic layer 6, Re(450), Re(550), Re(650), Rth(450), Rth(550), and Rth(650) were determined, and Re(450)/Re(550) and Re(630)/Re(550) were calculated. The patterned optical anisotropic layer 6 was found to be a −A-plate having normal wavelength dispersion. The optical characteristics of the patterned optical anisotropic layer 6 are described in the table shown below.

<Preparation of Laminate of Example 6>

A laminate was prepared in the same manner as in Example 5, except that the patterned optical anisotropic layer 6 was used instead of the patterned optical anisotropic layer 4, and the optically anisotropic layer 3 was used instead of the optically anisotropic layer 2.

The evaluation results are shown in the table.

Comparative Example 1

A laminate of Comparative Example 1 was prepared in the same manner as in Example 1, except that the optically anisotropic layer 1 was not used in Example 1.

Comparative Example 2

A laminate of Comparative Example 2 was prepared in the same manner as in Example 5, except that the optically anisotropic layer 2 was not used in Example 5.

Comparative Example 3

<Preparation of Patterned Photoalignment Film P3>

A patterned photoalignment film P3 was prepared in the same manner as in Formation of patterned photoalignment film P1, except that at the time of preparing the patterned photoalignment film P1, the polarization direction was made intersect with one side of the glass plate at an angle of 0° and 90°.

<Preparation of Patterned Optical Anisotropic Layer 5>

The patterned photoalignment film P3 was coated with the aforementioned coating solution for forming an optically anisotropic layer 1 by a spin coating method, thereby forming a liquid crystal composition layer 3.

The formed liquid crystal composition layer 3 was heated for 30 seconds at 95° C., and then the alignment thereof was immobilized by the ultraviolet irradiation such that a patterned optical anisotropic layer was formed, thereby preparing a patterned optical anisotropic layer 5.

The patterned optical anisotropic layer 5 had first phase difference regions and second phase difference regions which had different slow axis directions in the plane thereof and alternated with each other. An angle formed between the slow axis direction of each of the first phase difference regions and the slow axis direction of each of the second phase difference regions was 90°. In Comparative Example 3, the patterned optical anisotropic layer 5 was disposed, such that an angle formed between the absorption axis of the second polarizer and the slow axis of each of the first phase difference regions of the patterned optical anisotropic layer 5 became 45°. Furthermore, the patterned optical anisotropic layer 5 was disposed, such that an angle formed between the absorption axis of the first polarizer and the slow axis of each of the first phase difference regions of the patterned optical anisotropic layer 5 became 135°. Therefore, in the table shown below, the slow axis of the patterned optical anisotropic layer 5 is described as a 45/135 pattern.

For the patterned optical anisotropic layer 5, Re(450), Re(550), Re(650), Rth(450), Rth(550), and Rth(650) were determined, and Re(450)/Re(550) and Re(630)/Re(550) were calculated. The patterned optical anisotropic layer 5 was found to be a +A-plate having reciprocal wavelength dispersion. The optical characteristics of the patterned optical anisotropic layer 5 are described in the table shown below.

<Preparation of Polarizer 3>

By the method described below, an unpatterned polarizer 3 was prepared.

The surface of supports, "TD80UL" and "Z-TAC" (all manufactured by FUJIFILM Corporation) as cellulose triacetate films, was subjected to an alkali saponification treatment. The films were immersed in a 1.5 N (1.5 mol/L) aqueous sodium hydroxide solution for 2 minutes at 55° C., washed with water in a rinsing bath at room temperature, and neutralized using 0.1 N (0.2 mol/L) sulfuric acid at 30° C. The films were then washed again with water in the rinsing bath at room temperature and dried with hot air with a temperature of 100° C.

Subsequently, a roll-like polyvinyl alcohol film having a thickness of 80 μm was continuously stretched by 500% in an aqueous iodine solution and dried, thereby obtaining a polarizer having a thickness of 20 μm. The obtained polarizer was used as an unpatterned polarizer 3.

By using an aqueous solution of a polyvinyl alcohol-based adhesive, TD80UL and Z-TAC were bonded to one surface and the other surface of the polarizer 3 respectively. The obtained polarizing plate was used as a polarizing plate 3.

<Preparation of Laminate of Comparative Example 3>

The polarizing plate 3 including the first polarizer, the patterned optical anisotropic layer 5 as a patterned optical anisotropic layer, the patterned optical anisotropic layer 5 as a second patterned optical anisotropic layer, and the polarizing plate 3 including the second polarizer were disposed in this order, thereby preparing a laminate of Comparative Example 3.

In the laminate of Comparative Example 3, the aforementioned members were disposed such that an angle formed between the absorption axis of the first polarizer and the absorption axis of the second polarizer became 90°.

Furthermore, as an outer frame of the patterned optical anisotropic layer, an outer frame, which can slide the patterned optical anisotropic layer by the width of each of the first phase difference regions or the second phase difference regions of the patterned optical anisotropic layer 1, was provided on three sides of the patterned optical anisotropic layer. In the laminate of Comparative Example 3, the aforementioned members were disposed such that the white display state, in which an angle formed between the slow axis direction of each of the phase difference regions of the patterned optical anisotropic layer and the slow axis direction of each of the phase difference regions of the second patterned optical anisotropic layer that is superposed on each of the phase difference regions of the patterned optical anisotropic layer is 0° and the transmittance obtained in a case where the light incident on the first polarizer exits from the second polarizer is maximized, and the black display state, in which an angle formed between the slow axis direction of each of the phase difference regions of the patterned optical anisotropic layer and the slow axis direction of each of the phase difference regions of the second patterned optical anisotropic layer that is superposed on each of the phase difference regions of the patterned optical anisotropic layer is 90° and the transmittance obtained in a case where the light incident on the first polarizer exits from the second polarizer is minimized, were switched with each other.

The aforementioned members were disposed, such that all of the slow axis directions of the first phase difference regions and the slow axis directions of the second phase difference regions of the patterned optical anisotropic layer intersected with the absorption axes and the transmission axes of the two sheets of polarizers at an angle of 45°. None of the slow axis directions of the first and second phase difference regions of the patterned optical anisotropic layer were parallel or orthogonal to the absorption axes and the transmission axes of the two sheets of polarizers. Likewise, the aforementioned members were disposed, such that all of the slow axis directions of the first phase difference regions and the slow axis directions of the second phase difference regions of the second patterned optical anisotropic layer intersected with the absorption axes and the transmission axes of the two sheets of polarizers at an angle of 45°. None of the slow axis directions of the first and second phase difference regions of the second patterned optical anisotropic layer were parallel or orthogonal to the absorption axes and the transmission axes of the two sheets of polarizers.

[Evaluation]

The performance of the laminate of each of the examples and the comparative examples in the white display state and the black display state was evaluated.

In order to simulate the external light, iPad (registered trademark) Air (manufactured by Apple Inc.) was disassembled, and only the backlight thereof was turned on and used for evaluation by disposing the first patterned polarizer of the laminate of each of the examples and the comparative examples on the viewing side.

Then, the patterned polarizer (first patterned polarizer) on one side of the laminate of each of the examples and the comparative examples was slid by using the sliding mechanism, a state where the transmittance was maximized was regarded as a white display state, and a state where the transmittance was minimized was regarded as a black display state. By using EZContrast (manufactured by ELDIM), the tint in the white display state in the front, the brightness in the black display state in the front, the tint in the black display state in the front, the brightness in the black display state at a polar angle of 60° and an azimuthal angle of 0° (oblique on-axis direction 2 in FIG. 3), and the brightness in the black display state at a polar angle of 60° and an azimuthal angle of 45° (oblique off-axis direction 3 in FIG. 3) were measured.

The tint represented by (u', v') is preferably within a range of (0.17 to 0.23, 0.35 to 0.55), more preferably within a range of (0.18 to 0.22, 0.38 to 0.52), and particularly preferably within a range of (0.19 to 0.21, 0.40 to 0.50).

The higher the brightness in the white display state, the more preferable.

The lower the brightness in the black display state, the more preferable.

The obtained results are described in Table 1 shown below.

TABLE 1

| | | | Example 1 | Example 2 | Example 3 | Example 4 | Example 5 |
|---|---|---|---|---|---|---|---|
| Second patterned polarizer | | Name | Patterned polarizer 1 | Patterned polarizer 1 | Patterned polarizer 1 | Patterned polarizer 1 | Patterned polarizer 2 |
| | | Absorption axis of polarizer | 0°/90° pattern | 0°/90° pattern | 0°/90° pattern | 0°/90° pattern | Continuous pattern |
| Patterned optical anisotropic layer | | Name | 1 | 2 | 2 | 3 | 4 |
| | | Type | +A (normal) | +A (reciprocal) | +A (reciprocal) | −A (normal) | +A (reciprocal) continuous |
| | Optical characteristics | Re(550) | 140 | 140 | 140 | 140 | 140 |
| | | Rth(550) | 70 | 70 | 70 | −70 | 70 |
| | Wavelength dispersion | Re(450)/Re(550) | 1.1 | 0.86 | 0.86 | 1.1 | 0.86 |
| | | Re(630)/Re(550) | 0.97 | 1.03 | 1.03 | 0.97 | 1.03 |
| | | Slow axis | 90°/0° pattern | 90°/0° pattern | 90°/0° pattern | 90°/0° pattern | Continuous pattern |
| Second patterned optical anisotropic layer | | Name | N/A | N/A | N/A | N/A | N/A |
| Optically anisotropic layer | | Name | 1 | 1 | 2 | 3 | 2 |
| | | Type | +C (normal) | +C (normal) | +C (reciprocal)) | −C (normal) | +C (reciprocal) |
| | Optical characteristics | Re(550) | 0.1 | 0.1 | 0.1 | 0.1 | 0.1 |
| | | Rth(550) | −90 | −90 | −90 | 90 | −90 |
| | Wavelength dispersion | Re(450)/Re(550) | 1.1 | 1.1 | 0.86 | 1.1 | 0.86 |
| | | Re(630)/Re(550) | 0.97 | 0.97 | 1.03 | 0.97 | 1.03 |
| First patterned polarizer | | Name | Patterned polarizer 1 | Patterned polarizer 1 | Patterned polarizer 1 | Patterned polarizer 1 | Patterned polarizer 2 |
| | | Absorption axis of polarizer (at the time of black display) | 90°/0° pattern | 90°/0° pattern | 90°/0° pattern | 90°/0° pattern | Continuous pattern |
| Evaluation | Front | Tint of white display state (u', v') | (0.22, 0.47) | (0.22, 0.47) | (0.22, 0.47) | (0.22, 0.47) | (0.22, 0.47) |
| | | Brightness of black display state [cd/m²] | 5 | 5 | 5 | 5 | 5 |
| | | Tint of black display state (u', v') | (0.21, 0.45) | (0.21, 0.45) | (0.21, 0.45) | (0.21, 0.45) | (0.21, 0.45) |
| | Polar angle 60° Azimuthal angle 0° | Brightness of black display state [cd/m²] | 3 | 3 | 3 | 3 | 3 |
| | Polar angle 60° Azimuthal angle 45° | Brightness of black display state [cd/m²] | 15 | 13 | 10 | 15 | 10 |

| | | | Example 6 | Comparative Example 1 | Comparative Example 2 | Comparative Example 3 |
|---|---|---|---|---|---|---|
| Second patterned polarizer | | Name | Patterned polarizer 2 | Patterned polarizer 1 | Patterned polarizer 2 | N/A (unpatterned polarizer 3) |
| | | Absorption axis of polarizer | Continuous pattern | 0°/90° pattern | Continuous pattern | 0° |
| Patterned optical anisotropic layer | | Name | 6 | N/A | N/A | 5 |
| | | Type | −A (normal) continuous | — | — | +A (reciprocal) |
| | Optical characteristics | Re(550) | 140 | — | — | 130 |
| | | Rth(550) | −70 | — | — | 65 |

TABLE 1-continued

|  |  |  | | | | |
|---|---|---|---|---|---|---|
|  | Wavelength dispersion | Re(450)/Re(550) | 1.1 | — | — | 1.1 |
|  |  | Re(630)/Re(550) | 0.97 | — | — | 0.97 |
|  |  | Slow axis | Continuous pattern | — | — | 45/135 pattern |
| Second patterned optical anisotropic layer |  | Name | N/A | N/A | N/A | 5 |
| Optically anisotropic layer |  | Name | 3 | N/A | N/A | N/A |
|  |  | Type | −C (normal) | — | — | — |
|  | Optical characteristics | Re(550) | 0.1 | — | — | — |
|  |  | Rth(550) | 90 | — | — | — |
|  | Wavelength dispersion | Re(450)/Re(550) | 1.1 | — | — | — |
|  |  | Re(630)/Re(550) | 0.97 | — | — | — |
| First patterned polarizer |  | Name | Patterned polarizer 2 | Patterned polarizer 1 | Patterned polarizer 2 | N/A (unpatterned polarizer 3) |
|  | Absorption axis of polarizer (at the time of black display) |  | Continuous pattern | 90°/0° pattern | Continuous pattern | 90° |
| Evaluation | Front | Tint of white display state (u', v') | (0.22, 0.47) | (0.22, 0.47) | (0.22, 0.47) | (0.22, 0.51) |
|  |  | Brightness of black display state [cd/m$^2$] | 5 | 5 | 5 | 5 |
|  |  | Tint of black display state (u', v') | (0.21, 0.45) | (0.21, 0.45) | (0.21, 0.45) | (0.21, 0.45) |
|  | Polar angle 60° Azimuthal angle 0° | Brightness of black display state [cd/m$^2$] | 3 | 3 | 3 | 9 |
|  | Polar angle 60° Azimuthal angle 45° | Brightness of black display state [cd/m$^2$] | 15 | 50 | 50 | 50 |

In Table 1, "+A (normal)" means a +A-plate having normal wavelength dispersion, "+A (reciprocal)" means a +A-plate having reciprocal wavelength dispersion, "−A (normal)" means a −A-plate having normal wavelength dispersion, and +A (reciprocal) continuous" means a +A-plate having reciprocal wavelength dispersion and an aspect wherein the plate has three or more phase difference regions which have different slow axis directions in the plane thereof and in which the slow axis directions continuously change. "+C (normal)" means a +C-plate having normal wavelength dispersion, "+C (reciprocal)" means a +C-plate having reciprocal wavelength dispersion, and "—C (normal)" means a −C-plate having normal wavelength dispersion.

From Table 1, it was understood that in the laminate of the present invention, in a case where light is incident on the laminate, the white display state and the black display state are switched with each other, and the brightness of the black display state is low in the front and in all directions. Furthermore, it was understood that in a preferable aspect of the laminate of the present invention, the white display state and the black display state have an excellent tint in the front and in all directions.

In contrast, from Comparative Examples 1 to 3, it was understood that in a case where the laminate does not have an optically anisotropic layer, the brightness of the black display state cannot be reduced in all directions, that is, serious light leakage occurs depending on the direction along which the black display state is observed.

EXPLANATION OF REFERENCES

1: front direction
2: oblique on-axis direction
3: oblique off-axis direction
12: first polarizer
12A: absorption axis of first polarizer
13: second polarizer
13A: absorption axis of second polarizer
13B: transmission axis of second polarizer
15: patterned optical anisotropic layer
15A: slow axis direction of patterned optical anisotropic layer
16: second patterned optical anisotropic layer
16A: slow axis direction of second patterned optical anisotropic layer
17: optically anisotropic layer
22: first patterned polarizer
22A: absorption axis of first patterned polarizer
23: second patterned polarizer
23A: absorption axis of second patterned polarizer
S1: Stokes parameter 1: linear polarization component of 0, 90°;
S2: Stokes parameter 2: linear polarization component of 45, 135°;
S3: Stokes parameter 3: circular polarization component

What is claimed is:
1. A laminate comprising:
a first patterned polarizer;
a second patterned polarizer,
a patterned optical anisotropic layer disposed between the first patterned polarizer and the second patterned polarizer; and
an optically anisotropic layer disposed between the first patterned polarizer and the patterned optical anisotropic layer,
wherein the laminate comprises one sheet of the patterned optical anisotropic layer,
each of the first patterned polarizer and the second patterned polarizer has two or more polarization regions having different absorption axis directions in a plane of the first patterned polarizer or the second patterned polarizer, the patterned optical anisotropic layer has two or more phase difference regions having different slow axis directions in a plane of the patterned optical anisotropic layer, an angle formed between the absorption axis of each of the polarization regions of the second patterned polarizer and the slow axis of each of the phase difference regions of the patterned optical anisotropic layer that is superposed on each of the polarization regions of the second patterned polarizer is 0°±5° or 90°±5°, an absolute value of a retardation Rth of the optically anisotropic layer at a wavelength of 550 nm in a film thickness direction of the optically anisotropic layer is 50 to 150 nm, at least one of the first patterned polarizer or the second patterned polarizer is movable, and a white display state, in which an angle formed between the absorption axis of each of the polarization regions of the first patterned polarizer and the absorption axis of each of the polarization regions of the second patterned polarizer that is superposed on each of the polarization regions of the first patterned polarizer is 0°±5° and a transmittance obtained in a case where light incident on the first patterned polarizer exits from the second patterned polarizer is maximized, and a black display state, in which an angle formed between the absorption axis of each of the polarization regions of the first patterned polarizer and the absorption axis of each of the polarization regions of the second patterned polarizer that is superposed on each of the polarization regions of the first patterned polarizer is 90°±5° and the transmittance obtained in a case where the light incident on the first patterned polarizer exits from the second patterned polarizer is minimized, are switched with each other.

2. The laminate according to claim 1, wherein each of the first patterned polarizer and the second patterned polarizer has first polarization regions and second polarization regions which have different absorption axis directions in the plane of the first patterned polarizer or the plane of the second patterned polarizer and alternate with each other, an angle formed between the absorption axis direction of each of the first polarization regions and the absorption axis direction of each of the second polarization regions is 90°±5°, the patterned optical anisotropic layer has first phase difference regions and second phase difference regions which have different slow axis directions in the plane of the patterned optical anisotropic layer and alternate with each other, an angle formed between the slow axis direction of each of the first phase difference regions and the slow axis direction of each of the second phase difference regions is 90°±5°, and an angle formed between the absorption axis of each of the first polarization regions of the second patterned polarizer and the slow axis of each of the first phase difference regions of the patterned optical anisotropic layer that is superposed on each of the first polarization regions of the second patterned polarizer is 0°±5° or 90°±5.

3. The laminate according to claim 1, wherein each of the first patterned polarizer and the second patterned polarizer has three or more polarization regions which have different absorption axis directions within the plane of the first patterned polarizer or the second patterned polarizer and in which the absorption axis directions continuously change, the patterned optical anisotropic layer has three or more phase difference regions which have different slow axis directions within the plane of the patterned optical anisotropic layer and in which the slow axis directions continuously change, and an angle formed between the absorption axis of each of the polarization regions of the second patterned polarizer and the slow axis of each of the phase difference regions of the patterned optical anisotropic layer that is superposed on each of the polarization regions of the second patterned polarizer is 0°±5° or 90°±5.

4. The laminate according to claim 1, wherein the patterned optical anisotropic layer is a +A-plate in which a retardation Re(550) at a wavelength of 550 nm equals 110 to 160 nm in an in-plane direction of the patterned optical anisotropic layer, and the optically anisotropic layer is a +C-plate in which a retardation Rth(550) at a wavelength of 550 nm equals −50 to −150 nm in the film thickness direction of the optically anisotropic layer.

5. The laminate according to claim 4, wherein the +A-plate has reciprocal wavelength dispersion in which a retardation Re(450) at a wavelength of 450 nm in the in-plane direction of the +A-plate, the retardation Re(550) at a wavelength of 550 nm in the in-plane direction of the +A-plate, and a retardation Re(630) at a wavelength of 630 nm in the in-plane direction of the +A-plate satisfy Re(450)/Re(550)<1 and Re(630)/Re(550)>1.

6. The laminate according to claim 4, wherein the +C-plate has reciprocal wavelength dispersion in which a retardation Re(450) at a wavelength of 450 nm in the in-plane direction of the +C-plate, the retardation Re(550) at a wavelength of 550 nm in the in-plane direction of the +C-plate, and the retardation Re(630) at a wavelength of 630 nm in the in-plane direction of the +C-plate satisfy Re(450)/Re(550)<1 and Re(630)/Re(550)>1.

7. The laminate according to claim 1, wherein the patterned optical anisotropic layer is a −A-plate in which a retardation Re(550) at a wavelength of 550 nm equals 110 to 160 nm in an in-plane direction of the patterned optical anisotropic layer, and the optically anisotropic layer is a −C-plate in which a retardation Rth(550) at a wavelength of 550 nm equals 50 to 150 nm in the film thickness direction of the patterned optical anisotropic layer.

8. The laminate according to claim 1, wherein in the optically anisotropic layer, the retardation Re(550) at a wavelength of 550 nm equals −10 to 10 nm in the in-plane direction of the patterned optical anisotropic layer.

9. The laminate according to claim 1, wherein the patterned optical anisotropic layer contains a liquid crystal compound.

10. A window comprising the laminate according to claim 1.

* * * * *